US012651042B2

(12) United States Patent
Castiglione et al.

(10) Patent No.: US 12,651,042 B2
(45) Date of Patent: Jun. 9, 2026

(54) SYSTEM AND METHOD FOR MACHINE LEARNING FAIRNESS TESTING

(71) Applicant: ROYAL BANK OF CANADA, Toronto (CA)

(72) Inventors: Giuseppe Marcello Antonio Castiglione, Toronto (CA); Simon Jeremy Damion Prince, Toronto (CA); Christopher Côté Srinivasa, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1124 days.

(21) Appl. No.: 17/497,755

(22) Filed: Oct. 8, 2021

(65) Prior Publication Data

US 2022/0114399 A1 Apr. 14, 2022

Related U.S. Application Data

(60) Provisional application No. 63/089,302, filed on Oct. 8, 2020.

(51) Int. Cl.
| | |
|---|---|
| *G06N 3/045* | (2023.01) |
| *G06F 18/21* | (2023.01) |
| *G06N 3/0455* | (2023.01) |
| *G06N 3/094* | (2023.01) |
| *G06N 20/20* | (2019.01) |
| *G06V 10/75* | (2022.01) |
| *G06N 3/084* | (2023.01) |

(52) U.S. Cl.
CPC .......... *G06F 18/217* (2023.01); *G06N 20/20* (2019.01); *G06V 10/751* (2022.01)

(58) Field of Classification Search
CPC ............ G06F 18/217; G06F 18/24133; G06N 20/20; G06N 3/045; G06N 3/047; G06N 5/01; G06N 3/084; G06V 10/751
See application file for complete search history.

(56) References Cited

PUBLICATIONS

Zhang et al., "Mitigating Unwanted Biases with Adversarial Learning," Jan. 22, 2018, Copyright c 2018, Association for the Advancement of Artificial Intelligence (www.aaai.org) arXiv:1801.07593v1 (Year: 2018).*

(Continued)

*Primary Examiner* — Kakali Chaki
*Assistant Examiner* — Josep Han
(74) *Attorney, Agent, or Firm* — Norton Rose Fulbright Canada LLP

(57) ABSTRACT

Systems and methods for diagnosing and testing fairness of machine learning models based on detecting individual violations of group definitions of fairness, via adversarial attacks that aim to perturb model inputs to generate individual violations. The systems and methods employ auxiliary machine learning models using a local surrogate for identifying group membership and assess fairness by measuring the transferability of attacks from this model. The systems and methods generate fairness indicator values indicative of discrimination risk due to the target predictions generated by the machine learning model, by comparing gradients of the machine learning model to gradients of an auxiliary machine learning model.

20 Claims, 23 Drawing Sheets

Target model $y = f_{tar}(\mathbf{x})$

Auxiliary model $c = f_{aux}(\mathbf{x})$

(56)　　　　　　　References Cited

PUBLICATIONS

Michael Paul, "Optimization and Gradient Descent," Sep. 11, 2018, INFO-4604, Applied Machine Learning University of Colorado Boulder (Year: 2018).*

"Dot Products and Projections," © 1996 Department of Mathematics, Oregon State University, verified on Internet Archive https://web.archive.org/web/20200218173747/http://sites.science.oregonstate.edu:80/math/home/programs/undergrad/CalculusQuestStudyGuides/vcalc/dotprod/dotprod.html (Year: 1996).*

Shen et al., "APE-GAN: Adversarial Perturbation Elimination with GAN," Sep. 26, 2017 arXiv:1707.05474v3 [cs.CV], accessed on https://arxiv.org/pdf/1707.05474 (Year: 2017).*

Sehwag et al., "Better the Devil you Know: An Analysis of Evasion Attacks using Out-of-Distribution Adversarial Examples" May 5, 2019 arXiv:1905.01726v1 [cs.LG], accessed on https://arxiv.org/pdf/1905.01726 (Year: 2019).*

Sadeghi et al., "Imparting Fairness to Pre-Trained Biased Representations" 2020 IEEE/CVF Conference on Computer Vision and Pattern Recognition Workshops (CVPRW) (Year: 2020).*

* cited by examiner

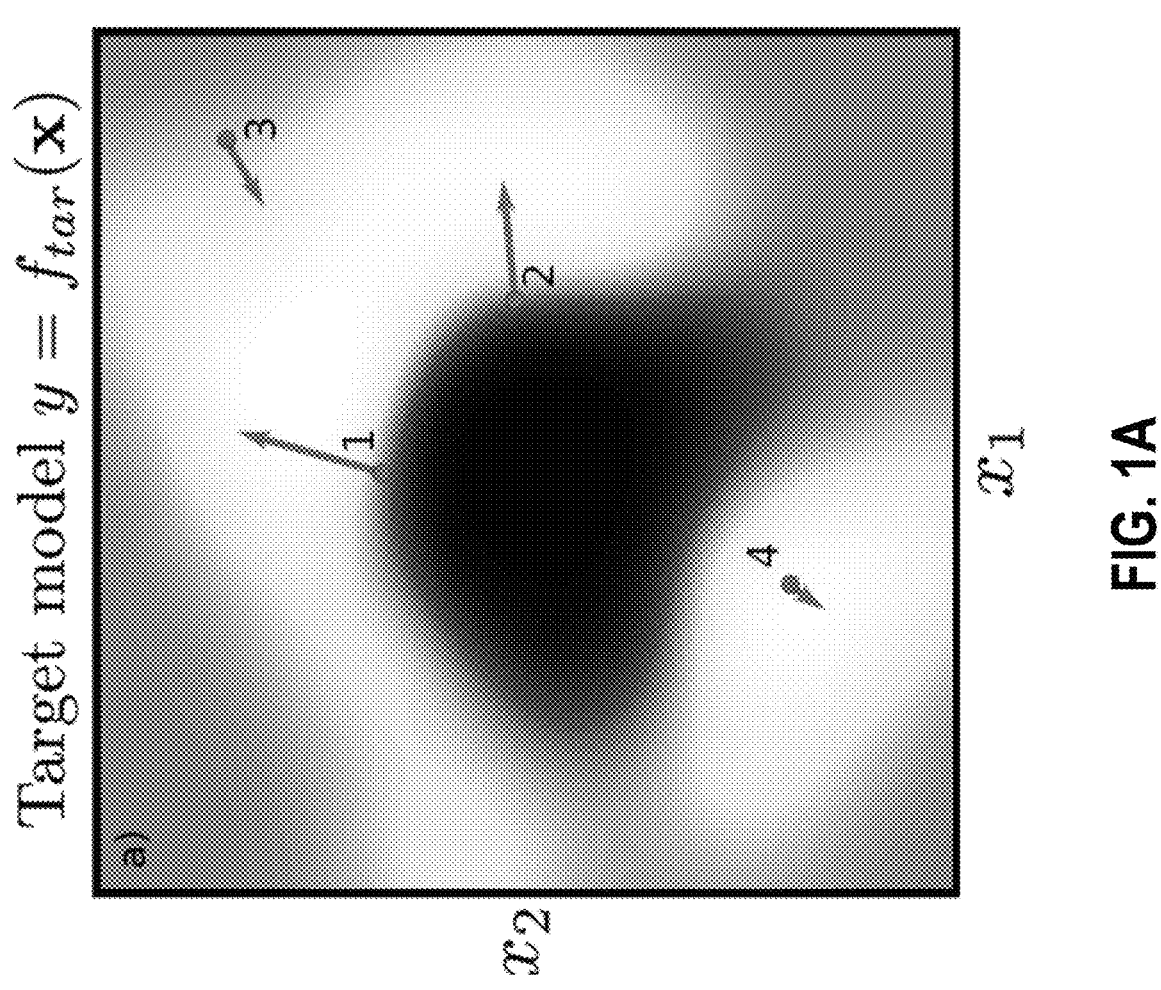
FIG. 1A

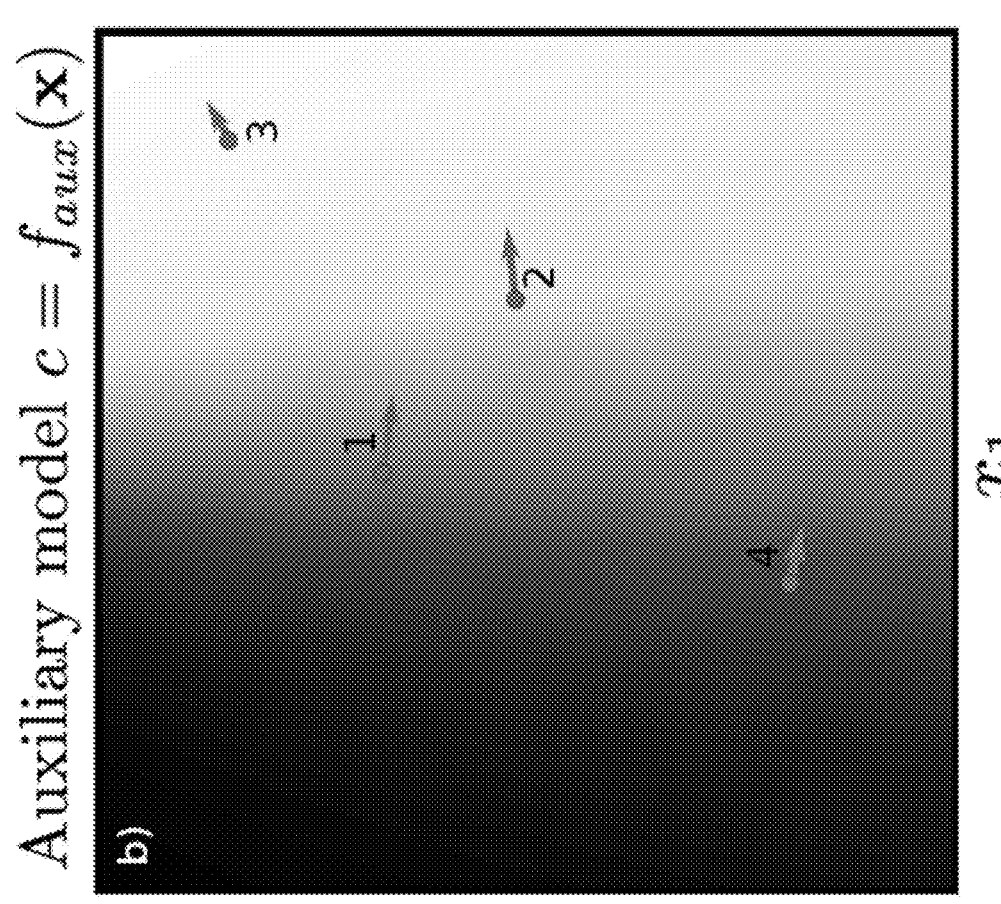
FIG. 1B

100G

100F

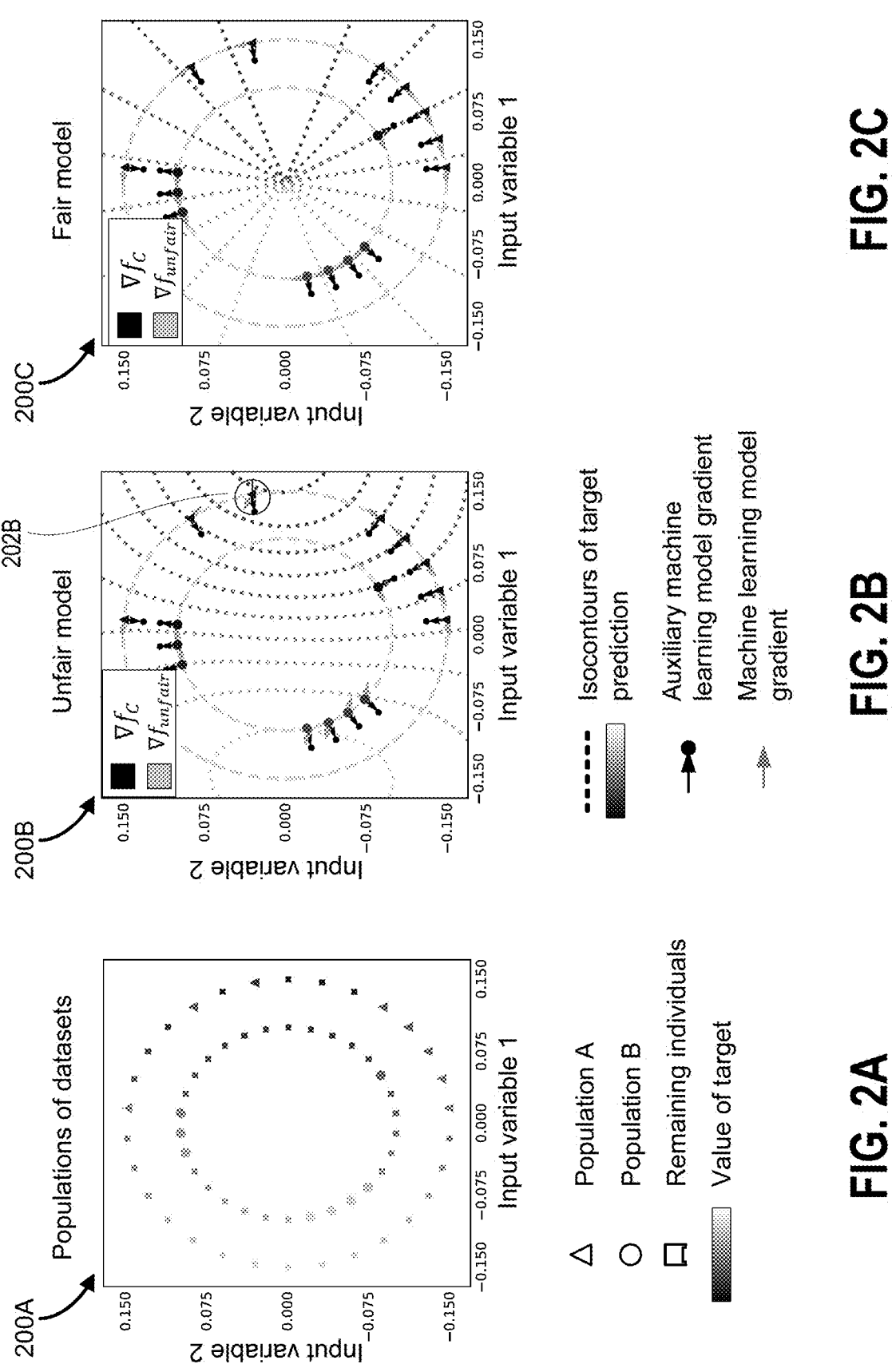

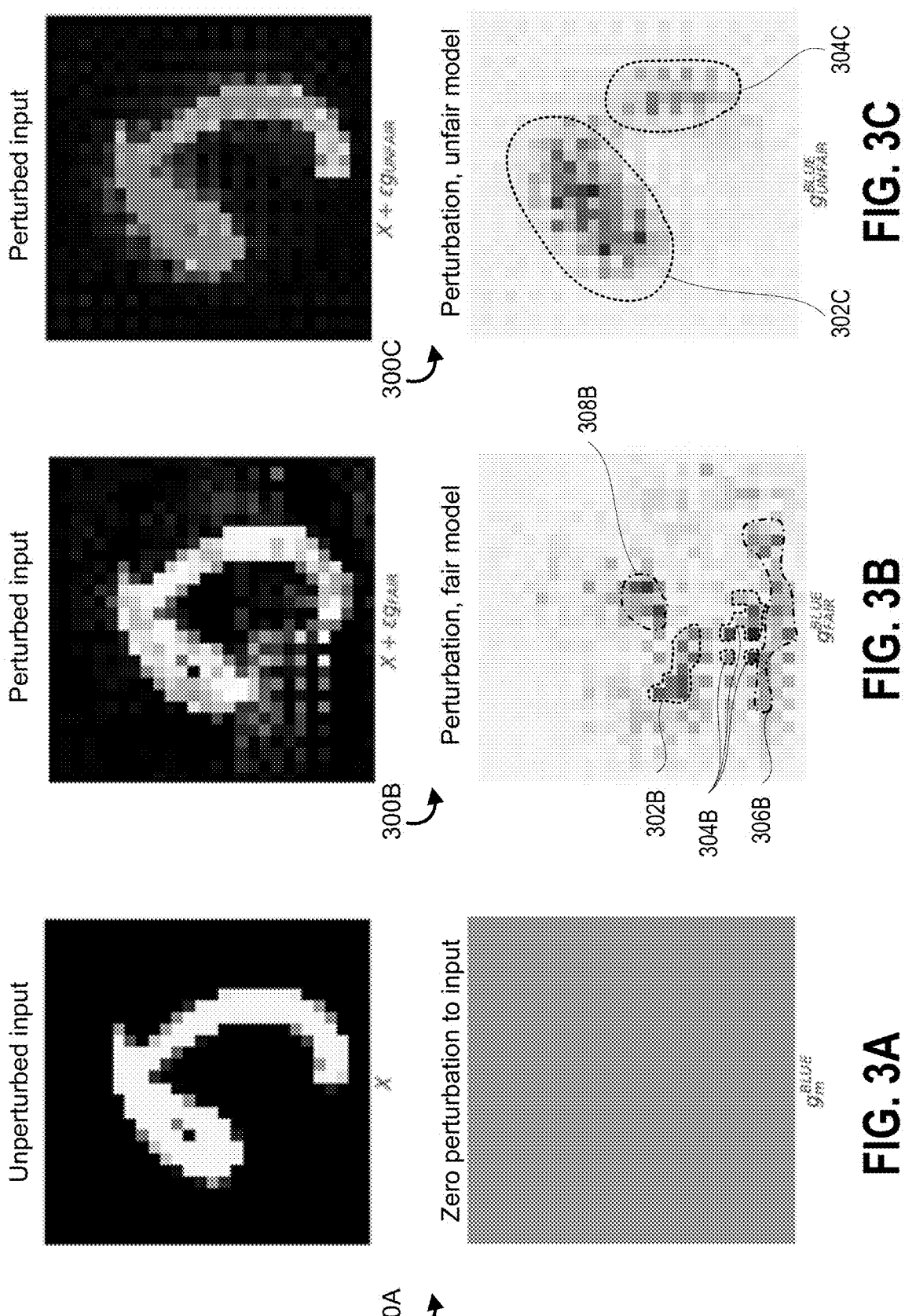

700B

700A

1000A

Algorithm 1: Local independence test

Result: Flag unfair model behaviour

Data: Training data $X$, $Y$, $C$, task predictor $f_Y$, threshold $\delta$

1. Using supervised learning, train auxiliary model $f_C$ to predict $C$ given $X$.

2. Evaluate gradients $\nabla f_Y$ and $\nabla f_C$.

3. The model exhibits unfair behaviour on inputs for which $\left| \dfrac{\nabla f_Y^T \nabla f_C}{\nabla f_C^T \nabla f_C} \right| > \delta$.

Algorithm 2: Iterative FGSM independence test

Result: Flag unfair model behaviour

Input : Task predictor $f_Y$, auxiliary model $f_C$, output metric $d_O$, datapoint $(\mathbf{x}, y)$

Params: Input bound $\epsilon$, loss weight $\lambda$, number of iterations $T$, step size $\alpha$ $\mathbf{x}_0^t \leftarrow \mathbf{x}$ ;

for $t \leftarrow 0$ to $T - 1$ do

$\quad \mathcal{L}_{fair} \leftarrow d_O(y, f_Y(\mathbf{x}_t^t)) + \lambda f_C(\mathbf{x}_t^t)$ ;

$\quad \mathbf{x}_{t+1}^t \leftarrow \mathbf{x}_t^t + \alpha \, \text{sign}(\nabla \mathcal{L}_{fair})$ ;

$\quad \mathbf{x}_{t+1}^t \leftarrow \text{clip}(\mathbf{x}_{t+1}^t, \mathbf{x} + \epsilon, \mathbf{x} - \epsilon)$;

end

Raise flag if $d_O(y, f_Y(\mathbf{x}_T^t)) > |f_C(\mathbf{x}_T^t) - f_C(\mathbf{x})|$

FIG. 10B

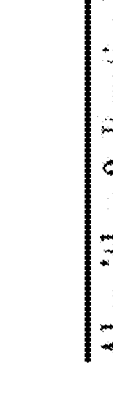

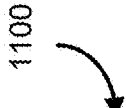
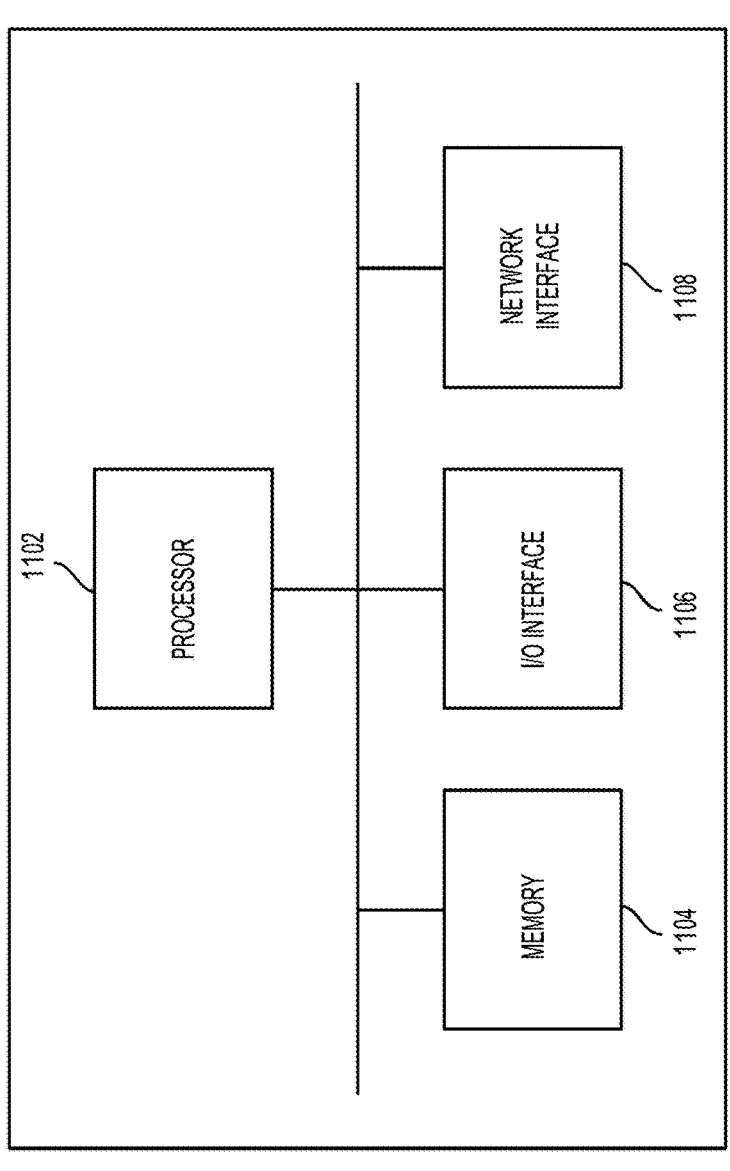
FIG. 11

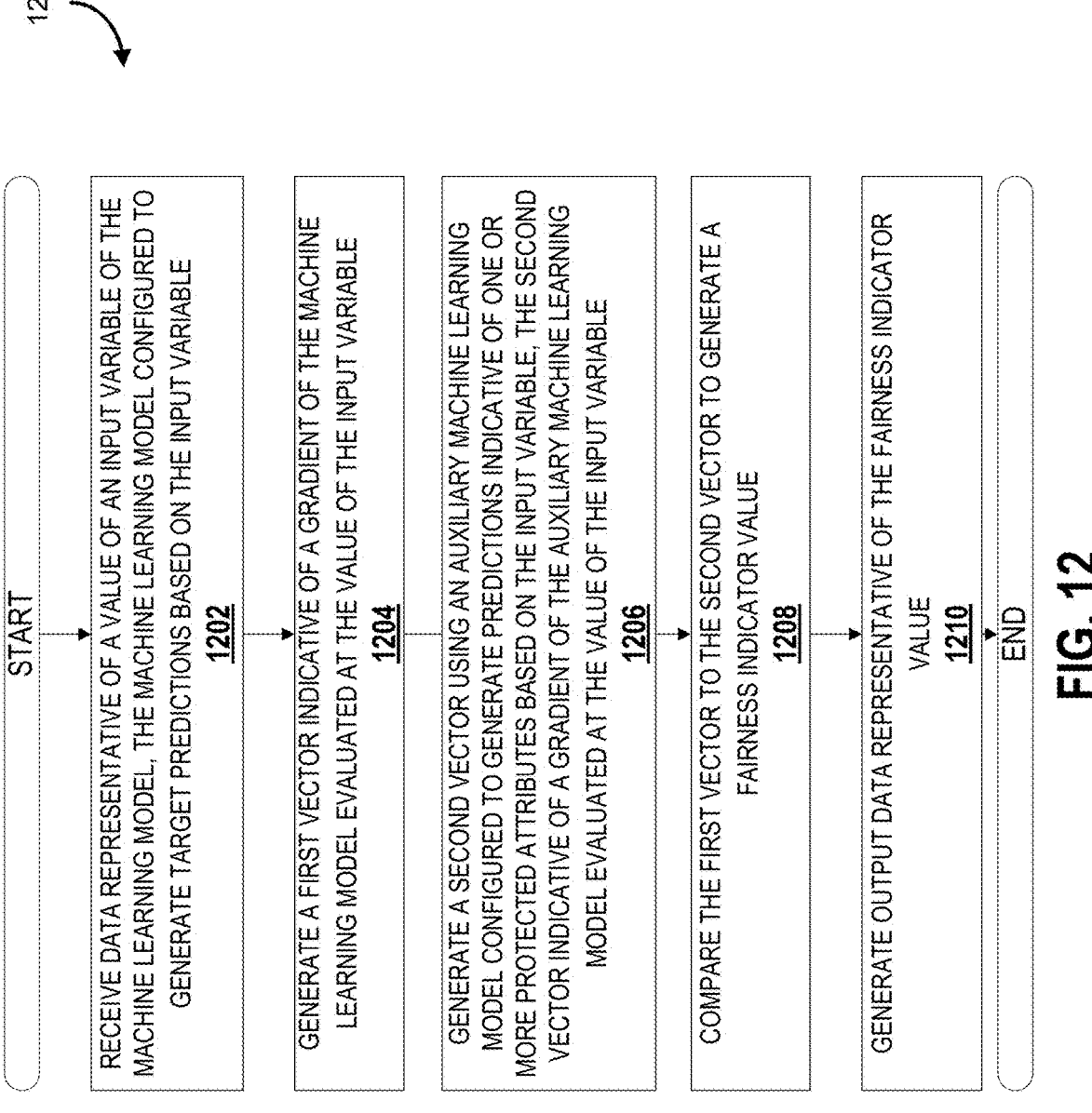

1200

START

RECEIVE DATA REPRESENTATIVE OF A VALUE OF AN INPUT VARIABLE OF THE MACHINE LEARNING MODEL, THE MACHINE LEARNING MODEL CONFIGURED TO GENERATE TARGET PREDICTIONS BASED ON THE INPUT VARIABLE
1202

GENERATE A FIRST VECTOR INDICATIVE OF A GRADIENT OF THE MACHINE LEARNING MODEL EVALUATED AT THE VALUE OF THE INPUT VARIABLE
1204

GENERATE A SECOND VECTOR USING AN AUXILIARY MACHINE LEARNING MODEL CONFIGURED TO GENERATE PREDICTIONS INDICATIVE OF ONE OR MORE PROTECTED ATTRIBUTES BASED ON THE INPUT VARIABLE, THE SECOND VECTOR INDICATIVE OF A GRADIENT OF THE AUXILIARY MACHINE LEARNING MODEL EVALUATED AT THE VALUE OF THE INPUT VARIABLE
1206

COMPARE THE FIRST VECTOR TO THE SECOND VECTOR TO GENERATE A FAIRNESS INDICATOR VALUE
1208

GENERATE OUTPUT DATA REPRESENTATIVE OF THE FAIRNESS INDICATOR VALUE
1210

END

FIG. 12

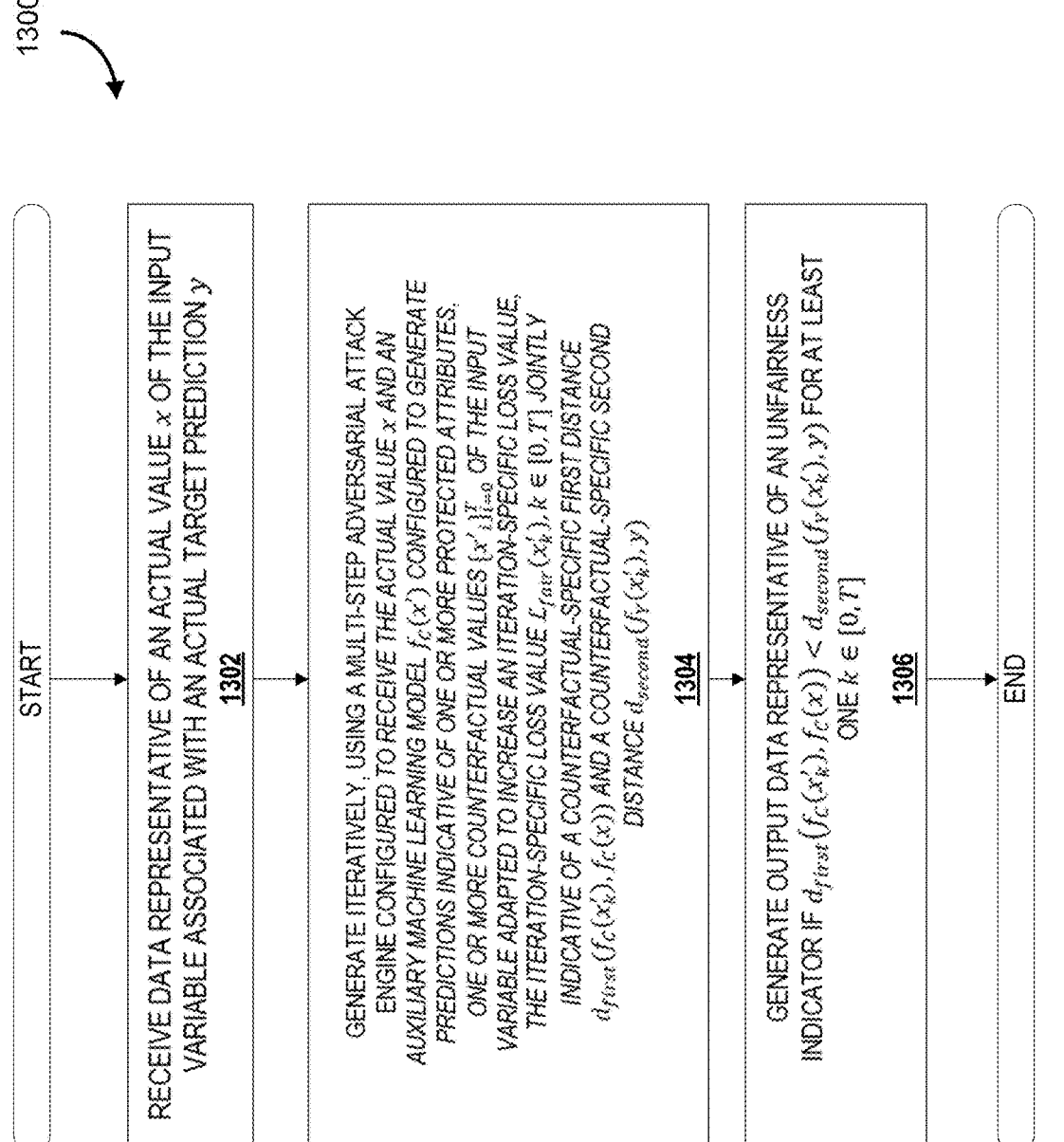

1300

START

RECEIVE DATA REPRESENTATIVE OF AN ACTUAL VALUE $x$ OF THE INPUT VARIABLE ASSOCIATED WITH AN ACTUAL TARGET PREDICTION $y$
1302

GENERATE ITERATIVELY, USING A MULTI-STEP ADVERSARIAL ATTACK ENGINE CONFIGURED TO RECEIVE THE ACTUAL VALUE $x$ AND AN AUXILIARY MACHINE LEARNING MODEL $f_C(x')$ CONFIGURED TO GENERATE PREDICTIONS INDICATIVE OF ONE OR MORE PROTECTED ATTRIBUTES, ONE OR MORE COUNTERFACTUAL VALUES $\{x'_k\}^T_{k=0}$ OF THE INPUT VARIABLE ADAPTED TO INCREASE AN ITERATION-SPECIFIC LOSS VALUE, THE ITERATION-SPECIFIC LOSS VALUE $L_{fair}(x_k)$, $k \in [0,T]$ JOINTLY INDICATIVE OF A COUNTERFACTUAL-SPECIFIC FIRST DISTANCE $d_{first}(f_C(x_k), f_C(x))$ AND A COUNTERFACTUAL-SPECIFIC SECOND DISTANCE $d_{second}(f_Y(x_k), y)$
1304

GENERATE OUTPUT DATA REPRESENTATIVE OF AN UNFAIRNESS INDICATOR IF $d_{first}(f_C(x_k), f_C(x)) < d_{second}(f_Y(x_k), y)$ FOR AT LEAST ONE $k \in [0,T]$
1306

END

Average KS statistic

SYSTEM AND METHOD FOR MACHINE LEARNING FAIRNESS TESTING

CROSS-REFERENCE

This application is a non-provisional of, and claims all benefit, including priority to, U.S. Application No. 63/089,302, filed Oct. 8, 2020, entitled "System and Method for Machine Learning Fairness Testing", incorporated herein by reference in its entirety.

FIELD

Embodiments of the present disclosure relate to the field of machine learning, and more specifically, embodiments relate to devices, systems and methods for automatically assessing fairness of machine learning data model architectures.

INTRODUCTION

The risks associated with algorithmic bias are causing increasing consternation as accelerating adoption of machine learning exposes critical dangers of such bias, if left unresolved. Bias can lead to highly unfair discriminatory outcomes and can perpetuate unfairness and inequity in society. For example, a machine learning model used to determine creditworthiness may inadvertently facilitate discrimination by unfairly denying loans based primarily on a loan applicant's race, gender, zip code, or other factors that may be (non-causally) correlated with economic status. Such biases may reinforce existing disparities and thus marginalized sections of society are particularly vulnerable.

These biases are technically very difficult to track in machine learning models due to the training approaches for machine learning models as it is difficult to reconcile the influence of various factors that yielded a particular output.

The risks of algorithmic bias has made fairness testing an increasingly important aspect of model auditing and validation. In particular, detecting unfair bias in machine learning models before they go into production is of critical importance. In an example design process, a candidate machine learning model is tested (unfairness testing) for potential unfair bias and, if unfairness is detected, is reworked to generate another candidate machine learning model, e.g. by retraining using a cleaned, balanced, or more extensively supported data set. This iterative design process can entail a large overhead in terms of labor and computational resources, particularly if the method of detecting bias is not sufficiently comprehensive or is computationally expensive. In some cases, unfair bias may go undetected if the system used to detect bias is designed around an aggregate metric.

Fairness testing using only statistical metrics to measure aggregate disparities may be insufficient for preventing discrimination at the individual level. Thus, many fairness evaluation methods aim to flag discriminatory model behaviour at the individual level. Existing methods often incur substantial model overhead, which makes them impractical for large-scale applications.

Unfair treatment of different populations by a machine learning models can result in undesired social impact (Rajkomar et al. 2018; Berk et al. 2017; Yucer et al. 2020). There are three main research challenges associated with this problem.

The first is to identify the source of the bias and understand how this influences machine learning models (e.g., Mehrabi et al. 2019; Sun, Nasraoui, and Shafto 2020).

The second challenge is to modify the ML model training strategy to prevent unfair predictions (e.g., Zemel et al. 2013; Yurochkin, Bower, and Sun 2019; Liu et al. 2019; Lahoti, Gummadi, and Weikum 2019a; Ruoss et al. 2020; Yurochkin and Sun 2021).

The final challenge, which is addressed in this paper, is to test the fairness of existing ML models. To test that a model is fair, Applicants must first agree on what is meant by 'fairness'. For all definitions, fairness is defined with respect to protected variables such as race, gender, or age. However, the literature distinguishes between group fairness (equivalent aggregate treatment of different protected groups) and individual fairness (equivalent treatment of similar individuals regardless of their protected group). This paper addresses individual fairness, but even here there are multiple, potentially conflicting criteria (Verma and Rubin 2018).

For example, a common definition (see (Gajane and Pechenizkiy 2017)) is fairness through unawareness (FTU) in which the model should behave as though the protected variable is not present. Conversely, (Dwork et al. 2012) proposed fairness through awareness (FTA), which requires that similar individuals have similar prediction outcomes. (Kusner et al. 2017) emphasized counterfactual fairness (CFF).

This takes a data example and synthesizes a counterfactual example in which the protected variable and its descendants are changed. It requires that the original predictions and those for the counterfactual should be similar. There exist methods to test models with all of these definitions. (Agarwal et al. 2018) and (Galhotra, Brun, and Meliou 2017) use the FTU definition, (John, Vijaykeerthy, and Saha 2020) and (Wachter, Mittelstadt, and Russell 2017) concentrate on the FTA definition, and (Black, Yeom, and Fredrikson 2019) use the CFF principle.

However, each approach has limitations. Features can act as surrogates of a protected variable, which FTU ignores. Using FTA needs domain-specific knowledge to define similarity metrics for inputs and outputs. Using CFF requires building a generative model to produce counterexamples. Moreover, Applicants show experimentally that methods based on FTA can exhibit low precision.

SUMMARY

Rapid progress in machine learning has brought increasing attention to its potential impact on society, especially with respect to algorithmic unfairness. While models may appear to satisfy an imposed performance metric, in reality they may be exploiting unanticipated biases in the dataset. This can be seen, for instance, in racial bias of COMPAS recidivism prediction, and gender bias of hiring models used in particular industries. Fairness testing is becoming an increasingly important aspect of model auditing. Unfairness and bias incorporated into machine learning models can led to discrimination and reinforces historical prejudices, as well as societal inequities. Access to financial services and products is critical for socioeconomic mobility, which itself is a key ingredient for alleviating injustice and addressing. As machine learning models are more widely adopted to reduce cost of financial services—itself important for accessibility—it is desirable that the models do not cause greater harm. Such discrimination may be subtle and, over time, may have devastating cumulative effects on an individual without their cognizance. Diagnostic tools (systems and methods) for fairness and fairness testing are very important to prevent harm. Such systems and methods may be part of a model audit and/or validation process or system. However, evaluating machine learning models for fairness is a non-trivial technical problem as it is not easy to conduct such determinations consistently, and at scale for enterprise-level machine learning models, especially given finite amounts of computational resources, computing time, data storage, and processing resources.

Tests for fairness used in various systems and methods may be divided according to their granularity. Group fairness employs statistical metrics to measure aggregate disparities between different populations, and mandates they be small. Individual fairness mandates that models offer similar treatment to similar individuals. Tests of group fairness are often included in open-source toolboxes. However, tests of group fairness offer model developers relatively little insight into the underlying mechanism of discrimination. This is especially important in light of an individual's right to demand an explanation and particularly because an individual may not realize they are being discriminated against, e.g. if an individual is subject to racial discrimination due to machine learning model in deployment that does not discriminate based on an aggregate statistical metric but may very well inflict harm on individuals (e.g. flagging users to issue non-waivers with respect to various penalties and fees). In contrast, while tests of individual fairness can assess who is being discriminated against, they often require substantial overhead, in the form of task specific metrics, aligned datasets (also Fairness Through Awareness), or generative models. The total global computational overhead associated with fairness testing of machine learning models may be very high, especially taken cumulatively over time, and may grow with increasing machine learning adoption. This will lead to increased global energy consumption and attendant greenhouse gas emissions. It is therefore important to improve computation to reduce overhead. The additional components, which often involve unsupervised modelling, may also necessitate further, and less well defined, auditing (i.e. a cascade of audits), with attendant risks.

Aspects disclosed herein provide for efficient computer-based systems and methods that provide for computationally efficient (e.g., in view of finite computing resources) methods for quantifying or estimating fairness (or an opposite, discrimination risk) of a machine learning model configured to generate target predictions based on an input variable. The approaches herein are directed to a computer implemented approach and computer implementation of a mechanism for testing individual fairness via gradient alignment. A novel criterion for evaluating individual fairness and a practical testing method is proposed based on this criterion which Applicants describe $f_{Aux}$ (pronounced fox).

An approach is thus proposed using $f_{Aux}$, a technical framework for individual fairness testing which avoids certain difficulties of prior approaches. This approach is a technical solution based on comparing the derivatives of the predictions of the model to be tested with those of an auxiliary model, which predicts the protected variable from the observed data. Applicants demonstrate that the proposed method effectively identifies discrimination on both synthetic and real-world datasets, and has quantitative and qualitative advantages over contemporary methods.

The contributions are as follows: first, there is proposed a simple criterion for individual fairness testing: for a fair model, the derivative of the model prediction with respect to the protected variable should be small. Second, Applicants introduce an auxiliary model which describes the relationship between the input features and the protected variable and show how to use this to help evaluate this criterion. This auxiliary model can be separately maintained and used for adversarial analysis, such that fairness testing data values can be output from an automated fairness testing computing device or service. This is useful for evaluating machine learning models for potential re-training/re-engineering, flagging for unfairness, or selecting among multiple candidate machine learning models.

Applicant specifically focus on unfair treatment that is created by the presence of historical bias in datasets (Suresh and Guttag 2019). Third, to evaluate fairness testing effectiveness, Applicants present a novel synthetic data generation method that merges multiple real datasets through the probabilistic graphical model to flexibly simulate realistic data with controllable bias levels.

The method does not require explicit identification of features sensitive to the protected variable, nor does it require a generative model for the data. In particular, the proposed method does not rely on similarity metrics specified by a domain expert. Instead, the metrics are derived in a principled fashion from a Local Independence Criterion.

Applicants show that the performance of the approach is superior on both synthetic and real datasets, and is more computationally efficient than alternatives. Validation and experimental considerations are described to assess how successfully a proposed fairness testing system performs in flagging individual discrimination. Tests were conducted against selected datasets (e.g., coloured MNIST), and unfairness was evaluated by aggregating counterexamples. As shown in validation, the proposed auxiliary model $f_c/f_{aux}$ that is adapted to approximate local changes in group membership is effective, and that the auxiliary approach is more precise relative to certain alternate approaches and simpler to implement than other alternate approaches.

The target predictions may be associated with or lead to discrimination. The systems and methods may provide fairness quantification that is fine-grained or as fine-grained as desired. For example, a separate unfairness or bias indicator value may be computed for each individual separately, i.e. for each input to the machine learning model.

An auxiliary model, e.g. an auxiliary machine learning model having a supervised learning architecture and trained using an existing dataset, is configured to generate predictions of one or more protected attributes (e.g. race or gender) based on the input variable is used as an adversary model that attempts to predict protected attributes. In particular, the auxiliary model is adapted for adversarial attacks to predict protected variables. The adversarial attacks can be used, for example, to identify individual violations, and the maintained auxiliary model acts as a local surrogate for identifying group membership, and a proxy for estimating fairness can be obtained from measuring the transferability of attacks from this model. The use of auxiliary models is useful as Applicants found that the proposed framework was not only able to flag individual discrimination, it also incurred relatively little modelling overhead.

In some embodiments, unfairness or the bias indicator increases when the gradient of the auxiliary model is more aligned with the gradient of the machine learning model. When the alignment exceeds a predetermined threshold, the model may be flagged as unfair. When there is orthogonal alignment, the machine learning model is said to be completely fair, as the ability of the auxiliary model to predict a protected variable is hampered: small perturbations in the input variable lead to target predictions that are not associated with changes in the protected attribute. A heat map may be generated for the input space showing the bias indicator values.

Additionally, aggregate metrics may be generated, e.g. L-p norms of the bias indicator values, to assess an overall fairness of the (machine learning) model. For example, bounding the L-infinity norm may ensure all bias indicators are below a given predetermined threshold.

In some embodiments, the auxiliary machine learning model is a supervised learning model trained at least partially based on known values of the one or more protected attributes. The auxiliary machine learning model therefore incurs low computational overhead and can be widely deployed quickly and at low cost.

Aspects disclosed herein provide for computer-implemented systems and methods that aim to detect individual violations of group definitions of fairness, by using adversarial attacks that aim to perturb model inputs to generate individual violations, i.e., local in the space of model inputs. In this respect, fair attacks require perturbations that are only associated with changes in group membership, which is a strong check on bias, as it does not rely on aggregate metrics.

In various embodiments, an auxiliary model is used as a local surrogate for identifying group membership, and fairness is assessed by measuring the transferability of attacks from this model. In various embodiments, the auxiliary model may be trained using only supervised learning. Various embodiments of systems and methods are demonstrably able to accurately and precisely flag individual discrimination while incurring little modelling overhead, thus providing a powerful tool to prevent unfair bias in machine learning models.

In aspects disclosed herein, systems and methods are provided that enforce group measures of fairness locally by leveraging an auxiliary model to support model fairness estimation. In various embodiments, efficient fairness testing is achieved by estimating a target or candidate model's sensitivity against protected variables using an adversarial attack on the auxiliary model that predicts protected variables (attributes). Various embodiments of systems and methods are demonstrably effective for both group and individual fairness testing, e.g. as demonstrated by empirical results on both real and synthetic datasets.

Aspects disclosed herein redefine fairness testing in a way that is compatible with tools for testing adversarial robustness. There are several advantages apparent in various embodiments, e.g. flagging of unfair behavior at the individual level, and a more fine grained understanding of the mechanism of discrimination via counterexamples generated by the system. There are other approaches which aim to offer a similar level of granularity, but they may require sophisticated generative models. By contrast, the present approach is amenable and only requires supervised learning methods. A framework for quantifying bias inside of machine learning datasets may be employed for a variety of purposes.

The approach described herein is practically implemented using computers and computing devices, and in an embodiment, is provided as a specialized computing system that is configured to receive input data sets representative of models (e.g., trained models), and generate output values or control signals based on an estimated fairness score. For example, an output value could be a data value (e.g., from 0 to 1) indicating a estimated level of fairness that is provided to a downstream computing system for coupling to the model (e.g., as metadata). The system is useful as, although data provided to a model does not directly include discriminatory data as a feature set, the discrimination may nonetheless still be present as the model is developing conditions through proxy features (e.g., neighborhood data or postal codes). The proposed system is useful as it allows for a mechanism to assess otherwise "opaque" machine learning models.

The downstream computing system, for example, could be a model selector subsystem that is configured to control routing or selection of various models for use, and it may be configured to not route or not select models having a fairness score greater than a pre-defined threshold if there is another option. In a variant embodiment, the downstream computing system could be configured to always select a most fair option from a set of candidate models.

In another variant embodiment, the model selector subsystem is a computing module that is also provided by the specialized computing system and the specialized computing system instead generates output control signals indicating which model to use or which model is most fair, and uses the model to generate an output (e.g., a classification output).

The specialized computing system can be provided as a specialized computing system operable within a data center, such as a computing appliance that is coupled to other computing systems using a message bus or a message broker middleware. The models themselves can be provided, or in other embodiments, access to the models can be provided if the models reside on coupled data storage.

As a non-limiting practical example, the specialized computing system can be implemented for use at a financial institution, where machine learning models are utilized to aid in decision making in respect of banking decisions, such as holistic considerations for assessing loan decisions (e.g., approval/disapproval decisions, interest rate setting based on risk profiles), credit scores, among others. The system can aid in supporting anti-discrimination policies to promote models that are more fair.

In an alternate embodiment, the specialized computing system is utilized as an auditor or adjudicator subsystem that receives input models, and is configured to automatically flag or cause the models to be re-trained, re-engineered, or removed from service for an estimated fairness violation. Fairness violations can be assessed for individual grounds of unfairness through the setting of variables, such as age, race, ethnicity, disability, refugee status, among others.

Re-training can include resetting or randomizing model weights and re-conducting training, training with different training sets, among others (e.g., re-training a model using training set B instead of training set A). Re-engineering can include changing the structures of the models or removing features or nodes from analysis from the models (e.g., changing the possible input feature sets or removing nodes from the latent space). Removal from service can include flagging a model as unfair such that downstream systems are restricted from using the model (e.g., setting a Model.isFair variable to FALSE).

Other potential uses can include models for determining eligibility or premiums for insurance, determining eligibility for social programs, scholarships, job interviews, predictive policing, credit cards, among others.

Corresponding machine-interpretable instruction sets for implementing the specialized computing system are contemplated, the machine-interpretable instruction sets being stored on non-transitory computer readable media and executable on one or more computer processors.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1A and FIG. 1B are pictorial representations of a target model and an auxiliary model, according to some embodiments.

FIG. 2A is a graphical representation of a dataset with two populations in concentric circles, denoted by circles and triangles.

FIG. 2B is a graphical representation of gradients of a (candidate) model having unfair bias and that of an auxiliary model configured to predict membership in a population.

FIG. 2C is a graphical representation of gradients of a fair (candidate) model and that of the auxiliary model.

FIG. 3A is a visual representation of an example zero perturbation input of machine learning models configured to generate target predictions of the digit in the input, as either 0 or 9, and where color is a protected attribute.

FIG. 3B is a visual representation of an example perturbation of the input of FIG. 3A along a gradient of an example fair machine learning model, where the gradient is relatively less aligned with a gradient of an auxiliary machine learning model.

FIG. 3C is a visual representation of an example perturbation of the input of FIG. 3A along a gradient of an example unfair machine learning model, where the gradient is relatively less aligned with a gradient of an auxiliary machine learning model.

FIG. 10A is an exemplary algorithm for fairness testing, showing an approach for a local independence test using supervised learning and a trained auxiliary model fc/faux.

FIG. 10B is an exemplary algorithm for fairness testing, showing an approach for an iterative FGSM independence test.

FIG. 11 is an example computing device, according to various embodiments.

FIG. 12 is a process diagram of an exemplary method for diagnosing fairness of a machine learning model.

FIG. 13 is a process diagram of an exemplary method for fairness testing of a machine learning model using adversarial attack.

DETAILED DESCRIPTION

Figures 1C, 1D, 1E:
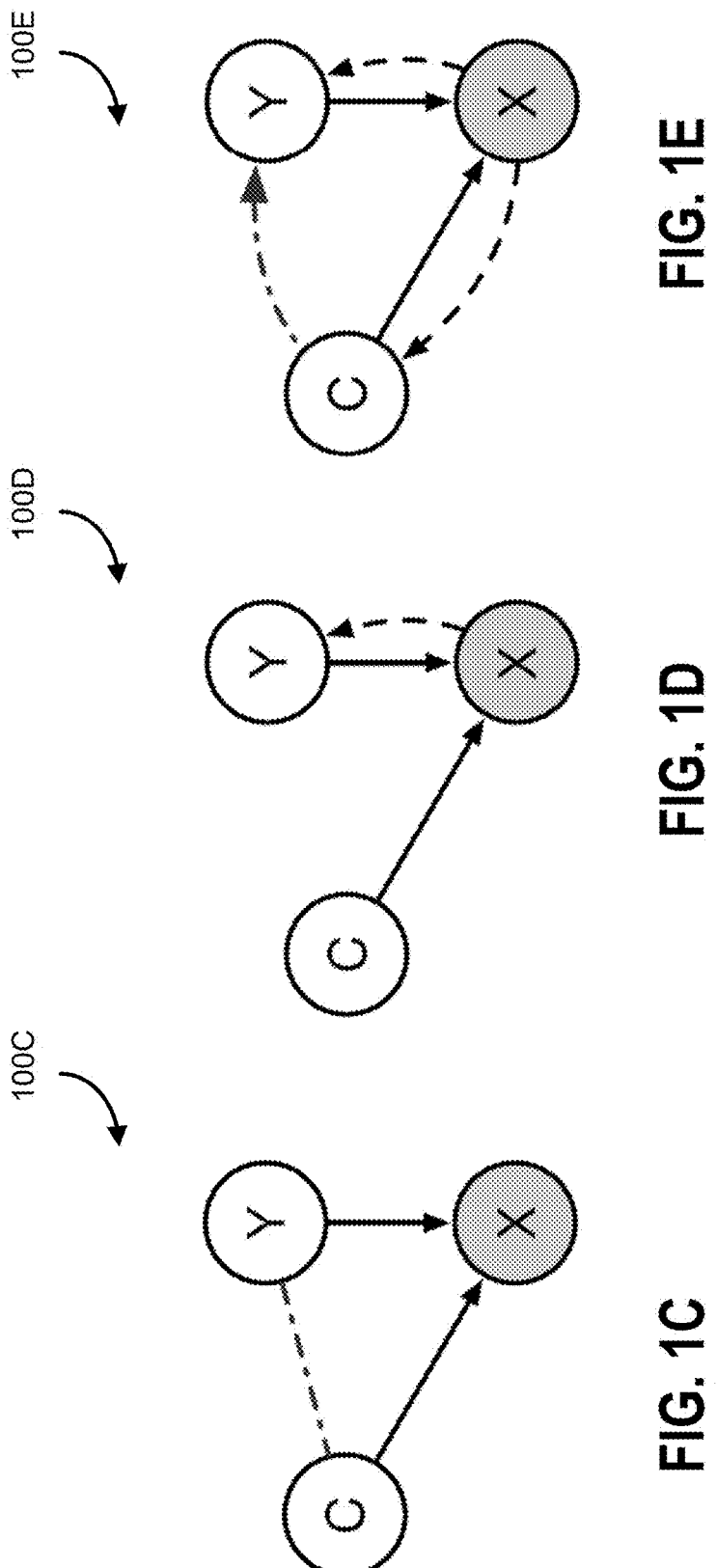
FIGS. 1C, 1D, and 1E are graphical models provided to show how historical bias causes unfairness.

Aspects disclosed herein provide an individual definition of fairness, which assesses the change in a model's outputs based on perturbations to a surrogate model, which may be related to concepts of adversarial robustness and individual fairness.

An improved, computer implemented approach is described that utilizes an auxiliary model that is adapted to support model fairness estimation of a target model. The auxiliary model is a machine learning model that is specifically adapted to utilize adversarial attacks that predict protected variables, being adapted to estimate the target model's sensitivity against protected variables, which yields efficient fairness testing. Bias may be obtained from different sources, such as representation bias, historical bias, measurement bias, among others.

The approaches described herein are practically implemented in the form of computing devices or servers that include computer processors, memory, and data storage, and methods that operate thereon or are residing as machine readable instruction sets stored in non-transitory computer readable media. The computing devices or servers establish an auxiliary model as a local surrogate for identifying group membership, and it is trained using supervised learning as described in various embodiments herein.

A target model is provided as an input, and the system is configured to generate a computational output (e.g., a data set or downstream re-training or modification instructions) based on a determination of fairness using the auxiliary model. The auxiliary model utilizes technical features of adversarial robustness as it relates to a constrained optimization problem, and can be utilized to evaluate fairness, especially at the level of an individual.

An auxiliary model is utilized because the access to the full generative model is not available. The auxiliary model is a model that is trained to predict group membership from inputs, and it acts as a technical surrogate as a useful approximation of a true derivative of the data generating model.

FIG. 1A and FIG. 1B are pictorial representations of a target model and an auxiliary model, according to some embodiments. At the heart of the approach is a consideration where if one adjust the model input so that the predicted protected variable changes, then the model output should not change. FIG. 1A is a pictorial representation 100A of a target model predicts y from inputs x. In this example, one would aim to test model fairness at points 1, 2, 3, and 4.

To do so, it is proposed to construct an auxiliary model shown in pictorial representation 100B on FIG. 1B that predicts protected variable c from inputs x. $f_{Aux}$ compares gradients of the two models (arrows illustrated on the drawings). Point 2 is unfair because the target and auxiliary model gradients are large and parallel; the model prediction changes as the protected variable changes. The other points are fair since the gradients are orthogonal (point 1) or one or other gradient is small (points 3, 4).

The technical approach is to determine, that the model output for a given example does not vary rapidly as a function of a particular protected variable. Examples are provided below of types of discriminatory model behaviours which can be automatically caught by the approach described herein. Variants are described in relation to potential extensions of the approach. An extension, can include further computing aggregate covariance matrices for flagging problematic correlations.

For example, a specialized machine learning fairness testing server could be coupled to a message bus of an enterprise data center, and the specialized machine learning fairness testing server is configured to evaluate machine learning models and, in a variant embodiment, automatically toggle whether a model should be deployed for production use, or flag a model for downstream re-training or non-use. This is particularly useful for sensitive models, such as those used for loan provisioning, grant awarding, hiring decisions, etc. Experimental approaches relating to coloured MNIST are described an example.

In this section, Applicants introduce notation, review definitions of individual fairness and summarize their limitations. The definition of fairness is described in a view that connects the earlier ones and forms the basis for a novel fairness test that is introduced and evaluated using corresponding computer implemented systems as proposed in various embodiments herein.

The following notation is adopted:

X: Feature (input) variables. When features are observed, Applicants use x to represent the feature vector.

Y: Prediction (output) variables. When a label is observed, Applicants use y to represent the label as a scalar. As Applicant can conduct fairness testing on binary classification tasks, for example the prediction y can be a probability.

C: Protected variables (e.g., gender). Applicants use c to represent the observed values.

$\phi$: Distance metric $\phi_{in}(\bullet, \bullet)$ denotes a metric of input space, and $\phi_{out} (\bullet, \bullet)$ a metric of output space.

$f_{tar}$: Target function for fairness testing. This takes features x as input and produces a prediction $\hat{y}$.

$f_{aux}$: Auxiliary model. This takes features x as input and produces predictions c for protected attributes C. In this disclosure, sometimes this auxiliary model is denoted as $f_c$.

For consistency, the following notation is employed throughout unless otherwise stated or indicated:

Let C be a (or one more) protected attribute(s), e.g. a sensitive attribute indicating membership in a certain population, and let X denote the attributes (input variables to the machine learning model), e.g. observable attributes of a given individual.

Individual fairness describes the tolerable discrepancy of model predictions at an individual level (i.e., for one data point). This can reveal hidden unfairness that can't be identified at an aggregate level using a group fairness criterion.

Furthermore, let Z refer to a collection of latent or separate variables, e.g. unobserved latent variables, and Y a variable which may serve as the target of a supervised learning problem, i.e. the machine learning model may generate target predictions based on the input variables. To this end, using a machine learning algorithm, a machine learning model $f_Y$ may be trained to infer the value of Y given X. Such a model may be referred to as the task predictor, and it may output a score $S_Y$ that may be turned into a prediction for Y.

To facilitate discussion of the bias in machine learning models, a running example is introduced that models if an individual should be hired for a programming job. Here, the targets Y may denote the candidate's knowledge, and Z may denote latent factors of personality, like degree of introversion. The candidate may identify as a member of a certain race, which defines the sensitive attribute C.

Applicants now describe the three definitions of individual fairness (see Mehrabi et al. 2019, for others).

Fairness Through Unawareness (FTU) states that: A predictor is said to achieve fairness through unawareness if protected attributes are not explicitly used in the prediction process. A model can satisfy the FTU definition by either excluding the protected attributes C as input during training or by ensuring that perturbations to C do not affect predictions.

Fairness Through Awareness (FTA) states that: Similar individuals should be treated similarly. Given two observations (xi; yi) and (xj; yj), a model ftar satisfies this definition when the Lipschitz property holds:

$$\phi_{out}(f_{tar}(x_i), f_{tar}(x_j)) \le \phi_{in}(x_i, x_j)$$

where and $\phi_{in}(\supseteq, \bullet)$ and $\phi_{out}(\supseteq, \bullet)$ are distance metrics in the input and output spaces.

Counterfactual Fairness (CFF) stipulates that prediction variables Y should not causally depend on protected variables C when holding other features X constant. Given observed feature x, prediction y and protected variables c, counterfactual fairness holds if:

$$P(y|x,c) = P_{C \leftarrow do(c')}(y|x,c)$$

where the do($\bullet$) operation (Pearl et al. 2009) changes protected attributes from c to c' during inference. To apply this operation, one would need a generative model that explicitly describes the causal structure of the variables.

There are many reasons why models exhibit discriminatory behaviour (Mehrabi et al. 2019; Suresh and Guttag 2019), but one of the most common is the mishandling of historical bias in the training data (Fuchs 2018). Here, preexisting prejudices create a misalignment between the collected data and the goals of the model (Suresh and Guttag 2019) and models may learn to propagate this bias via their decisions.

FIGS. 1C, 1D, and 1E are graphical models provided to show how historical bias causes unfairness. FIG. 1C shows a generation process of a biased training dataset 100C. The dashed line denotes that Y and C may have correlations due to historical bias. In FIG. 1D, a fair model 100D is shown to learn to infer Y while cancelling the impact from protected variables C. Solid arrows show generative dependence. Dashed arrow shows learned inference mapping. In FIG. 1E, an example unfair model 100E infers the protected variables to support the prediction.

FIG. 1C shows the potential data generation graph, where the label Y and protected attributes C may (or may not) correlate due to the historical bias. A fair model (FIG. 1D) would learn to infer label Y by disentangling the impact from the protected variables C. In contrast, an unfair model (FIG. 1E) implicitly infers the protected variables to support its prediction of the label Y. The limitations of the FTU and FTA approaches are easily understood in terms of this graphical model. Models that meet the FTU definition are not guaranteed to be fair (Barocas, Hardt, and Narayanan 2019) since they overlook correlation between features X and protected variables C. Discrimination persists when the feature becomes a surrogate for the protected variables. One might expect tests based on the FTU to have low recall since they are insensitive both to the protected variable and to discrimination induced by these surrogates.

Tests based on FTA potentially have the opposite problem; they are sensitive to both unfairness induced directly by the protected variable and indirectly via surrogate features. However, since these tests are based on distance metrics, they are also sensitive to other changes such as adversarial examples in which a small change in the input can create a large change in the prediction.

Hence, one might expect them to have low precision. Applicants illustrate these limitations in a below section describing use cases. With access to a causal generative model, CFF can recognize surrogate features and the decisions that result from them. However, training such models with unsupervised learning is hard (Salimans et al. 2016; Srivastava et al. 2017) and the testing procedure can produce misleading conclusions if the generative model is ill-defined or inaccurate.

Applicants now describe a refined definition of individual fairness that connects the three definitions described above. Assume that the observed features x were generated from underlying latent variables $z_\perp$ and $z_\parallel$ by a unknown function $f_g$:

$$x = f_g(z_\perp, z_\parallel),$$

where $z_\perp$ denotes latent vectors with no correlation with the protected variables c, and $z_\parallel$ is influenced by the protected attributes C through a unknown function $z_\parallel = \psi(c)$.

Definition 1 A model $f_{tar}$ is individually fair, if it produces exactly identical outcomes when given input feature vectors $x_i$ and $x_j$ which share the same latent vector $z_\perp$:

$$f_{tar}(x_i) = f_{tar}(x_j),$$

where $x_i = f_g(z_\perp, \psi(c))$ and $x_j = f_g(z_\perp, \psi(c'))$.

While the latent variables or generative functions may not be observable/recognizable in general, the above definition holds in practice whenever x can be partially influenced by protected attributes c.

This connects the three earlier notions of individual fairness:

Fairness through unawareness: The refined definition is related to FTU in that it stipulates models be insensitive to changes in protected variables. However unlike FTU, it is aware of the influence of the protected variables on the features.

Fairness through awareness: The refined definition belongs to the family of FTA as it provides concrete input and output similarity metrics; it states that an arbitrary change in the latent variable $z_\parallel$ should result in a negligible change in the output $f_{tar}(x_i)$.

Counterfactual fairness: The refined definition leverages a generative model, and tests model fairness by modifying latent variables that are correlated with the protected variable.

Applicants propose a novel fairness testing method that is based on Definition 1 and show that it does not suffer from the limitations described previously. The approach starts by using the graphical model in FIGS. 1C-1E to propose a criterion for individual fairness based on conditional independence of the target and protected variables given the observed data. This is used to motivate the Local Independence Criterion (LIC) which examines whether a model suffers from historical bias, and show that this satisfies Definition 1. Finally, Applicants introduce the Auxiliary Model as a technical solution which can be used to create a practical test.

A sufficient condition for a model to violate the individual fairness definition described in Definition 1 is if its prediction depends on the protected attribute c.

Applicants, therefore, consider revealing such prediction dependence through a local condition such that:

$$\frac{\partial f_{tar}(x)}{\partial c} \neq 0,$$

which indicates the potentially discriminating prediction, seeing as the prediction is sensitive to a small perturbation of protected attributes c. Considering the inevitable noise introduced by the machine learning model and data, Applicants may relax the above expression with a pre-defined tolerance $\delta$ in practice.

Theorem 1: Assuming there exists a generative model $f_g$ that influences features X with protected variables C such that $x = f_g(z_\perp, \psi(c))$, if a machine learning model $f_{tar}$ violates Local Independence Criterion (LIC)

$$\left| \frac{\partial f_{tar}(x)}{\partial c} \right|_\infty \leq \delta,$$

with a pre-defined threshold $\delta$, then the model $f_{tar}$ violates the individual fairness criteria in Definition 1. A simple proof is provided further in this description.

To use the LIC, one needs to estimate the derivative $\partial f_{tar}(x)/\partial c$. The chain rule is used to yield:

$$\left| \frac{\partial f_{tar}(x)}{\partial x} \frac{\partial x}{\partial c} \right|_\infty \leq \delta.$$

Unfortunately, the term $\partial x/\partial c$ is undefined without accessing the underlying generative model that maps protected variables C to the features X and this is rarely available. Note, the protected variables C are not necessarily continuous as Applicants will model the mapping through an auxiliary model later.

An approximation of $\partial x/\partial c$ is thus suggested that requires neither generative model nor attempts to model the latent representations $z \in Z$.

One approach would be to build a model to predict x from c and use the derivative of this model to approximate $\partial x/\partial c$. However, the number of protected variables is often far smaller than the feature size, and so this would lead to a poor approximation. Instead, Applicants build a model in the opposite direction; Applicants describe the mapping from features X to the protected variables C using an auxiliary model $c = f_{aux}(x)$.

In this approach, this model is then inverted in a local neighbourhood around a given point $x_0$, to approximate the desired derivative. While this approximation can potentially yield low-fidelity reconstructions of x, additional fidelity may require modelling factors of x that are independent of c. Hence, this approach avoids the need for high-fidelity since the end goal is estimating the partial derivative of $$\frac{\partial x}{\partial c}$$

only.

To this end, given this auxiliary model $f_{aux}$ the proposed approach applies the Taylor expansion around $(x_0, c_0)$:

$$c - f_{aux}(x_0) \approx \left(\frac{\partial f_{aux}(x_0)}{\partial x_0}\right)^T (x - x_0)$$

where Applicants replaced $c_0$ with its prediction $f_{aux}(x_0)$. The left-hand side denotes the change in the space of protected attributes. The right hand side is a Jacobian vector product.

Applicants then apply the Moore-Penrose pseudo-inverse to find the minimum norm solution for x:

$$f_{aux}^{-1}(c) = x_0 + (c - f_{aux}(x_0))(\nabla f_{aux}^{\top} \nabla f_{aux})^{-1} \nabla f_{aux}^{\top}$$

where one uses $\nabla f_{aux}$ to denote $\partial f_{aux}(x_0)/\partial x_0$. This allows the approach to approximate $\partial x/\partial c$ by $$\frac{\partial x}{\partial c} \approx \frac{\partial f_{aux}^{-1}(c)}{\partial c} = (\nabla f_{aux}^T \nabla f_{aux})^{-1} \nabla f_{aux}^T.$$

Finally, by combining two of the earlier Equations, one can approximate the LIC with:

$$\left| \nabla f_{tar} (\nabla f_{aux}^{\top} \nabla f_{aux})^{-1} \nabla f_{aux}^{\top} \right|_{\infty} \le \delta$$

where Applicants use $\nabla f_{tar}$ to denote $\partial f_{tar}(x_0)/\partial x_0$.

While the basic $f_{Aux}$ described above is sufficient for an individual fairness test, it depends heavily on the behaviour of $\nabla f_{tar}$, which may be ill-conditioned. Applicants introduce several variant embodiments of the basic $f_{Aux}$ method.

Normalization of Gradient (fAux+NG): Different features may have very different valid ranges and so the gradient of either the target or the auxiliary model could be biased towards a subset of features. To mitigate this problem, one can use an $l_2$ normalization of the gradients to give the criterion:

$$\left| \mathrm{norm}(\nabla f_{tar}) \ \mathrm{norm}(\nabla f_{aux}^{\top}) \right|_{\infty} \le \delta.$$

where the inverse term is removed as this normalization is longer needed.

Integrated Gradient (fAux+IG): In this variant, the approach substitutes the raw gradients $\nabla f_{tar}$ and $\nabla f_{aux}$, for integrated gradients (Sundararajan, Taly, Yan 2017) that provide a smoothed gradient signal.

At a high level, many existing tests of individual fairness have the following general form:
1. Select metrics on the input and output space $\phi_{in}$ and $\phi_{out}$.
2. For each test point $x_i$ in the validation set, search for a point $x_j$ that satisfies $\phi_{in}(x_i, x_j) < \epsilon$.
3. The maximum value of $\phi_{out}(f_{tar}(x_i), f_{tar}(x_j))$ measures the amount of discrimination experienced by $x_i$ under $f_{tar}$.

One may thus compare tests according to how they approach steps (1) and (2). With respect to the first step, the original FTA paper (Dwork et al. 2021) requires task-specific metrics. In the absence of domain knowledge, several works describe data-driven alternatives. For example, (Ilvento 2020) uses an expert to classify certain pairs of inputs as similar, and then uses a metric-learning algorithm. Alternatively, Lahoti, Gummadi, and Weikum 2019b and Mukherjee et al. 2020 proposed to use Metric learning. Some works make use of unweighted $l_p$ norms (Wachter, Mittelstadt, and Russell 2018; John, Vijaykeerthy, and Saha 2020), though others obtain weights from a linear model trained to predict the protected variable c from the input x (Ruoss et al. 2020; Yurochkin, Bower, and Sun 2020). While $f_{Aux}$ also learns its own metric, it does so in a principled fashion; its metric is derived directly from the LIC. Moreover, the auxiliary model used by $f_{Aux}$ is more expressive than the linear models used by earlier works. Thus, the weights learned by $f_{Aux}$ are non-uniform, and capture non-linear relationships between x and c. In the experiments, Applicants show the benefit of the non-linearity.

For the second step, one line of work considers generating test points using adversarial techniques (Wachter, Mittelstadt, and Russell 2018; Ustun, Spangher, and Liu 2019; Maity et al. 2021). Unfortunately, these approaches have the potential to construct unrealistic, out-of-distribution samples, which may generate misleading conclusions. An alternative technique is to use the metric $\phi_{in}$ to compute the pairwise-similarity between all individuals, and then use Optimal Transport (OT) to define a mapping between protected groups (Dwork et al. 2012; Gordaliza et al. 2019). The resulting map can then be used to produce test inputs $x_j$ for a given input $x_i$. This approach has the advantage that the pairs considered are always real samples that come from the validation dataset. However, for large, high-dimensional datasets, OT can be computationally demanding, and also unstable. To this end, approximate methods, based on dual-formulations (Chiappa and Pacchiano 2021) and Generative Adversarial Networks (Black, Yeom, and Fredrikson 2019) have also been explored. However, stochastic approximations may still be unstable, and may also inadvertently generate out-of-distribution samples. $f_{Aux}$, in contrast, avoids many of these disadvantages; it uses only supervised learning to train the auxiliary model, and only a single backward pass is required to perform the test. Thus, it scales well to high-dimensional problems. Moreover, it is a local test that is conducted only on in-distribution points.

An illustrative example, a mid-size software company with a small human resources (HR) department may publish a job post online to fill a programming job. Several thousands of applications, including resumes and cover letters, may be submitted in response. For efficiency sake, the HR department may only invite 5-10 candidates to interview. Because of the large applicant pool, the first 10 candidates may be chosen or candidates may be filtered based on ad-hoc criteria until the applicant pool is of a manageable size, following which a more in-depth analysis may be carried out to select candidates. Such manually or minimally automated processes for selecting candidates is time-consuming, prone to error, likely to miss good candidates and include poor candidates (false negative and positives), and subject to hidden bias itself.

In order to automate the process, a system employing a machine learning model may be used to automatically select the top 10 candidates or at least prune out ill-suitable candidates. For example, the machine learning model may be a supervised learning model configured to classify or rank candidates based on input variables utilizing information submitted by applications (e.g. features generated from resume information).

The machine learning model may be configured to generate target predictions (e.g. predicted performance data) based on input variables. Performance data may include metrics such as supervisors' evaluation, average number of code revisions required to achieve production-ready code, gross number of programming lines written, or other such ostensibly objective criteria (to avoid bias). Input variables may be objective criteria associated with the applicant profile, e.g. degrees earned, where earned, GPA, GitHub presence, programming contests won, involvement in extra-curricular activities, and as well as other criteria which may be arguably used to infer soft skills (e.g., colours, fonts, words, or syntax used in the cover letter and resume).

The model may be trained using performance data (targets of the machine learning model) of existing staff (input variables of the machine learning model) at the company. The performance data may be correlated with the staff person's profile, either current or historical (e.g., when the staff person applied for the job).

Despite best efforts to prevent unfairness against underrepresented groups (women, or persons of colour), discrimination against such protected groups may yet occur and in fact the risk of discrimination may be very high.

As an instance, while the HR department may be diligent in removing any variables representing protected attributes such as gender and race in datasets used for training, it may retain input variables that are non-causally correlated with a target via an unknown mechanism involving the protected attributes and possibly other latent variables. Note that: an input variable may be a vector comprising one or more variables, each of which may be an input variable by itself.

For example, words used to describe prior experience may be correlated with gender: for the same experience and achievements, male applicants may claim broader or more thorough skills than female applicants. As another example, while the choice of font for the resume (input variable) may be found to be a good indicator of communication skills (the target), it may also be correlated with socioeconomic status, and hence race. For instance, high schools in affluent may have access to high-end computers and software, which may habituate individuals from affluent backgrounds to use visually-appealing fonts, while their counterparts educated at schools in poorer neighborhoods may be habituated to standard fonts or conservative fonts presumed to impart more credibility. The machine learning model may thus be inadvertently be trained to use choice of font as a proxy for race (a protected attribute), and infer communication skills based on race.

In addition, the dataset itself may be inherently unbalanced because of the staff make-up, leading to erroneous correlations. For example, the company may only have a single programmer who graduated from a school in a poor neighborhood or is a woman. In this case, the machine learning model may become highly sensitive to race or gender (protected attributes), e.g. by using choice of font as a proxy, if the single programmer happens to have considerably better or poorer performance metrics, and unfairly discriminate against individuals in the applicant pool.

Systems and methods are provided which may allow testing and diagnosing a machine learning model for fairness and which may generate a fairness indicator value representing how fair the machine learning model is. Thus, the HR department may use such a system to evaluate a candidate machine learning model for fairness and reject unfair models to reduce discrimination risk. In some embodiments, the candidate machine learning models may be built into the system. In some embodiments, the candidate machine learning models may be input into the system by the HR department. The system may generate output data representative of the fairness indicator value. The fairness indicator value may be indicative of discrimination risk due to the target predictions generated by the machine learning model.

The fairness indicator value may be used to pass or fail the machine learning model, or may be used in an automated tool for machine learning model generation. Thus, the system may facilitate the HR department to efficiently (with low computational overhead) screen machine learning models and deploy only ones that meet a predetermined threshold of fairness. Thus, the applicant pool may then be efficiently whittled down in a fair manner without resorting to discrimination or the risk of hidden bias eliminating good candidates because of their background. In particular, when challenged by a rejected applicant, the HR department may perform an audit of the model or use a prior audit of the model to demonstrate fairness of the recruitment process. Thus, machine learning models and automation may become a tool to ensure fair and equal treatment.

The system generates the fairness indicator value by relying on an auxiliary (machine learning) model. In some embodiments, the system compares a gradient of the machine learning model to a gradient of the auxiliary model to generate a fairness indicator value, e.g. by comparing a first vector indicative of the former gradient to a second vector indicative of the latter gradient. The auxiliary model may be adversarial and trained to predict one or more protected attributes (race, gender, etc.) based on the input variables of the machine learning model, such as choice of font. A gradient of a machine learning model may be a gradient of the target prediction, e.g. performance data here, with respect to the input variables and a gradient of the auxiliary model may be a gradient of the prediction of the protected attributes (or a score representing the quality of the prediction) with respect to the input variables.

In various embodiments, the machine learning model is said to be completely fair if its gradient is orthogonal to the gradient of the auxiliary model. Change in predicted performance (data) requires moving orthogonal to the gradient of the machine learning model because lines of constant machine learning model gradient in the space of input variables are lines of constant performance. Similarly, change in the prediction of the one or more protected attributes (or a score of the prediction used as a surrogate; referred to herein as indicative of the one or more protected attributes) requires moving orthogonal to the gradient of the auxiliary model because lines of constant auxiliary model gradient in the space of input variables are lines of constant predictions of race and gender. Thus, if the two gradients are orthogonal, efficiently changing performance (in terms of perturbations to the input variable) is not associated with a change in race or gender.

In some embodiments, the machine learning model is said to be completely fair if for each value of the input variable (choice of font), the variation in the target prediction (performance data) generated by the machine learning model is less than a variation in the prediction of the protected attributes (race and gender) by the auxiliary model. In some embodiments, such a method to determine fairness may be a relaxation of the gradient-based test described above to account for noisy inputs. Consider an &neighbourhood of an actual input associated with actual prediction of the protected attributes (predicted race and gender by the auxiliary model when fed the actual input) and a δ-neighborhood of an actual target prediction (predicted performance data generated by the machine learning model when fed the actual input), and each "counterfactual" value of the input variable (counterfactual values of the choice of font) within the ε-neighbourhood. The machine learning model is fair if, for each "counterfactual" value, the metric distance of a counterfactual target prediction (predicted performance data generated by the machine learning model when fed the counterfactual value) away from the actual target prediction is less than a distance of a counterfactual prediction of the protected attributes (race or gender predictions generated by the auxiliary machine learning model when fed the counterfactual value of the input variable) from the actual prediction of the protected attributes.

Figure 1G:
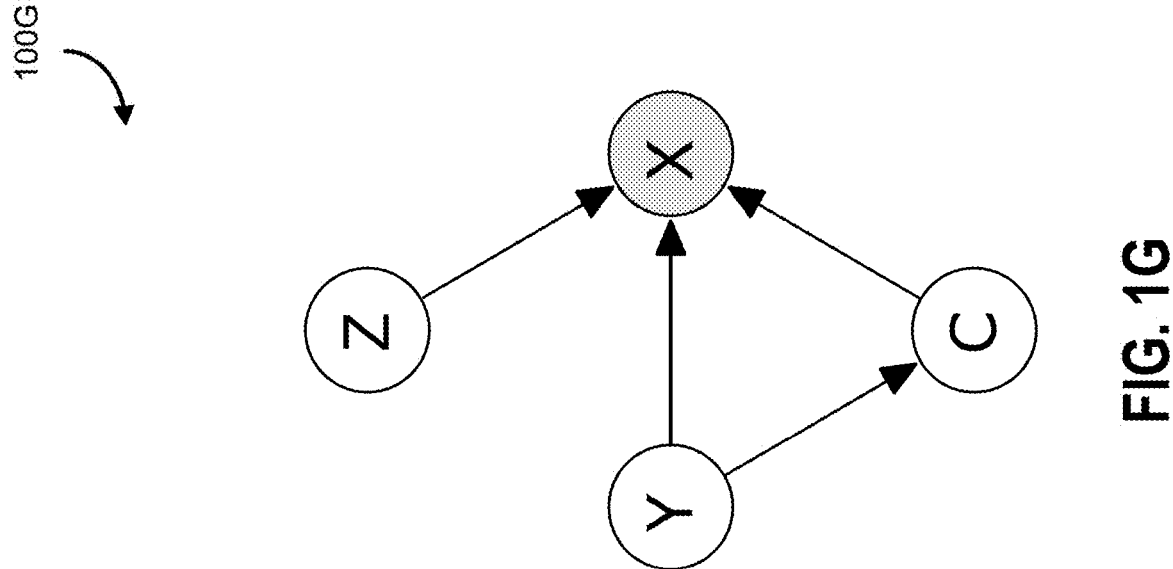
FIGS. 1F-1G show data set bias viewed as probabilistic graphical models.
Figure 1F:
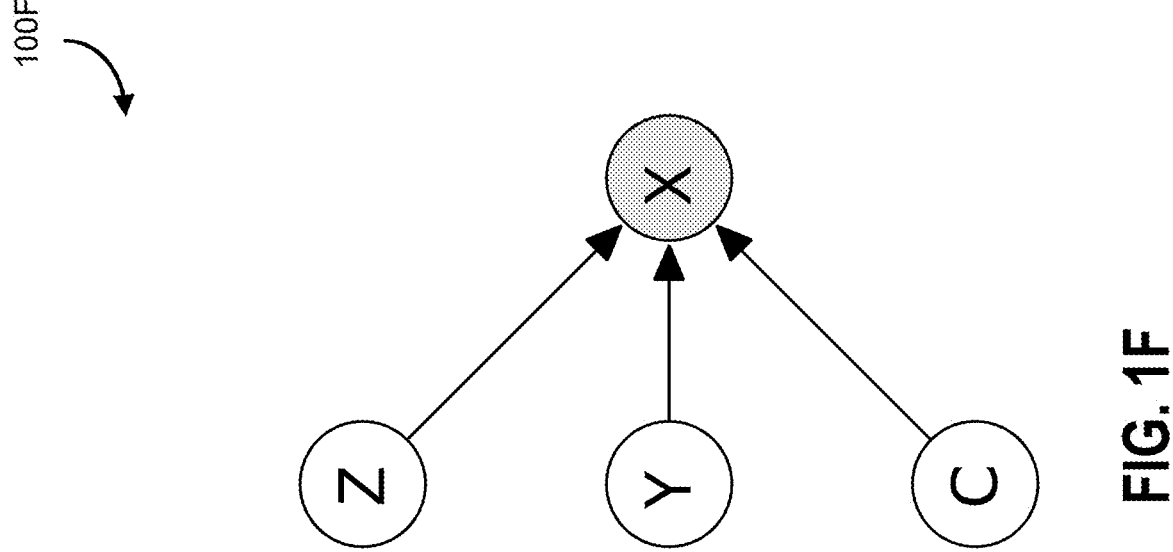

FIGS. 1F-1G show data set bias viewed as probabilistic graphical models. FIG. 1F is a schematic graph representation of a generative model 100F for a data set with distinct populations. The variables Z, Y, and C are independent, so that there is no bias. FIG. 1G is a schematic graph representation of a generative model 100G for a data set with distinct populations and historical biases. Historical biases introduce a correlation between Y and C. Models may learn to exploit patterns in the data strongly correlated with different protected groups, violating fairness definitions based on independence.

Several operational and socioeconomic mechanisms may be used to explained how bias becomes present in datasets. These may be grouped according to which stages of the machine learning pipeline they affect. For present purposes, mechanisms that affect data collection may be relevant. Models are proposed which mimic the effect of these sources of bias. By comparing these biases with the usual assumptions about dataset, it may be considered how they lead, spontaneously, to different mechanisms for disparate treatment.

Representation bias arises in the process of defining and sampling a development population. For example, data may only be collected from a portion of a population, if at all, leading to partial representation (as seen, for example, in Imagenet's geographic biases in [citation]). The generalization ability of machine learning models is known to suffer in the presence of skewed data. In the absence of regularization, data augmentation, or the adjustment of sample weights, a model trained on data with representation bias will fail to generalize well on some population at deployment. The partial representation may be accounted for by placing an asymmetric prior:

$$c \sim Pr(C) \tag{1}$$

In such a way, discrimination is not an active mechanism, but a consequence of generalization errors.

Measurement bias occurs when choosing, collecting, or computing features and labels to use in a prediction problem. Available, measurable data is often a noisy proxy for the features and labels of interest. For instance, in predicting an college admissions, a developer may use GPA as a surrogate for a "knowledge" variable. Unfortunately, since minority communities may have less access to educational resources, a model trained with this surrogate may be inadvertently being trained to reconstruct a bias. Note, accuracy is may be at odds with fairness, because a fair model may not be one which accurately reconstructs the target. Rather than having access to the true target Y, an estimate with group-dependent label noise is:

$$y_{bias} \sim Pr(Y_{bias}|Y,C) \tag{2}$$

This justifies metrics that emphasize balance, such as equal opportunity.

Historical bias may refer to different socioeconomic factors that influence the "state of the world". Mechanically it is distinct from measurement bias (which is an operational consideration), but in practice the effects overlap. To distinguish them, historical bias is defined to be bias that persists even with clean labels. To revisit the college example, even with a clean "knowledge" label, the resulting dataset may still reflect historical factors leading to lower education in poorer neighbourhoods.

It was previously assumed that Z, C, and Y were sampled independently. Socioeconomic circumstances, or faulty data collection protocols, introduce a relation between C and Y Pr(C, Y). Such correlation is not necessarily causal, but could be induced through rejection sampling, or mediated via another latent variable.

Observing the graphical model in FIG. 1G, the mechanism of discrimination becomes clear: a model trained on X to infer Y now has two paths to do so. In particular if the relationship between C and Y is more amenable than the relation between X and Y, a model may exploit the C-dependence of X in order to satisfy its learning task. This mechanism is commonly observed in image classification problems where models learn to exploit the background to make their predictions—for instance, classifying boats because of water in the background.

In this case, it is seen that accuracy may not be at odds with fairness but rather, fairness may act as a regularizer that encourages a model to use its capacity correctly. Other forms of regularization may limit the model's capacity, encouraging it to exploit more amenable relationships, and thus predisposing it to unfair behaviour.

Adversarial robustness may be defined in terms of a threat model based on an auxiliary model. Given a datapoint (x,y), an adversarial example x' is obtained as a solution of a constrained optimization problem:

$$x' = \arg\max_{d_I(x,x') < \epsilon} d_O(y, f_Y(x')) \tag{3}$$

Here, $d_I(\cdot,\cdot)$ and $d_O(\cdot,\cdot)$ denote metrics defined on the inputs and outputs respectively, and the user specifies tolerances using a parameter E. Together these metrics and tolerances specify the threat model. In this way, x' is a point in the neighbourhood of x for which outputs the model $f_Y$ change rapidly. Both exhaustive and approximate algorithms for finding adversarial examples may be obtained.

Approximate algorithms typically use gradient estimates to find small perturbations which maximize the deviation of a model's outputs, e.g. single-step attacks, such as the Fast Gradient Method (FGM) and the Fast Gradient Sign Method (FGSM). Fairness may be defined using single-step attacks on the auxilliary model.

To compare definitions of individual fairness with adversarial robustness, the constrained optimization problem may be reformulated as a logical statement: a model is not adversarially robust when:

$$\exists x's.t(d_I(x,x')<\epsilon)\wedge(d_O(y,f_Y(x'))>\delta) \tag{4}$$

Here, $\delta$ is a parameter which bounds the deviation of the model's outputs. Colloquially, the outputs of an adversarially robust model may be said to be insensitive to small perturbations of its inputs.

Definitions of individual fairness may also be phrased as statements of adversarial robustness with different threat models, e.g., the auxiliary model. The precision and level of complexity of the auxiliary model may be advantageous.

A statement about fair treatment at the individual level is that individuals (inputs) who are similar should be treated similarly by a given model (i.e have similar outputs). Different definitions may be distinguished by the definition of similarity used. There may be similarities between individual fairness and robustness.

Fairness Through Unawareness (FTU) is satisfied if C is not explicitly used by a model. This may be enforced by either excluding the protected variable C as an input, or, by ensuring that perturbations to C do not change the output of a model. In the latter approach, formal methods may be employed to ensure that explicit changes in the protected attribute c does not alter the performance of software. Tests based on FTU may have limited utility, as they fail to account for correlations between the data X and the protected attribute C. Thus discrimination may persists as X becomes used as a surrogate for C.

Fairness Through Awareness (FTA) formalizes the definition of similarity using two metrics: (1) a statistical metric D on the output-space, which defines "similar treatment," and (2) a metric d in the input space, which formalizes the "similarity" of individuals. In terms of these metrics, this statement of individual fairness is the (D, d)-Lipschitz property:

$$D(f(x_1),f(x_2))\leq d(x_1,x_2) \tag{5}$$

Formal verification and adversarial attacks may be employed to find violations of the above property. The applicability of FTA is limited by its need for a task-specific metric, which is not always straight forward to define. Moreover, for a datapoint (x, y), observe that FTA is violated when:

$$\exists x's.t(d(x,x')\leq\epsilon)\wedge(D(f(x),f(x'))>\epsilon) \tag{6}$$

This is similar to (4). Accordingly, depending on the metric employed, FTA may flag behaviour which is not robust, as opposed to unfair.

Counterfactual Fairness (CFF), like FTA, mandates that similar individuals be treated similarly, but it does so causally. More precisely, given a causal graphical model, a counterfactual from x may be generated by performing an intervention on the protected attribute c. This produces an x' from the same value of z, but a different c. CFF mandates that the model's output should not change for the counterfactual:

$$\exists x's.t.(d_I(z,z')\leq\epsilon)\wedge(d_O(y,f(x'(z',c))>\delta) \tag{7}$$

In particular, equation (7) may fit within the more general framework of model-based robust deep learning, where robustness is enforced in latent spaces as opposed to the raw inputs. In practice, however, CFF is hard to implement, because it requires access to a causal graph. FlipTest attempts to relax this requirement by generating counterfactuals using generative adversarial networks.

However, both approaches may be limited by their reliance on generative models of data, which may not available. Since Z is unobserved, these approaches must rely on unsupervised learning algorithms, which can lead to misleading conclusions if the model is inaccurate. Compared with supervised learning, generative modelling is a more difficult task, since it must capture a full high-dimensional data distribution, as opposed to isolating discriminative components. Moreover, unsupervised learning algorithms require more expertise to deploy, as they exhibit complex behaviours. In various embodiments, only supervised learning is required for the auxiliary model.

In various embodiments, systems and methods are provided to flag discriminatory model behaviour at the individual level by perturbing group membership to reveal individual discrimination. Fairness may be demonstrated by showing that the model output for a given example does not vary rapidly as a function of the protected variable (attribute).

Various properties of models may cause individuals to be disadvantaged based on group membership. In various embodiments, systems and methods model a type of discriminatory model behaviour, which may be caught by fairness tests based on independence. There are many reasons models exhibit discriminatory behaviour, including behaviours that originate from biases in datasets. In some embodiments, systems and methods may be used to detect bias in cases where models fulfill their training task by exploiting correlations between the targets Y and sensitive attribute C. At the group level, this may be flagged using tests of statistical independence.

In addition to Y and C, the observable features X depend on a set of latent features Z. Dataset bias may be described by specifying how the distribution Pr(X|Y, Z, C) factors. The unbiased case is illustrated in FIG. 1F, and it may make three key assumptions: (1) Each population is equally represented in the training set. (2) The target Y is observable. (3) The variables Z, Y, and C are independent. Different sources of bias may be considered as violations of these assumptions. These violations, in turn, provide training algorithms illegitimate opportunities to perform better on a learning task.

The focus here is on datasets where assumption (3) is violated. This can occur, for example, in the presence of historical bias, which reflects historical disadvantages rather than operational deficiencies, and it is hard to remove. In the example presented above, even with a perfect "knowledge" label, the dataset may still reflect historical factors leading to lower education in poorer neighbourhoods.

FIG. 1G illustrates a model of this situation. In effect, there are now two paths connecting X and Y. If relationship between C and Y is more amenable than the relation between X and Y, a model may exploit the C-dependence of X in order to satisfy its learning task. Thus the model makes illegitimate decisions based on group membership.

A test for fairness may capture this behaviour. A fair model is one which does not give preferential treatment to members of different populations. While there are many metrics that quantify preferential treatment, many of these may be viewed as applications or relaxations of different fairness criteria, which express constraints on the joint distribution of the model score $S_Y$ with C and Y. To catch a model that is exploiting correlations between C and Y in training, $S_Y$ may be required to be independent of C. At the group level, this statement becomes:

Independence may be defined as follows: for a fair model, the score $S_Y$ should be statistically independent of the population C:

$$Pr(S_Y|C)=Pr(S_Y). \tag{8}$$

A strategy to evaluate independence is to propose a statistic to quantify $Pr(S_Y)$ for a given C, and then check how this varies with C. For example, demographic parity is one such relaxation, and is given by:

$$|Pr(S_Y=1|C=0)-Pr(S_Y=1|C=1)|\leq\delta \tag{9}$$

Here, $\delta$ defines a threshold for the test, above which a model is flagged as discriminatory.

Notwithstanding, because fairness criteria may only constrain $Pr(C, Y, S_Y)$, they implicitly marginalize over the individual features X. However, discriminatory behaviour in models may arise from illegitimate patterns of bias in X. To this end, group fairness criteria cannot identify if an individual is being discriminated against, nor can it provide insight into why. Thus, to expose discriminatory behaviour at the level of the individual, fairness criteria should be enforced locally.

The group statement of fairness may be converted into a individual level statement, based on an understanding of how the inputs x vary as a function of c. In particular, the group fairness criteria may be transformed into stricter individual statements about the model gradient $\nabla f_Y$ by computing how the expected score S of a model $f$ varies as a function of the protected attribute C. A fair model may not vary rapidly as a function of C. These changes may be approximated with an auxiliary model.

As discussed above, fairness tests aggregate statistics on S over samples from different groups C, and then mandate they should be equal. Thus for a fair model, the expected score $\mathbb{E}[S|C]$ should be a constant function of C, or at least one that does not vary more than some tolerance $\delta$. By writing $\mathbb{E}[S|C]$ explicitly, this property can be enforced by bounding the partial derivative:

$$\left|\frac{\partial}{\partial c}\mathbb{E}[S\mid C]\right|<\delta \tag{10}$$

The full procedure for computing (10) is described later, while the main steps are described here. To this end, note that the dependence of S on C may be implicitly encoded through two factors: (1) the dependence of S on X, via the model $f_Y$, and (2) the dependence of X on C, which is described via generative model like that the model 100F in FIG. 1F. To make this concrete, denote this model by $\Gamma$. From the protected attribute c, target y, and latent variables z, x is obtained via:

$$x=\Gamma(z,y,c). \tag{11}$$

Using the chain rule, the variation in S with respect to C is then given by:

$$\frac{\partial s}{\partial c}=\nabla f_Y^T\frac{\partial\Gamma}{\partial c} \tag{12}$$

This is a function of Z and Y, and thus, to obtain the aggregate shift in the expected value of S, the expectation value of (12) is sought. A derivation follows.

The dependence of S on C is implicitly encoded (1) through the dependence of S on X, via the model $f$, and (2) through models relating X and C. Accordingly, $Pr(s|c)$ factorizes as follows:

$$Pr(s|c)=\int dx\; Pr(s|x)Pr(x|c) \tag{13}$$

Because $f$ is a deterministic function of x, $Pr(s|x)$ is obtained via a $\delta$-function as:

$$Pr(s|x)=\delta(s-f(x)) \tag{14}$$

Consider a deterministic function $\Gamma(z,y,c)$ which generates a datapoint x from protected attribute c, target y, and latent variables z. As with $Pr(s|x)$, $Pr(x|z,y,c)$ may be expressed using a delta function. $Pr(x|c)$ is then obtained by marginalizing over z and y:

$$Pr(x|c)=\int dz\; dy\delta(x-\Gamma(z,y,c))Pr(z)Pr(y) \tag{15}$$

Inserting equations (13), (14), and (15) into (10):

$$\frac{\partial}{\partial c}\mathbb{E}[S\mid C]=\frac{d}{dc}\int ds\; dx\; sPr(s\mid x)Pr(x\mid c) \tag{16}$$

$$=\frac{d}{dc}\int dx\; f(x)Pr(x\mid c) \tag{17}$$

$$=\frac{d}{dc}\int dz\; dy\; f\circ\Gamma(z,y,c)Pr(z)Pr(y) \tag{18}$$

$$=\int dz\; dy\; \frac{\partial}{\partial c}(f\circ\Gamma(z,y,c))Pr(z)Pr(y) \tag{19}$$

$$=\int dz\; dy\; \nabla f\mid_x^T\frac{\partial x}{\partial c}Pr(z)Pr(y) \tag{20}$$

$$=\mathbb{E}_{ZY}\left[\frac{\partial s}{\partial c}\right] \tag{21}$$

The chain rule is used in the last step. Thus, in summary:

$$\frac{\partial}{\partial c}\mathbb{E}[S\mid C]=\mathbb{E}_{ZY}\left[\frac{\partial s}{\partial c}\right] \tag{22}$$

Because the integrand is aggregated over the different values of z and y, it is possible for different individuals to experience fluctuations in their model outputs, so long as the net expectation value is undisturbed. As such, the group definition is not sufficient to guarantee fairness for individuals. Mandating that similar individuals be treated similarly thus requires that the integrand vanishes for all values of z and y, leading to the following local definition of independence, which may be used to infer fairness: a machine learning model $f$ satisfies local independence with tolerance $\delta$ if:

$$\forall x,\left|\nabla f_Y^T\frac{\partial}{\partial c}x\right|<\delta \tag{23}$$

In various embodiments, $\delta$ may serve as a fairness indicator value that provides a measure of (e.g., highest acceptable) bias locally. A system for fairness testing may receive data representative of one or more values of the input variable x and use it to generate output data representative of the fairness indicator values at those values. In various embodiments, the system may output $\delta$ as described above or output binary indicator values to flag input which do not satisfy the expression (23) as examples of unfair behaviour. These inputs and the machine learning model (or even the auxiliary machine learning model) may be studied to provide insights into the model's decisions. In various embodiments, a means of estimating $$\frac{\partial x}{\partial c}$$

may be additionally used to facilitate computation.

FIG. 2A, FIG. 2B and FIG. 2C graphically illustrate checking alignment of model gradients with the auxiliary model gradient, i.e. fairness of a model may checked by comparing its gradient to the auxiliary model gradient $\nabla f_C$.

FIG. 2A is a graphical representation 200A of a dataset with two populations in concentric circles, denoted by circles and triangles. The target objective is independent of the radius, but data is missing, resulting in a bias. Discrimination occurs when an individual is advantaged by being in a given population.

FIG. 2B is a graphical representation 200B of gradients of a (candidate) model having unfair bias and that of an auxiliary model configured to predict membership in a population. If the gradient of a model aligns with the gradient of the auxiliary model, an individual can increase their score by changing their membership (dark triangle).

FIG. 2C is a graphical representation 200C of gradients of a fair (candidate) model and that of the auxiliary model. In contrast to FIG. 2B, FIG. 2C shows that the gradient of a fair model is orthogonal to the auxiliary model gradient, so that an individual cannot increase their score in this way.

Orthogonality, for example, can be observed in the angle between the arrows (e.g., in FIG. 2C, they are closer to right angles, while in FIG. 2B, they are less than right angles).

To evaluate $$\frac{\partial}{\partial c} x$$

access to the full generative model $\Gamma(z, y, c)$ is required, but this is generally not available. An approximation of $$\frac{\partial}{\partial c} x$$

that requires neither $\Gamma$ nor attempts to model the latent variables Z may instead be used. Because a partial derivative is being evaluated, only perturbations that maximize the change in c, but leave z and y approximately constant, need to be examined. These perturbations may be found using a surrogate model. The approach is visualized in FIGS. 2A, 2B, and 2C and is summarized in Algorithm 1 outlined below.

Algorithm 1: Local Independence Test
  Result: Flag unfair model behaviour
  Data: Training data X, Y, C, task predictor $f_Y$, threshold $\delta$
  1. Using supervised learning, train auxiliary model $f_C$ to predict C given X.
  2. Evaluate gradients $\nabla f_Y$ and $\nabla f_C$.

3. The model exhibits unfair behaviour on inputs for which $$\left| \frac{\nabla f_Y^T \nabla f_C}{\nabla f_C^T \nabla f_C} \right| > \delta.$$

To build this surrogate, a machine learning model model $f_C$ is trained to predict group membership C from inputs X. This predictor is referred as the auxiliary machine learning model (or auxiliary model) or $f_{aux}$, and it outputs a score $S_C = f_C (x)$.

Algorithm 1, in a variation, can be stated as:

---

Algorithm 1: Auxiliary Model Test (fAux)

Result: Flag unfair model behaviour
Input: Validation data points
    D = { . . . $(x_i, c_i, y_i)$ . . . }, target model $f_{tar}$, and threshold $\delta$"
Train auxiliary model c = $f_{aux}(x)$;
for each data point (x, c, y) in D do
|    Evaluate gradients $\nabla f_{tar}$ and $\nabla f_{aux}$;
|    Flag unfair behaviour on inputs through

|    $\left| \nabla f_{tar} (\nabla f_{aux}^T \nabla f_{aux})^{-1} \nabla f_{aux}^T \right|_\infty \le \delta'$;

end

---

In a local neighbourhood around a given point $x_0$, $f_C$ may be inverted to define $x(s_C)$, which is indicative of and used a surrogate for x(C). Starting with a Taylor expansion:

$$s_C - f_C(x_0) \approx \nabla f_C^\top (x - x_0) \qquad (24)$$

The left-hand side of this equation denotes the change in the score, and is a scalar. The right hand side is a dot product between two vectors. Accordingly, (24) is an indeterminate equation for x. Nevertheless, using the Moore-Penrose pseudoinverse, the infinite solution set for x may yet be characterized:

$$x(s_C) = x_0 + \frac{(s_C - f_C(x_0))\nabla f_C}{\nabla f_C^\top \nabla f_C} + perp. \text{ part} \qquad (25)$$

The equation above describes two sources of variation: the first of which is parallel to $\nabla f_C$, and the second of which is perpendicular to it. To minimize the impact from variations in the latent variables Z, $x(s_C)$ is constrained to be the point closest to $x_0$ which maximally changes $s_C$. To this end, the second term in (25) may be discarded to leave the following approximation:

$$\frac{\partial}{\partial c} x \approx \frac{\partial}{\partial s_C} x = \frac{\nabla f_C}{\nabla f_C^\top \nabla f_C}. \qquad (26)$$

Combining with the definition for location independence yields an approximate criteria for local independence:

$$\forall x, \left| \frac{\nabla f_y^T \nabla f_c}{\nabla f_c^T \nabla f_c} \right| < \delta \qquad (27)$$

where $\delta$ may be a fairness indicator value in various embodiments adapted to predict (e.g. highest acceptable) bias or unfairness at particular locations.

For example, (26) may be a useful approximation of the true derivative of the data generating model $$\frac{\partial}{\partial c} \Gamma(z, y, c).$$

Potential sources of error may arise. Extensions to the auxiliary model may help mitigate approximation errors.

Gradient estimates may have high variance: whether through modelling error, or an ill-posed objective, it is possible that the approximation in (26) will become sensitive to the model architecture and training procedure. To accommodate this, rather than using $\nabla f_C$ directly, one may consider using $\mathrm{sign}(\nabla f_C)$.

If $\nabla f_C$ moves outside the data generating distribution local perturbations using $\nabla f_C$ may in fact produce outliers. To accommodate this, $\nabla f_C$ may be corrected using local estimates of covariance, or second-order gradient estimates. Alternatively, $\nabla f_C$ may be utilized directly, but out-of-distribution detection may be applied to filter which individuals are used to estimate fairness.

For illustrative purposes, a concrete example is provided below.

A concrete example may be provided by the Coloured MNIST dataset, comprising images having either a handwritten zero digit ("0") or handwritten nine digit ("9") that are respectively coloured blue and red. The images may be input variables, the digit ("9" or "0") or a quantity indicative thereof may be the target prediction, and the colour (blue or red) or quantity indicative thereof may be the protected attribute (in general, there may be more protected attributes). An unfair model may use the colour to predict the digit. A task predictor (machine learning model) may accept an image as the input variable and output the target predictions: a vector of probabilities for the digits. An auxiliary model may accept the image as the input variable and output predictions indicative of the protected attributes: a vector of probabilities for the colours. For the task predictor a convolutional neural network architecture may be used. The architecture of the auxiliary model may be composed of an average pooling layer followed by a linear layer.

The gradients may be computed using backpropagation. The dot product may be used to compute alignment of the gradients, e.g. via the dot product itself or in the form of the cosine angle between the gradient vectors. To reduce variance in the computation of the gradients (e.g. to avoid problems of excessively small or large gradients), a revised measure of alignment using the sign gradient may be used. The reduction in variance may be observed via a histogram of the alignment. In this case, any value of $\delta > 0$ may recognize that the fair model is completely fair.

A P-R (precision-recall) curve may be used. In the synthetic case, access to ground-truth definitions of fairness may be available, e.g. since the counterfactuals may be be directly generated by producing blue 9s and red 0s. In some embodiments, the ground truth fairness may be given by the difference between the output of a model on an instance x, and its counterfactual $x_c$. The difference may be correlated or associated with the definition of local fairness. In some embodiments, ground-truth binary labels may be obtained by thresholding this difference, e.g. the ground-truth binary labels may declare whether or not discrimination occurs. Different choices of $\delta$ may provide varying relative success in flagging discrimination.

In experiments described below that employ various embodiments, the reliability of the approximation in (26), and the proposed extensions, in estimating $$\frac{\partial}{\partial c} \Gamma(z, y, c).$$

may be empirically quantified. Because modelling $\Gamma(z,y,c)$ may be difficult on real datasets, synthetic datasets may be used for benchmarking. The specifics of these datasets are detailed further below. Based on these results, the algorithm may then be applied to real world datasets.

FIGS. 3A-4B shows results from experiments performed with synthetic data in accordance with some embodiments.

FIGS. 3A-3C illustrate a model for a source of bias in datasets. The constructed model $\Gamma$ is takes latent variables z, targets y, and sensitive attribute c to generate datapoints x via $x=\Gamma(z,y,c)$. Bias is injected by specifying a joint distribution $Pr(C,Y)$, which is used to sample c and y. This results in datasets with the structure of FIGS. 3A-3C.

Multiple datasets are constructed with $\Gamma$ and $Pr(C,Y)$ of increasing complexity (the specifics of the generative model $\Gamma$, and the joint distribution $Pr(C,Y)$, are described below). To compare how successfully the fairness test flags individual discrimination, a ground-truth definition of fairness may be required. As the setup gives access to a generative model, counterfactual fairness may be employed to construct fair and unfair models.

Generative models may be used to synthesize datasets, to facilitate ground-truth prescription of fairness, and to construct fair model. For example, such questions may be quantitatively explored: How do models learn discriminatory behaviour? Is the score of the auxiliary model a useful surrogate for group membership? Under what settings is it not? What architectures should be used for the auxiliary model? How does the auxiliary model compare with existing approaches?

While datasets contain multiple sources of variation, models may preferentially exploit the most amenable patterns to achieve their performance objective. Thus, if inferring a target y from x is challenging, a model may exploit the c-dependence of x if c is correlated with y. This process may be visualized using information plane dynamics. Given a fair and an unfair model, sources of variation in x are compared and are exploited during training. An auxiliary model may be able to detect this discriminatory mechanism. Quantitatively, for each (dataset, model) pair, the alignment between the gradients of the model $\nabla f_S$ may be examined, and the gradients of the auxiliary model $\nabla f_C$. A prediction may be that the alignment will be strongest when the relation between y has x has higher complexity. Problematic correlations may be flagged by computing an aggregate covariance matrix between $\nabla f_S$ and $\nabla f_C$, similar to transparency reports, e.g. such analysis may be a useful debugging/exploration/diagnosis tool for model developers.

An auxiliary model may be a useful surrogate for group membership. The auxiliary model $f_C$ may be used to approximate local changes in group membership. In particular, variations in the score $s_C = f_C(x)$ may be used as a surrogate for variation in the protected attribute C (see equation (26)). The setup may allow explicit computation of the left hand side of this equation, by taking a partial derivative of the generative model $$\frac{\partial \Gamma}{\partial c}.$$

Then how well this aligns with the auxiliary-model perturbations may be measured.

With respect to architectures to be used for the auxiliary model, a search is performed to determine the architectures and training procedures which maximize the aforementioned alignment. For example, consider three architectures: (1) A ground truth $f_C$ computed from $\Gamma$, which serves as a baseline. (2) Neural networks with varying depths and widths. (3) Bayesian ensembles of different models. As architectures change and the complexity of the dataset increases, the auxiliary model may become progressively less accurate. In such a way, the proposed extensions described previously may also be assessed, for instance, by comparing $\text{sign}(\nabla f_C)$ and $\text{sign}(\nabla f_S)$.

In various embodiments, the auxiliary approach is more precise that FTA, but may be easier to implement than CFF. Three tests of fairness are considered: (1) the present approach, using auxiliary models, (2) FTA, using (6), (3) an approximation of CFF, FlipTest. Each of these tests has an associated threshold $\delta$, which may be used to flag unfair behaviour.

Using synthetic datasets, access to a generative-model $\Gamma$ which provides a ground truth definition of individual fairness is possible. Using the threshold $\delta$, PR curves may be constructed that describe the rate at which individual discrimination is caught for a given (dataset, model) pair. These are then compared to the AUC of these curves across different (dataset, model) pairs to see which tests have the best performance.

FIG. 3A is a visual representation 300A of an example zero perturbation input of machine learning models configured to generate target predictions of the digit in the input, as either 0 or 9, and where color is a protected attribute.

An example of a dataset with synthetic bias is Coloured MNIST. This is used to demonstrate how models trained on this data may become unfair if not regularized. A auxiliary model is constructed and then used to generate perturbations that expose discriminatory behaviour. Finally, these results are examined to see how they may be made even more reliable using techniques presented above.

FIG. 3B is a visual representation 300B of an example perturbation of the input of FIG. 3A along a gradient of an example fair machine learning model, where the gradient is relatively less aligned with a gradient of an auxiliary machine learning model.

FIG. 3C is a visual representation 300C of an example perturbation of the input of FIG. 3A along a gradient of an example unfair machine learning model, where the gradient is relatively less aligned with a gradient of an auxiliary machine learning model.

The upper (top row) plots in FIGS. 3A-3C were generated using the original colour plots with colours mapped to distinguish differing colours more clearly in grayscale. For example, lighter shades (of gray) simulate redder hues while darker shades (of gray) simulate bluer or pinker hues.

Figures 4A, 4B:
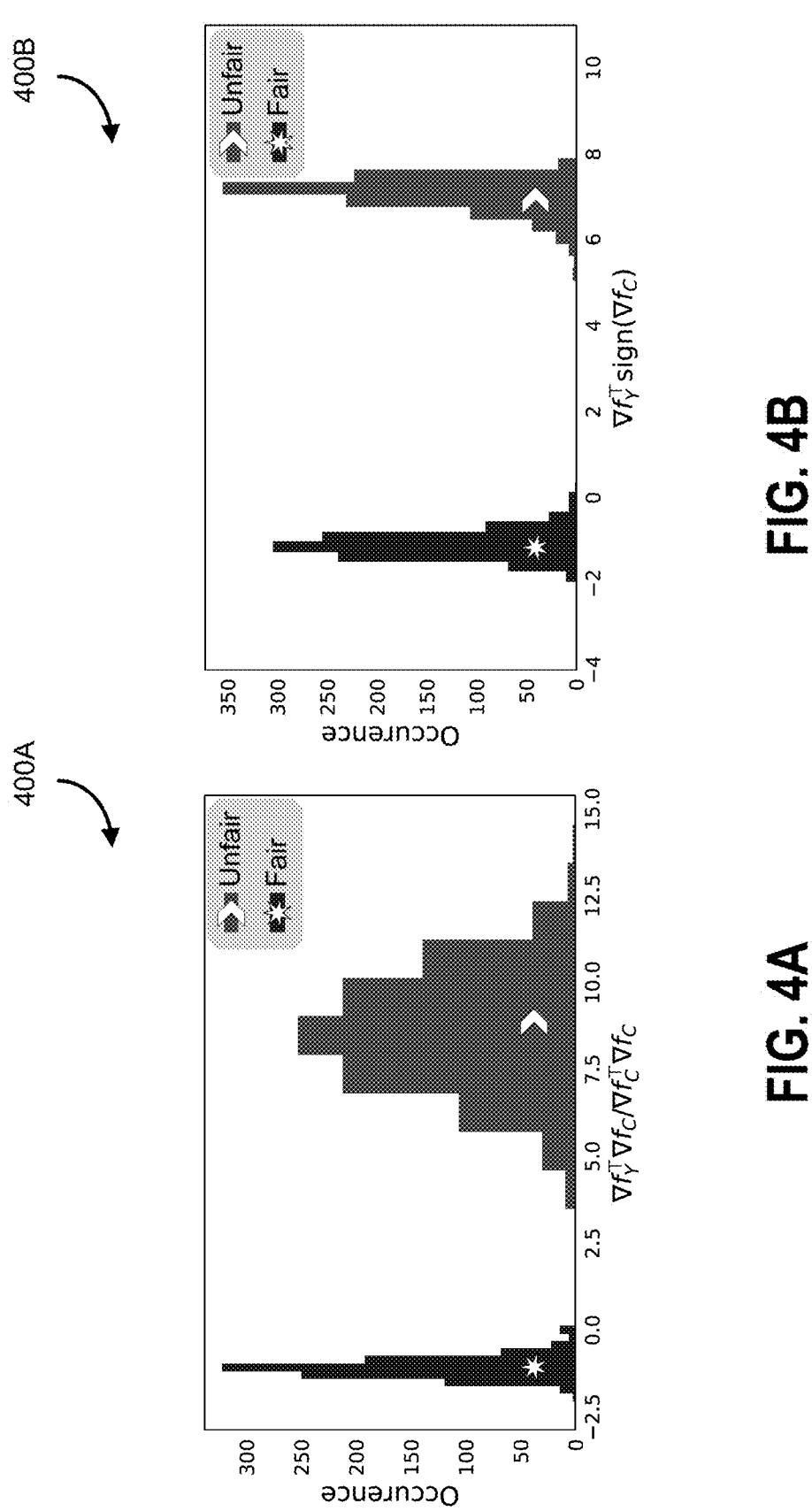
FIG. 4A are example histograms of values of an unfairness indicator for the example fair and unfair machine learning models, in accordance with an embodiment.
FIG. 4B are example histograms of values of an unfairness indicator for the example fair and unfair machine learning models, in accordance with another embodiment.

FIG. 4A are an example histograms 400A of values of an unfairness indicator for the example fair and unfair machine learning models, in accordance with an embodiment. FIG. 4B are an example histograms 400B of values of an unfairness indicator for the example fair and unfair machine learning models, in accordance with another embodiment.

Fair and unfair machine learning models are trained on MNIST to distinguish between 0s and 9s. Here, the targets (predictions) Y describe the digit (0 or 9), and the latent variables Z describe information about shape and orientation. The dataset is then augmented by giving the digits a colour (shown in grayscale shading in the figures). This colour is the sensitive attribute C. To each C an RGB vector $V_c = [V_r, V_g, V_b]$ is associated. These colours are chosen so that:

$$V_r + V_g + V_b = 1. \tag{28}$$

The images are then transformed as follows:

$$X_{color} = X_{bw} \odot V_c = [X_r, X_g, X_b] \tag{29}$$

This produces a 3-channel RGB image. Note that, from $X_{color}$, the following inverse transformations may be used to obtain $X_{bw}$ and $V_c$ $$X_{bw} = X_r + X_g + X_b \tag{30}$$

$$(V_c)_i = \max(X_1) \tag{31}$$

To inject a historical bias, a correlation is imposed between the protected attribute C and the target Y. Thus, rather than using information about shape to predict the digit, an unfair model may predict C from X, and then predict Y from C (see FIG. 1F-1G). In this case study, all of the 9s have been coloured a first colour (e.g., red), while all the 0s have been coloured a second color (e.g., blue).

Two models are then constructed, which have the same architecture, but are trained differently. The first of these, which becomes the fair model, is a CNN, where first layer is a 1×1 convolution, initialized to convert the coloured image into a BW image using (30). This layer is then frozen while the rest of the model is trained to predict the Y. For the unfair model, the same architecture is used, except the first layer is randomly initialized, and model is trained end to end without pre-training.

For the auxiliary model, the channel-wise mean of the RGB image is taken and fed into a linear classifier (mean is used instead of max because the gradient of max is too sparse).

FIG. 3A, FIG. 3B, and FIG. 3C show an example comparing the gradients of fair and unfair models. The top row of FIG. 3A, FIG. 3B, and FIG. 3C are counterexamples obtained by following model gradients. The bottom row of FIG. 3A, FIG. 3B, and FIG. 3C show the gradients in the blue channel and can be used for a comparison of the different gradients. The gradients are shown using a bimodal colour map or shading (in grayscale) where high and low ends of the colour map are rendered darker than the center of the colour map, which is rendered brighter. In FIG. 3B, the regions 302B and 304B are regions (enclosed with dashed lines) where the pixels are from the lower end of the colour map. Regions 306B and 308B are regions (enclosed with dash-dot lines) where the pixels are from the higher end of the colour map. In FIG. 3C, regions 302C and 304C are regions (enclosed with dashed lines) where the pixels are from the lower end of the colour map. The fair gradient changes the shape of the digit, whereas the unfair gradient only changes its colour. The latter aligns more closely with the gradient of the auxiliary model, which is evidence of its unfairness.

In FIG. 3A, FIG. 3B, and FIG. 3C, the gradients of the fair and unfair models are visualized. In the blue channel, the gradient of the unfair model is quite correlated with the auxiliary model, and using this gradient to perturb the input image changes the colour without changing the shape. This demonstrates discriminatory behaviour against the colour red. In contrast, the gradient of the fair model tries to turn the image of a 9 into a 0, and demonstrates little correlation with the auxiliary model.

FIG. 4A and FIG. 4B show an example set of distributions comparing distributions of the gradient alignments. Unfairness of a model may be determined by aggregating counterexamples. FIG. 4A shows the distribution of alignments with the auxiliary model using $\nabla f_C$ directly. It may be observed that, even in the case of coloured MNIST, there is a great deal of variance. FIG. 4B shows that using $\mathrm{sign}(\nabla f_C)$ offers lower variance, and clearer de-lineation between fair and unfair models. In FIG. 4A and FIG. 4B, distributions of the gradient alignments is visualized for the fair and unfair models. Note that, using (27) directly, there is a clear separation between the fair and unfair distribution, but especially for the unfair model, there is high variance. In contrast, using $\mathrm{sign}(\nabla f_C)$ results in less variance within the distributions, and wider separation between them.

To demonstrate the utility of the auxiliary model approach, these are deployed on datasets which feature prominently in the fairness literature. Increasingly aggressive bias-mitigation strategies are employed, and their impact is examined on the present test for fairness. This approach may be used to demonstrate that the auxiliary model approach is able to flag discriminatory behaviour on real datasets. Further approaches of local fairness that employ yet other methods, e.g., related to adversarial robustness, may be employed. The auxiliary model may be incorporated, for example, as an additional term in the objectives for adversarial robustness algorithms. The resulting adversarial examples must be examined carefully.

Figure 5B:
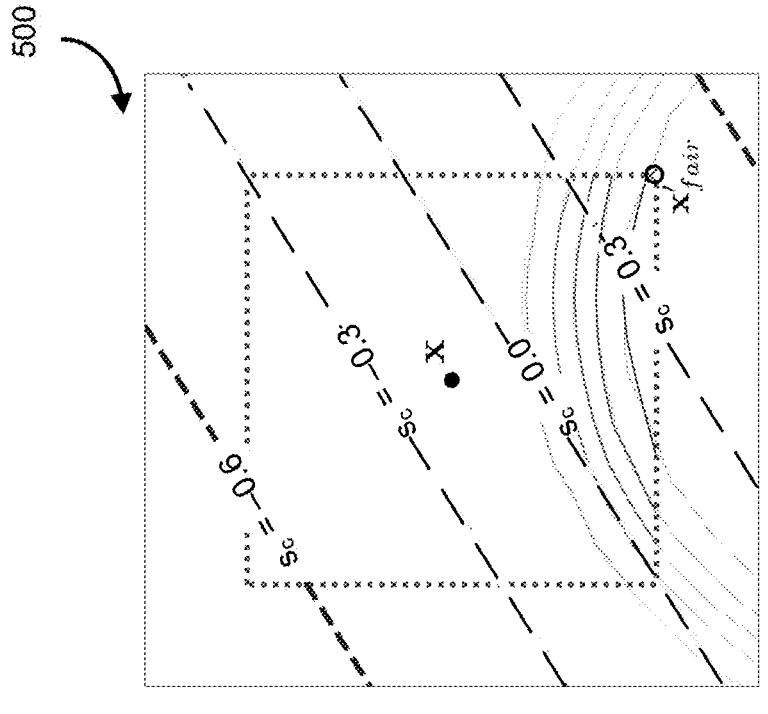
FIG. 5B is the example square neighborhood diagram of FIG. 5A now with superimposed isocontours of (the score of) predictions of the protected attribute, showing a counterfactual input obtained by maximizing both distance of the counterfactual target prediction from the actual target prediction and distance of the counterfactual (score of the) prediction of the protected attribute from the actual (score of the) prediction of the protected attribute.
Figure 5A:
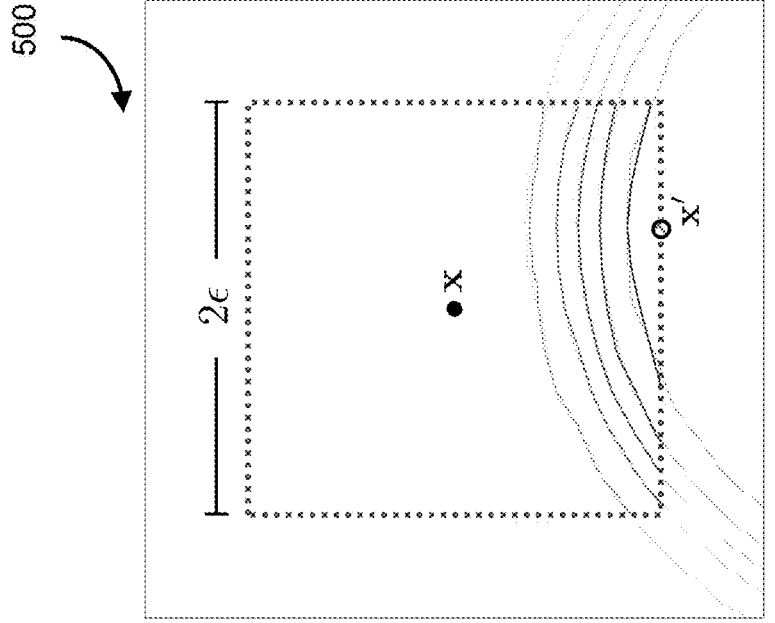
FIG. 5A is an example square neighborhood diagram of an actual input in a two-dimensional input variable space with superimposed isocontours of target predictions (such as outputs or scores), showing a counterfactual input obtained by maximizing distance of the counterfactual target prediction from the actual target prediction.

FIG. 5A is an example square neighborhood of an actual input in a two-dimensional input variable space 500 with superimposed isocontours of target predictions (such as outputs or scores), showing a counterfactual input obtained by maximizing distance of the counterfactual target prediction from the actual target prediction.

FIG. 5B is the example square neighborhood of FIG. 5A, 500, now with superimposed isocontours of (the score of) predictions of the protected attribute, showing a counterfactual input obtained by maximizing both distance of the counterfactual target prediction from the actual target prediction and distance of the counterfactual (score of the) prediction of the protected attribute from the actual (score of the) prediction of the protected attribute.

FIG. 5A and FIG. 5B show an example of generating fair counterfactuals using constrained optimization. When a model is approximately constant near a point x, a single perturbation using the gradient may fail to reveal nearby discriminatory behaviour. One can thus use an iterative algorithm to find points x' which maximize the change in the model's outputs, subject to constraints.

FIG. 5A shows that the first constraint is a distance constraint, which defines an upper bound $\epsilon$ on the distance between x and x'. Optimizing under this constraint alone generates adversarial examples.

FIG. 5B shows that, in contrast, fair counterfactuals $$x'_{fair}$$

require changes in group membership C. One can use the auxiliary model $f_C$ as a surrogate for group membership, and add an additional constraint on the score $s_C = f_C(x')$ of $$x'_{fair}.$$

Single-step attacks have been considered that are made on the auxiliary model $f_C$, and then transferred to the task predictor $f_Y$. If $f_Y$ varies slowly at x, these perturbations may have a limited effect on the model's output. In some cases, single-step attacks may not find other points x' close to x where $f_Y$ changes sharply. This situation is illustrated in FIG. 5A-B. These x' may be found as the solution to a constrained optimization problem, as in equation (3).

A number of iterative algorithms for solving this optimization problem are available (e.g. in the adversarial robustness literature), such as the Carlini-Wagner attack and the momentum attack. However, fairness testing requires that perturbations to x are exclusively made through changes in the group membership c. This is a limitation of previous works. To this end, (3) is modified to include constraints on group membership.

The score $s_C$ of the auxiliary model are again used as a surrogate for changes in c. In particular, a counterfactual $x'_{fair}$ should change the probability of belonging to a certain group, leading to the constraint $$\left| f_C\left(x'_{fair}\right) - f_C(x) \right| > \delta \tag{32}$$

For the single-step attacks, it is mandated that changes in the auxiliary model should not transfer to the task predictor. Empirically, multi-step attacks may be less transferable than single-step attack. Ultimately, however, demonstration that the task predictor exhibits low variance when the auxiliary model demonstrates high variance is needed. Thus $\delta$ is imposed as a lower bound on the variance of the auxiliary model, it should be imposed as an upper bound on the variance of the task predictor:

$$d_O\left(y, f_Y\left(x'_{fair}\right)\right) < \delta \tag{33}$$

A generalized local fairness may be defined as follows: a machine learning model $f_Y$ is fair if for all points x' in a neighbourhood of x, the variance in $f_Y$ is strictly less than the variance of an auxiliary machine learning model $f_C$:

$$\forall x' (d_f(x,x') \leq \epsilon) \wedge (d_O(y,f(x')) < \delta) \wedge (d_O(y,f(x')) < |f_C(x') - f_C(x)|)$$

where $\delta$ may be a fairness indicator value providing a measure of (e.g. highest acceptable) bias in a neighbourhood around x (defined by $\forall x' d_f(x,x') \leq \epsilon$)

To test for (e.g. disprove) generalized local fairness, it may be sufficient to identify a counterfactual for which the variance in $f_Y$ is greater than the variance in $f_C$. This counterfactual may be found by jointly maximizing over $f_Y$ and $f_C$. This involves only an addition to equation (3):

$$x'_{fair} = \text{argmax}_{d_I(x,x') < \epsilon} \mathcal{L}_{fair}(x') \quad (34)$$

$$\mathcal{L}_{fair}(x') = d_O(y, f_Y(x')) + \lambda f_C(x') \quad (35)$$

Here, $\lambda$ is a hyperparameter that balances the loss between $f_Y$ and $f_C$. To find counterfactuals, $\mathcal{L}_{fair}$ may be substituted in place of the loss function used in a multi-step attack algorithm.

An example is provided in Algorithm 2 below, which is a modification of an iterative attack.

An algorithm is described with comprehension notes included in brackets [ . . . ].

Algorithm 2: Iterative FGSM Independence Test
Result: Flag unfair model behaviour
Input: Task predictor $f_Y$, auxiliary model $f_C$, output metric $d_0$, datapoint (x, y)
Params: Input bound $\epsilon$, loss weight $\lambda$, number of iterations T, step size $\alpha$ $$x'_0 \leftarrow x;$$

[A counterfactual may be first initialized at iteration 0 with an original datapoint.]

for t←0 to T−1 do [Details at each iteration are described below.]

$$\mathcal{L}_{fair} \leftarrow d_O(y, f_Y(x'_t)) + \lambda f_C(x'_t);$$

[Computation of a loss or loss function.]

$$x'_{t+1} \leftarrow x'_t + \alpha \, \text{sign}(\nabla \mathcal{L}_{fair});$$

[Computation of the gradient of the loss function: take an element-wise sign function to convert the elements of the gradient $\nabla \mathcal{L}_{fair}$ into either +1 or −1 (in some embodiments: either +1, −1, or 0), and shift the counterfactual at the previous iteration $$x'_t$$

(i.e. at iteration t) by an amount $\alpha$ in a direction $\text{sign}(\nabla \mathcal{L}_{fair})$ (the direction may or may not be represented by a unit length vector) determined by the sign function of the gradient, to produce a counterfactual $$x'_{t+1}$$

at iteration t+1.]

$$x'_{t+1} \leftarrow \text{clip}(x_{t+1}, x + \epsilon, x - \epsilon);$$

[Clipping the new counterfactual (i.e.

$$x'_{t+1},$$

and at iteration t+1) so that it lies within the input bound.]
end
Raise flag if $$d_O(y, f_Y(x'_T)) > |f_C(x'_T) - f_C(x)|.$$

[Discrimination is evidenced if the change in $f_Y$ (as measured by $d_0$) is greater than the change in $f_C$ (as measured by the absolute deviation).]

The task predictor $f_Y$ is the machine learning model, and is configured to generate the target prediction y based on the input variable x, as represented by the datapoint (x, y).

The output metric $d_0$ is a metric on the target space, e.g. it may be a Euclidean distance.

The input bound $\epsilon$ is a tolerance on the input variable, e.g. as determined from noise in the input variables. In various embodiments, $\epsilon$ (epsilon) may be specified according to group level statistics or individual level statistics, e.g. based on business considerations.

In various embodiments of group level statistics, $\epsilon$ may be indicative of a proportion of the overall range of a given feature, or may be indicative of percentiles of that feature. In some embodiments of individual level statistics, individual bounds may be specified in terms of variance.

For example, group and individual level statistics may be prescribed for a feature that describes the amount of money in a person's bank account. The account balance may fluctuate according to transactions made by the individual. A group level statistic may examine the distribution of account balances across the entire dataset (as a function of time), and specify an $\epsilon$ based on differences in various percentiles. As an illustration, the account balance of a person in the 50th percentile may not be expected to fluctuate by more than 1 percentile. In this case, $\epsilon$ may be defined by a metric distance between the 50th and 51st percentile. An individual level statistic may be given by the variance in a individual person's account ($\epsilon$ is given by the variance), given the individual person's transaction history.

The loss weight $\lambda > 0$, number of iterations $T > 0$, step size $\alpha > 0$ are optimization parameters that may be adjusted to achieve convergence in a reasonable amount of time.

The clip function may saturate a variable (with upper and lower bounds specified) or otherwise clip it to the respective bound when it is exceeded.

While these stronger attacks may find discriminatory behaviour that the present attack cannot, there are some considerations that must be made in the interpretation of the resulting counterfactuals. Some of these are noted below.

Extensions to the auxiliary model approach which mitigate the effects of modelling error were proposed for single-step attacks. Other extensions may be needed if multi-step attacks are used, especially if the auxiliary model has a lower accuracy. In particular, allowing multi-step attacks increases the risk that the counterfactuals produced will be out of distribution samples, which may be less meaningful for tests of fairness.

Using multi-step attacks there is no guarantee that the new adversarial examples would contain variations exclusively in c.

Finally, because the tests are enforced locally, a task-specific metric to quantify how "small" a perturbation is not required. This alone is an improvement over FTA. However, it also means that there is single parameter, the tolerance $\delta$ for the variation in the outputs. Allowing for multi-step attacks will require an additional tolerance E to be specified for the variation of the inputs, as in (4).

Figures 6A, 6B:
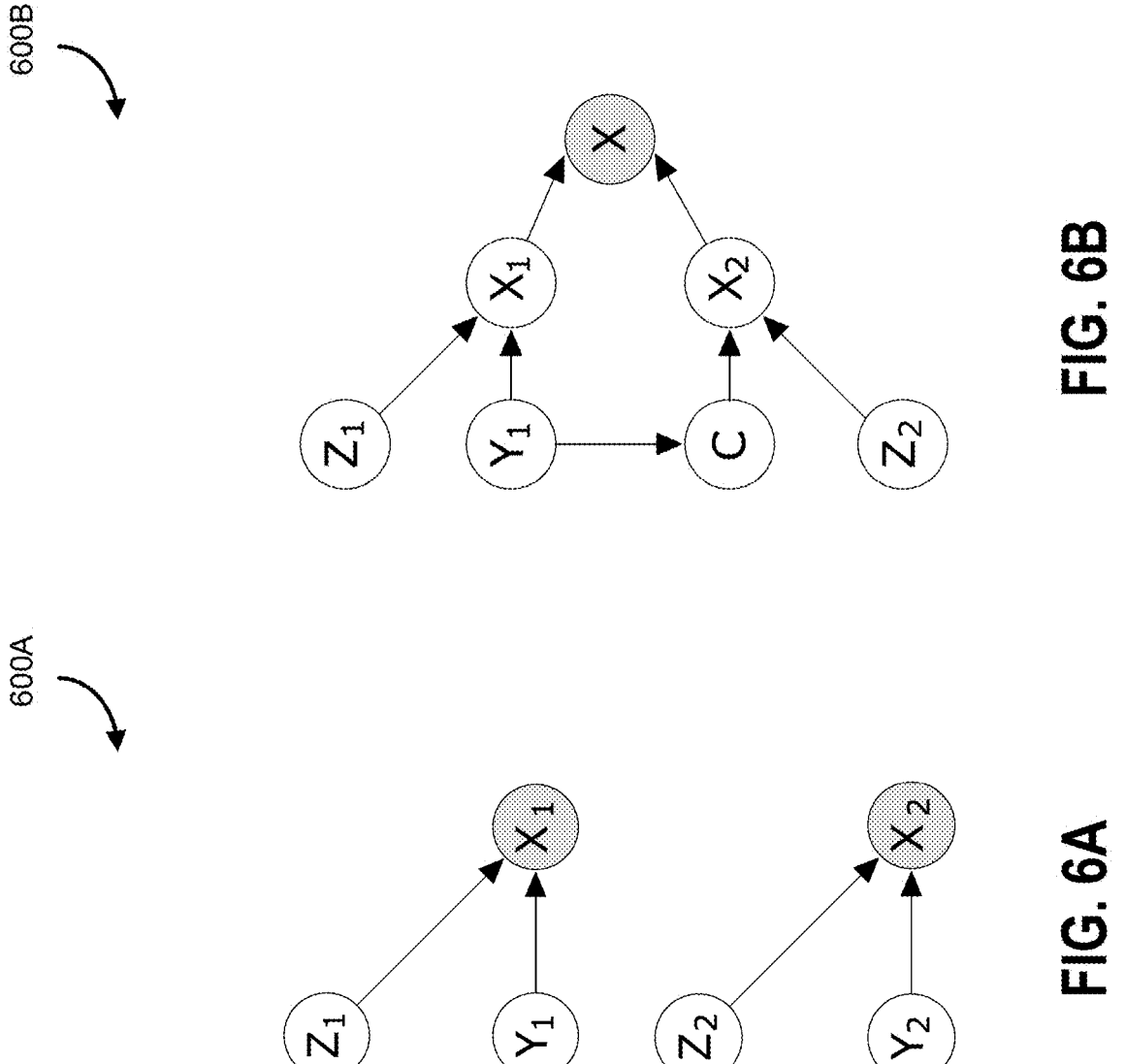
FIG. 6A are graph representations of example generative models of unbiased datasets.
FIG. 6B is a graph representation of a synthetic bias pipeline fusing the unbiased datasets of FIG. 6A to generate a dataset with synthetic historic bias.

FIG. 6A are graph representations of example generative models 600A for unbiased datasets. In both data sets the observable features X are distributed according to a target Y and latent variables Z. There are no distinct populations in either dataset, and so there is no bias FIG. 6B is a graph representation of a synthetic bias pipeline 600B fusing the unbiased datasets of FIG. 6A to generate a dataset with synthetic historic bias.

In various embodiments, systems for synthetic data generation may comprise one or more processors operating in conjunction with computer memory, the one or more processors may be configured to execute one or more methods for synthetic data generation. Various embodiments may include non-transitory computer readable medium or media storing machine interpretable instructions, which when executed by a processor, cause the processor to perform one or more methods for synthetic data generation.

Algorithm 3: Synthetic Data Generation
Result: Obtain samples x from a biased dataset
Input: Joint distribution $\Pr(c, y)$, latent priors $\Pr(z_1)$, $\Pr(z_2)$, generative models $\Gamma_y$, $\Gamma_c$, fusion function F
1. Sample $z_1 \sim \Pr(z_1)$ and $z_2 \sim \Pr(z_2)$.
2. Sample $(y, c) \sim \Pr(c, y)$
3. Compute $x_1 = \Gamma_y(z_1, y)$, $x_2 = \Gamma_c(z_2, c)$
4. Compute $x = F(x_1, x_2)$ $X_1$ and $X_2$ are fused together to form a new dataset X, which contains two distinct patterns of variation. The target of the second dataset $Y_2$ is declared to be a sensitive attribute, labeled with C. Historical bias is introduced using a correlation between Y and C. Models trained on the new dataset may learn to exploit the C dependence of X to predict Y, which corresponds to discriminatory behaviours.

This algorithm for synthetic data generation can also be stated as:

```
Result: Obtain samples x from a biased dataset
Input: Joint distribution Pr(c, y), latent priors
       Pr(ẑ), Pr(ž), generative models Γ_y, Γ_c,
       fusion function F
1. Sample ẑ ~ Pr(ẑ) and ž ~ Pr(ž).
2. Sample (y, c) ~ Pr(c, y)
3. Compute x̂_i = Γ_y(ẑ, y), x̃_j = Γ_c(ž, c)
4. Compute x = F(x̂_i, x̃_j)
```

Specific algorithms for building models of dataset bias may be obtained that allow construction of synthetic datasets. Bias may be injected into existing datasets. Such a synthetic approach may include or reflect real-world limitations in data collection, or reflect real-world relationships.

While datasets contain multiple sources of variation, models may preferentially exploit the most amenable patterns to achieve their performance objective. Thus, if inferring a target y from x is challenging, a model may exploit the c-dependence of x if c is correlated with y. A dataset containing different patterns may thus be constructed, as visualized in FIG. 6A and FIG. 6B.

The overall goal is to construct a dataset with the structure shown in FIG. 1F. To this end the following must be identified:

Observable features x. This may be done by taking two existing datasets, and fusing them together.

More specifically, consider two different datasets, $\mathcal{D}_1$ and $\mathcal{D}_1$, which respectively consists of (input, output) pairs $(x_1, y_1)$ and $(x_2, y_2)$. Suppose $\mathcal{D}_1$ poses a more challenging machine learning problem. As an example, consider using the MNIST dataset as $\mathcal{D}_1$, and the iris dataset as $\mathcal{D}_2$. The inputs $x_1$ and $x_2$ are fused using a transformation F as follows:

$$x = F(x_1, x_2) \tag{36}$$

Targets y: The target of the more challenging task, $y_1$, becomes the target of the fused dataset.

Populations c: The target of the easier task, $y_2$, becomes the sensitive attribute of the fused dataset.

Latent factors z: As shown in FIG. 6A, both $\mathcal{D}_1$ and $\mathcal{D}_2$ contain latent variables $z_1$ and $z_2$. While these are not observable, Conditional Variational Autoencoders (CVAEs) are trained to model them. In this way models $\Gamma_y$, and $\Gamma_c$ are built for the two datasets.

To inject a historical bias, a correlation is imposed between y and c, using a joint distribution $\Pr(C, Y)$. In the present experiments, one dimensional target variables are considered. When y and c are both discrete the bias may be specified using a confusion matrix. Alternatively when y and c are both real, a normal distribution may be used:

$$Pr(c, y) = \mathcal{N}(c - y; 0, \sigma^2) \tag{37}$$

Here the variance $\sigma^2$ controls amount of bias. The full sampling procedure is describe in the algorithm below. A case study where a colour bias is injected into MNIST is presented below.

In fusing the datasets, there may be a slight constraint: while the aim is to mix the different patterns, they must also be distinct enough that the learning task can be performed. As such, some fusion transforms are described below. The relations $(y, x_1)$ and $(c, x_2)$ correspond to real patterns.

Concatenate the vectors $x_1$ and $x_2$:

$$x = concat(x_1, x_2) \tag{38}$$

This corresponds to zero mixing.
Mix $x_1$ and $x_2$ by taking the outer $x_1 \otimes x_2$.
Take a linear combination:

$$x = W_1 x_1 + W_2 x_2 \tag{39}$$

Employ a nonlinear mixing strategy:

$$x = concat(x_1 \otimes \cos(\pi x_2), x_1 \otimes \sin(\pi x_2)) \tag{40}$$

The unbiased information in $x_1$ may be extracted from x using a quadratic transformation.

Because the datasets are constructed using generative models, counterfactual fairness may be used to define a ground truth for individual fairness. Using the algorithm, the latent variables $(z_1, z_2)$ are first sampled, along with targets y, and group c. Using the generative models, $x_1$ may then be sampled from $(z_1, y_1)$, $x_2$, and used to construct an instance x. To generate a counterfactual, this process is repeated, but c' is used in place of c to generate x'. The individual is treated fairly is treated fairly by the model $f_Y$ if:

$$d_O(f_Y(x), f_Y(x')) < \delta \tag{41}$$

Where the metric $d_O$ and the threshold $\delta$ are chosen based on the datasets used.

Training fair models may be possible with methods and systems disclosed herein. A model is counterfactually fair if its predictions are only based on the information in $x_1$. This suggests an architecture for fair models:

$$h = encoder(x; \theta_E) \tag{42}$$

$$y = decoder(h; \theta_D) \tag{43}$$

To construct a fair model, h is trained to output $x_1$ given x. The parameters of the encoder are then frozen, and the decoder is trained to output y based on the outputs of the encoder. To make an unfair model, the same architecture is employed, but now it is trained end-to-end: that is, the full model is trained to accept x as input and output y, without pre-training.

In various embodiments, exemplary methods for training fair models may reflect embodiments of such architectures. In various embodiments, systems for training fair models may comprise one or more processors operating in conjunction with computer memory, the one or more processors may be configured to execute one or more methods for training fair models. Various embodiments may include non-transitory computer readable medium or media storing machine interpretable instructions, which when executed by a processor, cause the processor to perform one or more methods for training fair models. For example, non-transitory computer readable media may include electro-mechanical data storage devices (such as hard disk drives using magnetic storage), integrated circuit assemblies storing data (such as solid-state drives, e.g., flash memory), or optical storage media (such as CDs, DVDs, blu-ray, or other disc storage solutions).

Figure 7B:
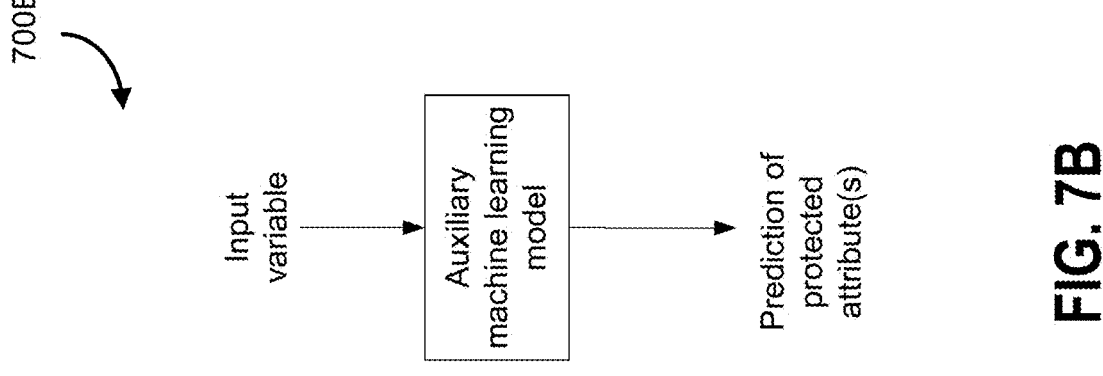
FIG. 7B is schematic block diagram of an exemplary auxiliary machine learning model.
Figure 7A:
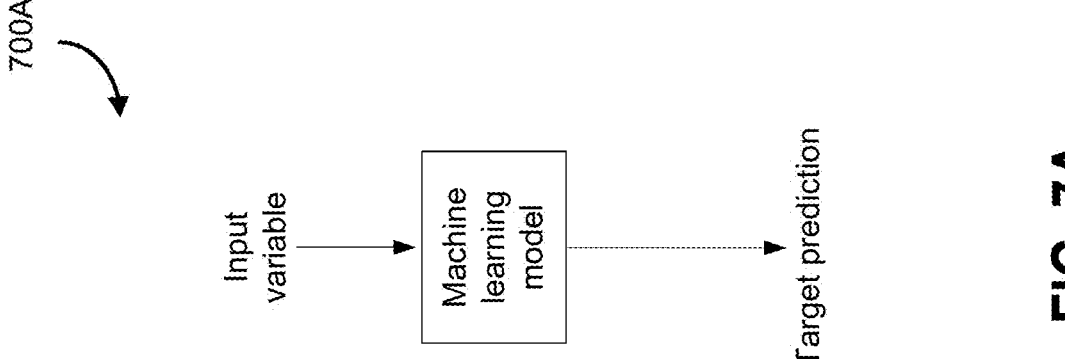
FIG. 7A is schematic block diagram of an exemplary machine learning model.

FIG. 7A is schematic block diagram of an exemplary machine learning model 700A. The machine learning model may be configured to generate target predictions based on an input variable (such as a vector). In various embodiments, the machine learning model may be a supervised learning model.

FIG. 7B is schematic block diagram 700B of an exemplary auxiliary machine learning model 700B. The auxiliary machine learning model may be configured to generate predictions of one or more protected attributes based on the input variable. In various embodiments, the auxiliary machine learning model may be a supervised learning model. In some embodiments, the supervised learning model may be trained at least partially based on known values (e.g., from measurements or a dataset) of the one or more protected attributes. In various embodiments, the auxiliary machine learning model may be suitable for adversarial attack, e.g. as part of a multi-step adversarial attack engine.

Figure 8:
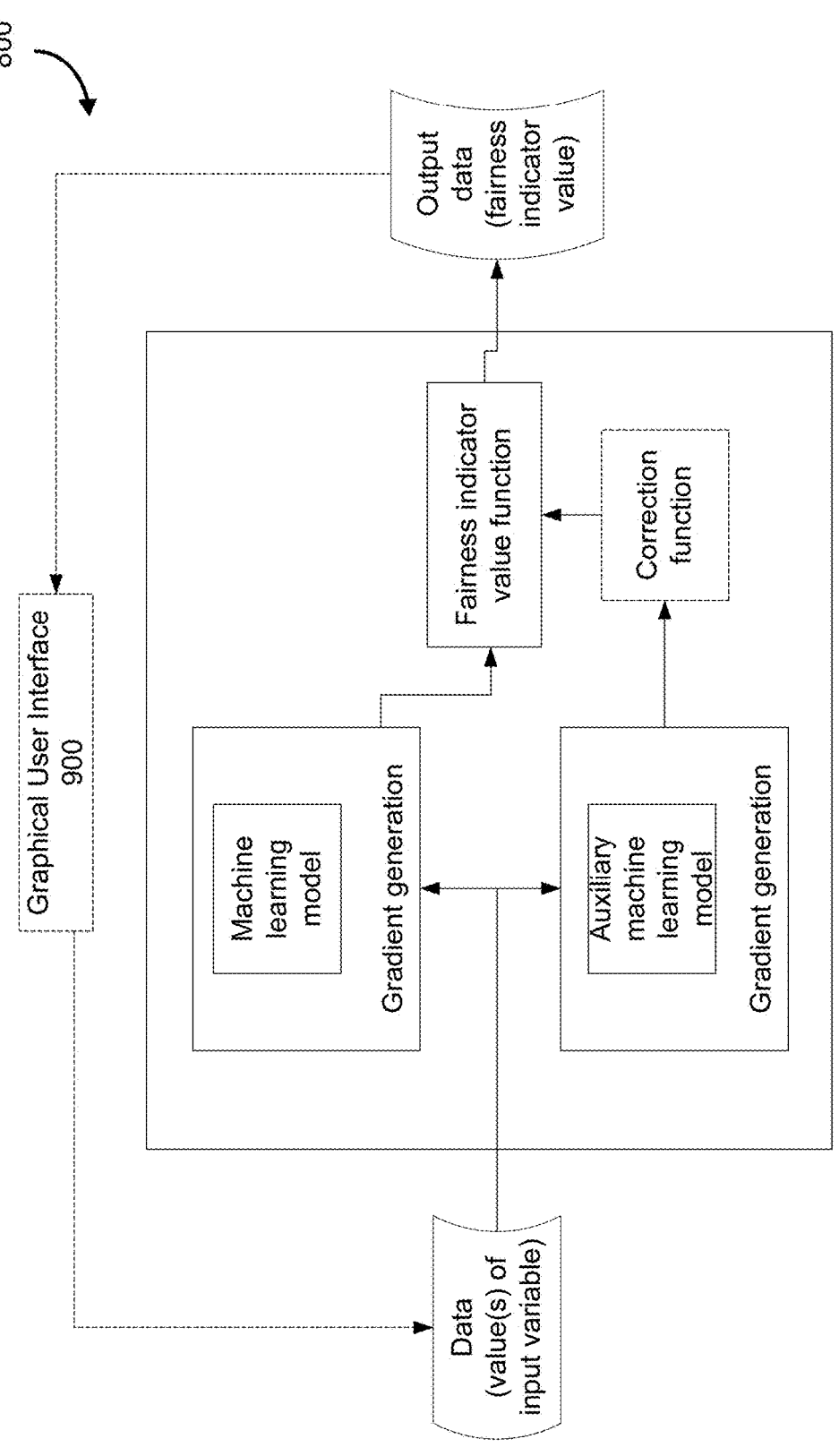
FIG. 8 is schematic block diagram of an exemplary system for diagnosing fairness of a machine learning model.

FIG. 8 is schematic block diagram of an exemplary system 800. In various embodiments, the system 800 may suitable for diagnosing fairness of a machine learning model. The system may be configured to receive data representative of a value of the input variable of the machine learning model. The input variable may be associated with an actual target prediction the machine learning model.

The system may be configured to generate output data representative of a fairness indicator value of the machine learning model. The fairness indicator value is indicative of discrimination risk due to the target predictions generated by the machine learning model.

The system may be configured to generate the fairness indicator value (e.g. the embodiments of metrics shown in FIGS. 4A-4B) by comparing a first vector to a second vector. The first and second vectors may be vectors in the sense of vector spaces, e.g. they may be matrix-valued. The first vector indicative of a gradient of the machine learning model evaluated at the value of the input variable and the second vector indicative of a gradient of an auxiliary machine learning model evaluated at the value of the input variable. The first and second vectors may be approximations, surrogates, depend on surrogates, or heuristics.

In various embodiments, the first vector may be compared to the second vector using a projection of the first vector on to the second vector. In various embodiments, comparing the first vector to the second vector includes using a norm of a projection value, where the projection value is obtained by projecting the first vector on to the second vector and dividing by a L2 norm of the second vector (e.g., Euclidean distance). In some embodiments, second vector is representative of an output of a sign function of the gradient of the auxiliary machine learning model evaluated at the value of the input variable. In various embodiments, the second vector is indicative of a modified gradient when the gradient of the auxiliary machine learning model is associated with out-of-distribution predictions of the auxiliary machine learning model (see discussion above).

In various embodiments, the (input) value is one of a plurality of values configured to be received by the one or more processors, the fairness indicator value is one of a plurality of fairness indicator values, each of the plurality of fairness indicator values generated based on a corresponding one of the plurality of values, and the output data is indicative of whether an aggregated measure of the plurality of fairness indicators exceeds a predefined fairness threshold.

In some embodiments, each of the plurality of fairness indicator values is indicative of a covariance between the gradient of the machine learning model evaluated at the corresponding one of the plurality of values and the gradient of the auxiliary machine learning model evaluated at the corresponding one of the plurality of values. In some embodiments, the aggregated measure is an L-p norm.

In various embodiments, the input variable includes an observable attribute correlated with at least one of the one or more protected attributes via an unobserved latent variable.

In various embodiments, the system 800 may suitable for fairness testing of a machine learning model using adversarial attack (e.g. similar to the discussion around equations 24-25 and associated optimization problem). In various embodiments, the system 800 may deploy a multi-step adversarial attack engine configured to receive an actual value x of the input variable associated with an actual target prediction y.

In various embodiments, the system 800 may be configured to iteratively generate, using a multi-step adversarial attack engine configured to receive the actual value x and an auxiliary machine learning model $f_C(x')$ configured to generate predictions indicative of one or more protected attributes, one or more counterfactual values $$\{x_i'\}_{i=0}^{T}$$

of the input variable adapted to increase an iteration-specific loss value, e.g., as computed from a loss function similar to equation 25. The iteration-specific loss value $$\mathcal{L}_{fair}(x_k'), k \in [0, T]$$

may be jointly indicative of a counterfactual-specific first distance $$d_{first}(f_C(x_k'), f_C(x))$$

and a counterfactual-specific second distance $$d_{second}(f_Y(x'_k), y).$$

In some embodiments, the outcome may be as described in FIGS. 6A-6B.

In various embodiments, the system 800 may be configured to generate output data representative of an unfairness indicator if $$d_{first}(f_C(x'_k), f_C(x)) < d_{second}(f_Y(x'_k), y)$$

for at least one $k \in [0, T]$.

In various embodiments, the one or more counterfactual values $$\{x'_i\}_{i=0}^T$$

are confined to within a neighborhood of the actual value x. In various embodiments, for each of the one or more counterfactual values $x'_k$, $k \in [0, T]$, the counterfactual-specific first distance $$f_C(x'_k), f_C(x)$$

is of a counterfactual prediction $$f_C(x'_k)$$

indicative of one or more protected attributes from an actual prediction $f_C$ (x) indicative of the one or more protected attributes. In various embodiments, the counterfactual-specific second distance $$d_{second}(f_Y(x'_k), y)$$

is of a counterfactual target prediction $$f_Y(x'_k)$$

generated by the machine learning model from the actual target prediction y. The distance functions $d_{first}$ and $d_{second}$ may be metrics in some embodiments (e.g. similar to equation 23 and Algorithm 2).

In various embodiments, the system 800 may be configured to execute an exemplary method for fairness testing of a machine learning model using adversarial attack.

Figure 9:
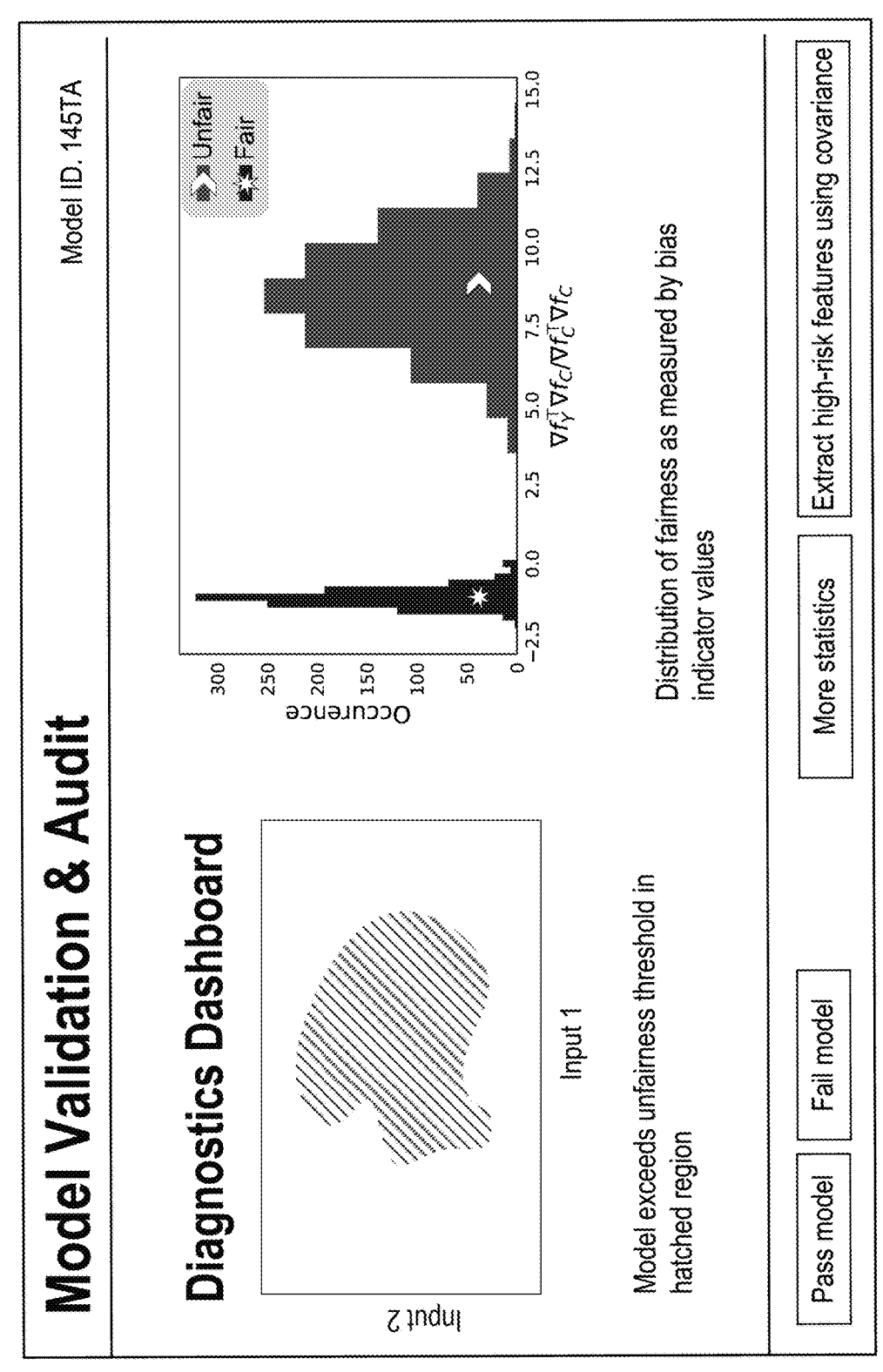
FIG. 9 is an exemplary GUI of a system for diagnosing fairness of a machine learning model.

FIG. 9 is an exemplary graphical user interface (GUI 900) of a system for diagnosing fairness of a machine learning model. The GUI 900 may be coupled to the system 800.

FIG. 10A is an exemplary algorithm 1000A for fairness testing, similar to Algorithm 1 discussed previously. FIG.

10B is an exemplary algorithm 1000B for fairness testing, similar to Algorithm 2 discussed previously.

FIG. 11 is an example computing device, according to various embodiments. The device 1100, such as a computer server, can be utilized to implement the system of 800, or the algorithms 1000A or 1000B. The device 1100 includes one or more processors 1102, which operate in conjunction with computer memory 1104.

The computer memory 1104 can be adapted to store various non-transitory computer readable instruction sets, which can be executed on the processors 1102 to cause the performance of various methods described herein.

The computer memory 1104 can maintain data objects representing the classifier models stored herein and refined through one or more training epochs. An input/output interface 1106 can be utilized to receive various input commands, for example, through an attached keyboard, mouse, or touch input, and generate various outputs, such as screen renderings for display on a computer display of a computer or a mobile device.

A networking interface 1108 can be utilized to communicate one or more data sets, for example, through a message bus or other enterprise communication linkage. Networking interface 1108 can be adapted to obtain machine learning models or inputs thereof, for example, as the model validation and auditing process takes place.

The device 1100, in some embodiments, can be a special purpose machine, such as a rack mounted appliance, that is specially adapted and configured to receive data representative of machine learning models and inputs suitable for those models, and to generate outputs suitable for characterizing or testing fairness. For example, device 1100 can be a computer appliance that can be used by a team member of a model audit team or a model designer, to improve model fairness.

FIG. 12 is a process diagram of an exemplary method 1200 for diagnosing fairness of a machine learning model.

At step 1202, the method 1200 includes receiving data representative of a value of an input variable of the machine learning model, the machine learning model configured to generate target predictions based on the input variable.

At step 1204, the method 1200 includes generating a first vector indicative of a gradient of the machine learning model evaluated at the value of the input variable.

At step 1206, the method 1200 includes generating a second vector using an auxiliary machine learning model configured to generate predictions indicative of one or more protected attributes based on the input variable, the second vector indicative of a gradient of the auxiliary machine learning model evaluated at the value of the input variable.

At step 1208, the method 1200 includes comparing the first vector to the second vector to generate a fairness indicator value.

At step 1210, the method 1200 includes generating output data representative of the fairness indicator value.

FIG. 13 is a process diagram of an exemplary method 1300 for fairness testing of a machine learning model using adversarial attack. The machine learning model is configured to generate target predictions $y'=f_Y(x')$ based on an input variable x', the method comprising:

At step 1302, the method 1300 includes receiving data representative of an actual value x of the input variable associated with an actual target prediction y.

At step 1304, the method 1300 includes generating itera- tively, using a multi-step adversarial attack engine config- ured to receive the actual value x and an auxiliary machine learning model $f_C(x')$ configured to generate predictions indicative of one or more protected attributes, one or more counterfactual values $$\{x'_i\}_{i=0}^T$$

of the input variable adapted to increase an iteration-specific loss value, the iteration-specific loss value $$\mathcal{L}_{fair}(x'_k), k \in [0, T]$$

jointly indicative of a counterfactual-specific first distance $$d_{first}(f_C(x'_k), f_C(x))$$

and a counterfactual-specific second distance $$d_{second}(f_Y(x'_k), y).$$

At step 1306, the method 1300 includes generating output data representative of a unfairness indicator if $$d_{first}(f_C(x'_k), f_C(x)) < d_{second}(f_Y(x'_k), y)$$

for at least one $k \in [0,T]$.

The one or more counterfactual values $$\{x'_i\}_{i=0}^T$$

is confined to within a neighborhood of the actual value x. For each of the one or more counterfactual values $x'_k$, $k \in [0,T]$, the counterfactual-specific first distance $$f_C(x'_k), f_C(x)$$

is of a counterfactual prediction $$f_C(x'_k)$$

indicative of one or more protected attributes from an actual prediction $f_C(x)$ indicative of the one or more protected attributes, and the counterfactual-specific second distance $$d_{second}(f_Y(x'_k), y)$$

is of a counterfactual target prediction $$f_Y(x'_k)$$

generated by the machine learning model from the actual target prediction y.

Additional Experiments are described below.

Applicants evaluate the proposed $f_{Aux}$ test of some embodiments to answer the following research questions (RQs):

RQ1: Given the target model $f_{tar}$ trained on synthetic datasets whose ground-truth degrees of bias are known, how well does the $f_{aux}$ methods perform compared to the existing testing methods?

RQ2: Given the target model $f_{tar}$ trained on the real dataset whose ground-truth degree of bias is unknown, can $f_{Aux}$ identify discriminatory features?

RQ3: How efficient is $f_{aux}$ compared to the existing approaches in terms of inference cost?

RQ4: Does $f_{aux}$ have any conditions needed to guarantee reliable test performance? In particular, Applicants want to know how the effect of auxiliary model per- formance would impact the test performance.

Experimental Setup

FTA: A local version of the Fairness Through Awareness definition, (John, Vijaykeerthy, and Saha 2020). In these approaches, the neighbourhood around the input $x_i$ is rigorously searched over to ensure a bound on the output deviation $\phi_{out}(f_{tar}(x_i), f_{tar}(x_j))$. In the limit that the size of this neighbourhood goes to zero, this is equivalent to a bound on the $l_p$ norm of $\nabla f_{tar}$. Appli- cants also consider using a weighted $l_p$-norm, where the weights come from a linear auxiliary model (Ruoss et al. 2020; Yurochkin, Bower, and Sun 2020).

Unfair Map: Given an individual $x_i$, the Unfair Map (Maity et al. 2021) uses a gradient-flow attack to generate individuals $x_j$ that violate FTA. The test sta- tistic is then the ratio between the model's performance measure on $x_i$ and $x_j$. This attack is conducted within a neighbourhood defined by a similarity metric $\phi_{in}$, and to this end, Applicants can employ the same weighted $l_p$ norm used in FTA.

FlipTest: FlipTest (Black, Yeom, and Fredrikson 2019) is a testing approach that aims to enforce the CFF defi- nition by leveraging Wasserstein GANs as its backbone generative model. As Applicants mentioned previously, training the generative model is tricky in terms of requiring various parameters to control its perfor- mance. Thus, to reduce the tuning range, Applicants keep the architecture settings constant by defining both the generator and discriminator as fully connected networks.

$f_{Aux}$: Applicants include all variants of the $f_{aux}$ method proposed in this paper and described in the Relaxations and Extensions section. Applicants set the auxiliary model architecture to be a fully connected network.

LIC-UB: The upper-bound performance of a testing approach that aims to enforce the Local Independence Criterion (LIC) described previously. For the experi- ments on synthetic datasets, Applicants can access the ground truth generative model for the data and so Applicants can compute the true gradient of the gen- erative model (instead of approximating it with the auxiliary model) to conduct the LIC check. Since error introduced by the approximation is removed, the test performance should achieve its upper-bound.

Target Models: Given datasets in the form D={ . . . (x, y, c) . . . }, Applicants train multi-layer fully connected networks as the target models $f_{tar}$ with only features x and label y. The target models in the experiments are all classifiers that aim to produce probabilistic predictions P(y|x). However, as previously discussed, an unfair model may infer protected variable C, resulting in it implicitly modeling P(y|x, c).

Synthetic Datasets with Ground Truth Bias—To produce realistic synthetic data in which the bias cannot be immediately recognized by human auditors, Applicants propose bridging and augmenting real datasets through a series of fusion operations that join datasets based on a intentionally biased data sampling process. Specifically, given two datasets $\hat{D}=\{$ . . . $(\hat{x}_i,\hat{y}_i)$ . . . $\}$ and $\tilde{D}=\{$ . . . $(\tilde{x}_j,\tilde{y}_j)$ . . . $\}$, with a fusion operation, Applicants can produce a synthetic dataset $D_{syn}$ such that $D_{syn}=\{$ . . . (x, y, c) . . . $\}=\{$ . . . $(f_{fus}(\hat{x}_i, \tilde{x}_j), \hat{y}_i, \tilde{y}_j)$ . . . $\}$, where $$y \overset{def}{=} \hat{y}_i, c \overset{def}{=} \tilde{y}_j,$$

and $f_{fus}$ is a fusion operation (see below for examples). While this looks simple, the selection of data indices i and j for fusion is based on the predefined generative model under the hood. Furthermore, the generative model controls the degree of bias for the synthetic datasets with hyper-parameters. Hence, the entire synthetic data generation process reproduces the historical bias.

A full description of generating synthetic data (including generative model specifics) could be found in Appendix. Here, Applicants summarize two key hyper-parameters of the data generator, which Applicants will use to control ground-truth data bias and complexity.

Bias Level: The bias level controls the level of dependency between Y and C in the range of [0,1]. A Higher bias level results in larger correlation between Y and C in the generated dataset.

Fusion Function: A fusion function determines how the feature vectors from the two datasets are merged Evaluating Fairness Tests and Selecting δ

Having access to the ground-truth generative model, Applicants can compute the individual fairness score (IFS) described in Definition 1 for each generated synthetic data sample. IFS will serve as the ground-truth label in the following experiments on synthetic datasets.

In flagging discrimination in practice, it is necessary to set a value for the threshold δ. This threshold is usually set by regulatory standards that depend on problem domain or statistics of manual auditing results. Indeed, the selection of specific thresholds is a subtle question (Corbett-Davies and Goel 2018), and in practice, decision-making may involve multiple thresholds (one or more thresholds for each population) that require further domain-specific study (Corbett-Davies et al. 2017).

In the experiment/evaluation setting, however, Applicants aim to avoid misleading conclusions associated with particular threshold δ. To this end, Applicants estimate the continuous discrimination score and obtain a precision-recall curve as a metric. Similarly, Applicants compare the tests based on average precision. This enables one to determine which test is the most reliable across a range of different thresholds.

Experiments—Real Datasets

Applicants also compare the proposed model with the baseline models on real data sets:

Adult Income Dataset (Dua and Graff 2017): The protected attribute is gender, a binary variable (Female/Male).

Bank Marketing Dataset (Moro, Cortez, and Rita 2014): The protected variable is age (binarized by thresholding at 25).

Performance on Synthetic Data

Table 1 compares the proposed fAux methods with two state-of-the-art testing approaches on the synthetic datasets. Table 1: Performance Comparison among Individual Fairness Testing Methods on Synthetic Datasets. Applicant report Average-Precision scores with the highest score in bold font. The confidence interval comes from 10 runs by re-training auxiliary models. Rows are sorted in order of increasing computational requirements.

| | Synthetic-1 | Synthetic-2 | Synthetic-3 | Synthetic-4 | Synthetic-5 | Synthetic-6 | Synthetic-7 | Synthetic-8 |
|---|---|---|---|---|---|---|---|---|
| | | | | | xc/xy | | | |
| | magic/ backache | magic/ backache | magic/ backache | magic/ backache | australian/ credit | australian/ credit | australian/ credit | australian/ credit |
| | | | | Bias Level | | | | |
| | 0.5 | 0.5 | 1 | 1 | 0.5 | 0.5 | 1 | 1 |
| | | | | Fusion Approach | | | | |
| | outer | concat | outer | concat | outer | concat | outer | concat |
| PTA | 0.307 ± 0.000 | 0.306 ± 0.000 | 0.307 ± 0.000 | 0.307 ± 0.000 | 0.466 ± 0.000 | 0.293 ± 0.000 | 0.355 ± 0.000 | 0.309 ± 0.000 |
| PTA + lin. aux | 0.402 ± 0.000 | 0.683 ± 0.003 | 0.451 ± 0.001 | 0.455 ± 0.001 | 0.709 ± 0.000 | 0.658 ± 0.00 | 0.672 ± 0.000 | 0.612 ± 0.000 |
| Unfair Map | 0.407 ± 0.000 | 0.400 ± 0.000 | 0.576 ± 0.000 | 0.820 ± 0.000 | 0.571 ± 0.000 | 0.653 ± 0.000 | 0.687 ± 0.000 | 0.732 ± 0.000 |
| FlipTest | 0.598 ± 0.285 | 0.880 ± 0.015 | 0.433 ± 0.259 | 0.633 ± 0.109 | 0.600 ± 0.148 | 0.678 ± 0.056 | 0.701 ± 0.209 | 0.732 ± 0.132 |
| fAux | 0.332 ± 0.004 | 0.998 ± 0.001 | 0.311 ± 0.002 | 1.000 ± 0.000 | 0.615 ± 0.032 | 0.937 ± 0.005 | 0.564 ± 0.014 | 0.997 ± 0.001 |
| fAux + NG | 0.876 ± 0.015 | 0.999 ± 0.001 | 0.978 ± 0.023 | 1.000 ± 0.000 | 0.815 ± 0.015 | 0.947 ± 0.006 | 0.910 ± 0.019 | 0.999 ± 0.001 |
| fAux + IG | 0.717 ± 0.031 | 0.998 ± 0.000 | 0.937 ± 0.012 | 1.000 ± 0.000 | 0.886 ± 0.015 | 0.944 ± 0.002 | 0.979 ± 0.007 | 0.999 ± 0.001 |
| LIC-UB | 0.998 | 0.999 | 1.000 | 1.000 | 0.965 | 0.966 | 0.999 | 0.999 | together. It controls how many elements in features X have correlations with protected variable C after merging. Applicants have two variants: Concatenation which stacks features without changing the element values (see (Kusner et al. 2017))), and the outer product which blends features perfectly.

Applicants make the following observations:

1. Applicants note the fAux outperforms FTA with a large margin across all the experiments in the Table 1. Applicants will describe the further investigations into the performance gap later.

2. Among all $f_{Aux}$ variants, the fAux+NG shows the most promising test performance, especially when Applicants compare the variants based on their worst-case performance. However, when the accuracy of the auxiliary model is lower (as it is with the Australian dataset), $f_{Aux}$+IG becomes the more reliable test.

3. The baseline $f_{Aux}$ shows unsatisfactory performance compared to the other variants. This observation reflects the consideration that controlling the variance of gradients is critical to maintaining good performance.

4. FlipTest demonstrates competitive performance on some datasets but has larger variability in performance than the proposed $f_{aux}$ models. This variability probably comes from the quality difference of the deep generative models trained during the testing process. In particular, Applicants note the FlipTest is sensitive to the fusion approach that is used for creating the synthetic datasets. As the feature size increases (with the outer product), it appears difficult for FlipTest to correctly model the causal relations through deep generative models.

Performance on Real Data

In the absence of ground truth labels for discrimination, Applicants cannot quantify the precision of a fairness test at the level of individual datapoints. However, Applicants may still compare their ability to distinguish fair and unfair models, as is done in (Maity et al. 2021; Yurochkin and Sun 2021). Applicants construct fair models by employing adversarial regularization (Adel et al. 2019); models become spontaneously unfair in the absence of such regularization.

Figure 14:
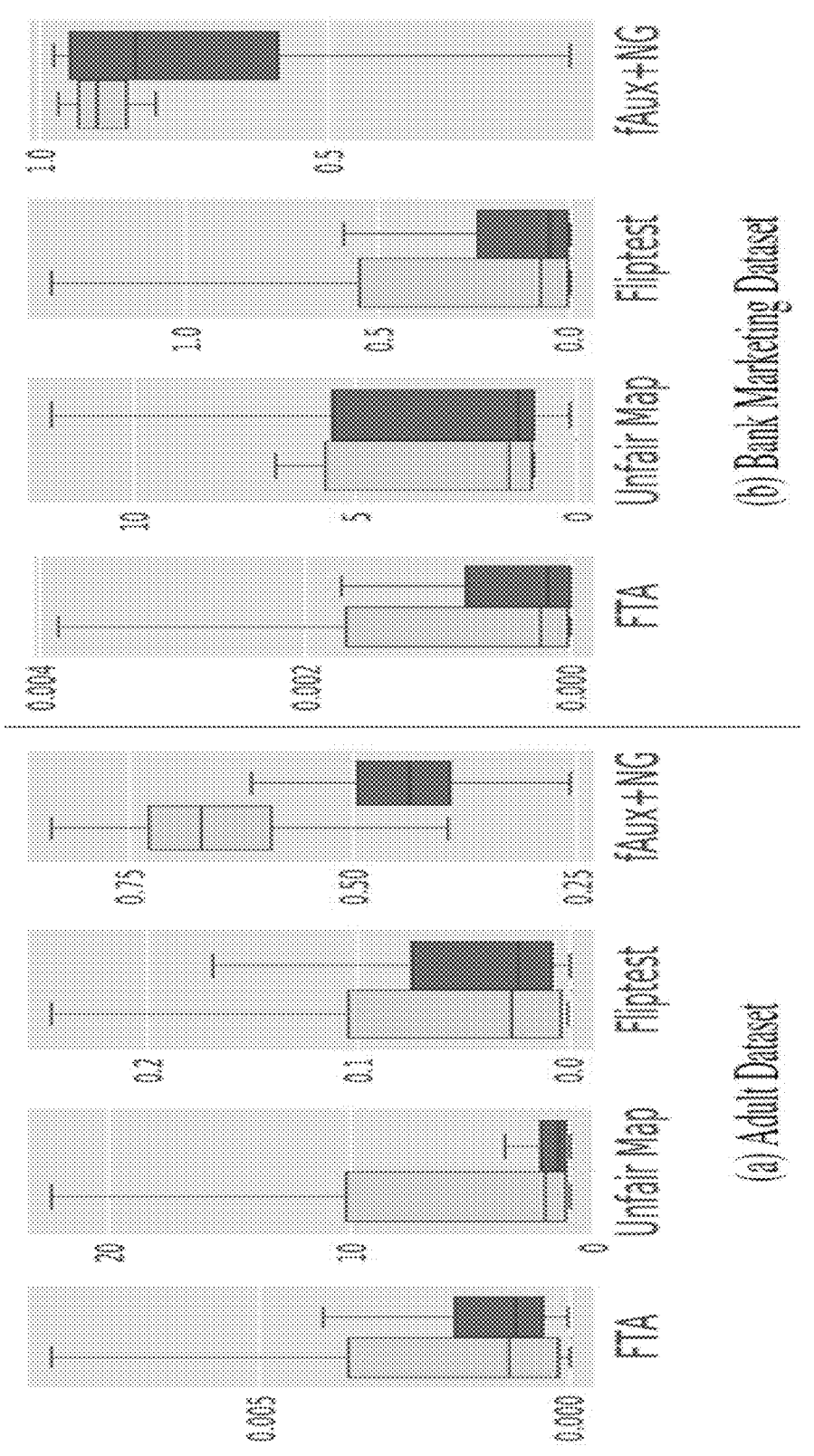
FIG. 14 are bar charts showing predicted unfairness scores, according to some embodiments, for the two data sets, Adult Income Data Set, and Bank Marketing Dataset.

FIG. 14 are bar charts showing predicted unfairness scores, according to some embodiments, for the two data sets, Adult Income Data Set, and Bank Marketing Dataset. Bar charts 1400 show performance comparison among individual fairness testing methods on real datasets. For each testing approach, Applicants show the predicted unfairness score for both unfair model (grey box on left) and fair model (darker shaded box on right). Greater difference (between the boxes) shows better performance. To conserve space, Applicants have only plotted fAux+NG in this example.

In FIG. 14, Applicants plot the distribution in the test scores for fair and unfair models. For both datasets, Applicants note the $f_{Aux}$ approach shows better performance than the existing approaches since it produces observably higher unfairness scores to the Unfair model than those of the Fair model. Moreover, with $f_{Aux}$ testing, the difference of score distributions between the Unfair and Fair model is also more distinguishable, which helps the threshold search using statistic tools.

Exploring Performance

The fAux methods show good experimental performance but in this section Applicants explore potential conditions that may impact their effectiveness. To analyze the conditions comprehensively, Applicants train target and auxiliary models on synthetic datasets with the structure described in the previous experiments, but explore a wider range of settings (refer to supplementary materials). Applicants aggregate these results to examine the effectiveness of the $f_{Aux}$ test across different datasets. In particular, Applicants investigated the following aspects:

Sensitivity: The first question Applicants address is whether the $f_{Aux}$ method can correctly identify models that exhibit slight unfair treatment. As the ground truth unfairness level of a target model is hard to measure, Applicants use the bias level as the indicator.

Figure 15:
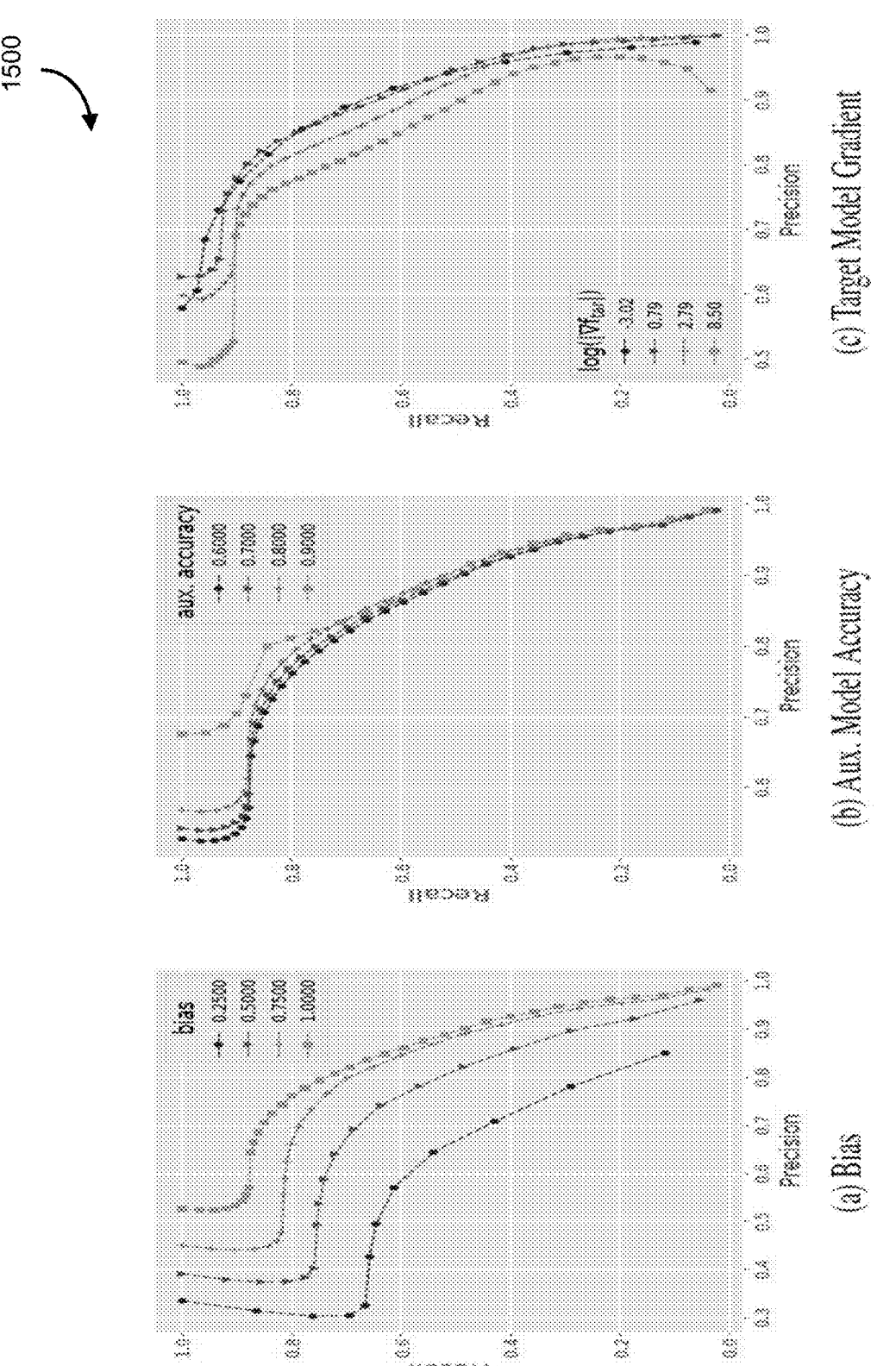
FIG. 15 is a set of graphs that chart recall against precision, according to some embodiments.

FIG. 15 is a set of graphs that chart recall against precision, according to some embodiments. In graphs 1500, Applicants identify the operational range of the $f_{Aux}$ by examining PR curves on aggregated runs. The graphs show: (a) Impact from data bias. (b) Impact from the auxiliary model performance. (c) Impact from the gradient magnitude of the target model. FIG. 15, chart (a) shows the Precision-Recall (PR) curve of the fAux performance based on the degree of the data bias. Applicants note that when the target model is trained on highly biased data (bias≥0.75), the $f_{Aux}$ shows better discrimination detection performance. When the target model is trained on less biased data (bias≤0.5), the reliability of $f_{Aux}$ decreases. In the worst-case (bias≤0.25), $f_{Aux}$ loses its functionality since the PR curve and the diagonal line (the random guess line) have multiple intersections.

Auxiliary model accuracy: Chart (b) hows the PR curve for different auxiliary model accuracies. Model accuracy varies according to the hyperparameters used, and the difficulty of the classification task. Empirically, Applicants find that auxiliary models with better accuracy lead to better fAux performance. Since the auxiliary models aim to predict the protected attributes C, their performance impacts how well fAux detects the variance of C given features X.

Quality of target model: In practice, target model quality is out of scope for tuning fairness testing methods. However, Applicants note that the gradient magnitude $|\nabla f_{tar}|$ impacts the fAux performance as shown in chart (c). When the gradient is extremely large, $f_{Aux}$ exhibits worse performance.

In various embodiments described herein, Applicants developed a novel criterion for testing individual fairness (Definition 1), which Applicants related to other well-known criteria. Applicants demonstrated that if a model satisfies a local conditional independence relation, it also meets the criterion. Based on these insights, Applicants proposed an individual fairness test and corresponding computer implemented systems and approaches, which Applicants termed $f_{Aux}$. In experiments, Applicants have demonstrated that $f_{Aux}$ outperforms several other state-of-the-art approaches for both synthetic and real datasets.

Example Use Cases

In order to introduce individual fairness testing into industry as an important checking point/regulation, an efficient and effective testing approach that can scale up to applications with millions of customers is urgently needed. Applicants note that the existing approaches such as counterfactual fairness, while conceptionally effective, are hard to deploy in practice as they either consume too much computation resources (that are out of budget) or require detailed domain knowledge (that are usually too complex to summarize). Hence, the proposed approach becomes the most practical option. It only needs to estimate gradient (or feature importance) alignment, which happens to also be unavoidable when testing for other properties such as adversarial robustness testing or performing feature importance analysis, etc.

That said, Applicants caution against over reliance on mathematical metrics for quantifying fairness. In particular, while Applicants show in Table 4 that $f_{aux}$ can flag proxy features, Applicants emphasize this is no substitute for intuition about the impact of the features in the dataset. Applicants advocate $f_{aux}$ as an effective component of a validation pipeline, but investigators should be mindful of other sources of bias beyond historical bias e.g. label contamination.

Use Cases

Predictive Policing

Applicants consider the use case described in (Kusner et al. 2017), where a hypothetical city government is seeking to predict crime rates in order to assign policing resources to different communities. The goal is that, given an individual, a model may be used to estimate that individual's predisposition to violence. A developer trains a model on a dataset obtained by merging residential information with police records of arrests. However, some neighborhoods have higher arrest rates due to greater policing there. Because individuals of different races may congregate in different neighborhoods, this can lead the model to conclude that members of a particular race are more likely to break the law.

This bias persists even if the classifier does not take race as an explicit input, since that information may be inferred from the neighborhood. Thus, Fairness Through Unawareness (FTU) is not applicable. $f_{Aux}$, however, can identify such correlations through the gradient of the auxiliary model. Moreover, it can recognize when these correlations impact model predictions through gradient alignment.

Accordingly, according to an embodiment, the $f_{aux}$ approach can be implemented as a fairness detection circuit or computer server through which trained classifiers or models are first provided to assess a level of unfairness. If an output fairness score is too low (or conversely, an output unfairness score is too high), the model may be replaced or not utilized.

Credit Cards

Consider a hypothetical credit agency that wants to automate the process of giving credit cards. As inputs, they merge account data, transaction history, and demographic information to form a high-dimensional, sparse dataset with millions of entries. They train a model to predict whether the individual will default on their payments within a certain time window. The model learns that individuals above a certain income threshold are more likely to make their payments. However, due to income disparity between men and women, and income disparity between younger and older individuals, these individuals may be unfairly treated by the model.

Fairness Through Awareness (FTA) may be deployed to solve this problem, by going through pairs of individuals, and determining if similar treatment is offered to similar individuals (as measured by a similarity metric). However, this has a few shortcomings. Firstly, computing pairwise similarities is computationally daunting, especially in higher dimensions. Secondly, the dataset is constructed from a mixture of tabular and time series data, meaning it incorporates different data domains that have different semantic interpretation. Finally, the model may be justified in treating two "similar" individuals differently if they differ in a business-relevant sensitive feature. Depending on the similarity metric, FTA may completely miss the underlying issue, which in this case, is the income disparity, and simply identify all instances where the model was sensitive.

By contrast, $f_{Aux}$ avoids the need for designing similarity metrics, by inferring which features are relevant for predicting sex/age. By aligning the feature importances with the gradients of the target model, $f_{Aux}$ can identify when the model is leveraging this information to make its predictions, revealing the discrimination.

Accordingly, according to an embodiment, the $f_{aux}$ approach can be implemented as a fairness detection circuit or computer server through which trained classifiers or models are first provided to assess a level of unfairness. If an output fairness score is too low (or conversely, an output unfairness score is too high), the model may be replaced or not utilized.

Discussion: Relation to Adversarial Robustness

Individual fairness testing has strong connections with adversarial robustness (see Yurochkin, Bower, and Sun 2019; John, Vijaykeerthy, and Saha 2020). The adversarial robustness criterion near point x $$\forall x' s.t (\phi_{in}(x,x') \le \epsilon) \wedge (\phi_{out}(f(x), f(x')) < \delta)$$

is nearly identical to the criterion of the FTA definition if Applicants reformulate the FTA criterion as $$\forall x_i x_j s.t (\phi_{in}(x,x') \le \epsilon) \wedge (\phi_{out}(f_{tar}(x_i), f_{tar}(x_j)) < \delta)$$

with additional constraint $\epsilon \ge \delta$. Similarly, the counterfactual fairness criterion, can be rewritten as $$\forall c' \text{ s.t}$$
$$(\phi_{in}(c, c') \le \epsilon) \wedge (\phi_{out}(P(y \mid x, c) - P_{C \leftarrow do(c')}(y \mid x, c))) < \delta)$$

to match the adversarial robustness definition.

The Local Fairness Test proposed also has strong connections with adversarial robustness. However, as $f_{Aux}$ works on the level of differentiation, the input distance condition $\phi_{in}(c, c+\Delta c)$ becomes trivial since $\Delta c$ is negligible. Hence, $f_{Aux}$ considers only the output distance condition:

$$\phi_{out} = \left| \nabla f_{tar} \left( \nabla f_{aux}^T \nabla f_{aux} \right)^{-1} \nabla f_{aux}^T \right|_{\infty}, \tag{44}$$

where distance function over the inputs is no longer explicitly provided; the derivative is the limit of the predictive difference between two near identical inputs.

However, even though individual fairness testing and adversarial robustness testing share common properties mentioned above, Applicants note that they are different tests that aim to reveal different weaknesses of a machine learning model. Specifically, adversarial robustness testing focuses on detecting vulnerability of a model with respect to anomalous (or adversarial) inputs, whereas individual fairness testing pays attention to the sensitivity of protected attributes on a model.

Proof of Theorem

The $l_\infty$ norm represents a max operation on the most violated protected attribute c in $c=\{c_1, c_2 c_k\}$. To prove the theorem described earlier, Applicants only need to focus on this single protected attribute c. Hence, if a prediction violates the Local Independence Criterion (LIC), Applicants can express it as:

$$\left| \frac{\partial f_{tar}(x)}{\partial c} \right| > \delta$$

By expanding the left hand side of the inequality with the generative model $f_g$, Applicants note $$\lim_{\Delta c \to 0} \frac{f_{tar}(f_g(z_\perp, \psi(c))) - f_{tar}(f_g(z_\perp, \psi(c + \Delta c)))}{\Delta c}$$

which could be numerically approximated with small $\Delta c$ such that $$\lim_{\Delta c \to 0} \frac{f_{tar}(f_g(z_\perp, \psi(c))) - f_{tar}(f_g(z_\perp, \psi(c + \Delta c)))}{\Delta c} =$$

$$\frac{f_{tar}(f_g(z_\perp, \psi(c))) - f_{tar}(f_g(z_\perp, \psi(c + \Delta c)))}{\Delta c} + \xi,$$

where the $\xi$ is an error term introduced by the approximation.

Therefore, the above Inequality could be extended as $$|f_{tar}(f_g(z_\perp, \psi(c))) - f_{tar}(f_g(z_\perp, \psi(c + \Delta c)))| > (\delta - \xi)|\Delta c|.$$

If Applicants choose $\delta \gg \xi$ and $|\Delta c|$ is positive, Applicants have $$|f_{tar}(f_g(z_\perp, \psi(c))) - f_{tar}(f_g(z_\perp, \omega(c + \Delta c)))| > 0,$$

which violates the individual fairness definition in Definition 1.

Using Pseudoinverses for Model Inversion

In this section, Applicants provide a more in-depth discussion on the derivation of the combined equation for approximating the LIC. The Taylor expansion is a local linear approximation of the function $f_{aux}$. The left-hand side of this equation denotes the change in the score, and is a scalar. The right hand side is a dot product between two vectors. While Applicants would like to invert this equation to solve for x, and the equation is an indeterminate equation. Nevertheless, using the Moore-Penrose pseudoinverse, Applicants may still characterize the infinite solution set for x.

To understand this, consider a general linear equation:

$$y = Ax.$$

Here, A is an m by n matrix, and Applicants want to solve this equation for x. When A does not have an inverse, solutions may be found to the above general linear equation, but they will not be unique. Instead, there will be a family of solutions x(z) parameterized by a vector $z \in R^n$, which will be given by:

$$x(z) = A^\dagger y + (I - A^\dagger A)z.$$

Here, I is the n by n identity matrix, and the pseudo-inverse is given by $$A^\dagger = A^T(AA^T)^{-1}.$$

Note that equation the family of solutions describes an infinite solution set, insofar as z is undetermined: the operation of A on the right-hand side of the family of solutions parameterized by the vector z will simply cause the second term to vanish, so that any vector z may be used.

For the specific case of the local linear approximation of the auxiliary model, $y = (c - f_{aux}(x_0))$ is a scalar, $$A = \nabla f_{aux}^T$$

is a co-vector, and Applicants may solve for $f_{sur}(c)$ as:

$$f_{sur}(c) = x_0 + (c - f(x_0)) \frac{\nabla f_{aux}}{\nabla f_{aux}^T \nabla f_{aux}} + \left(I - \frac{\nabla f_{aux} \nabla f_{aux}^T}{\nabla f_{aux}^T \nabla f_{aux}}\right) z$$

Figure 16:
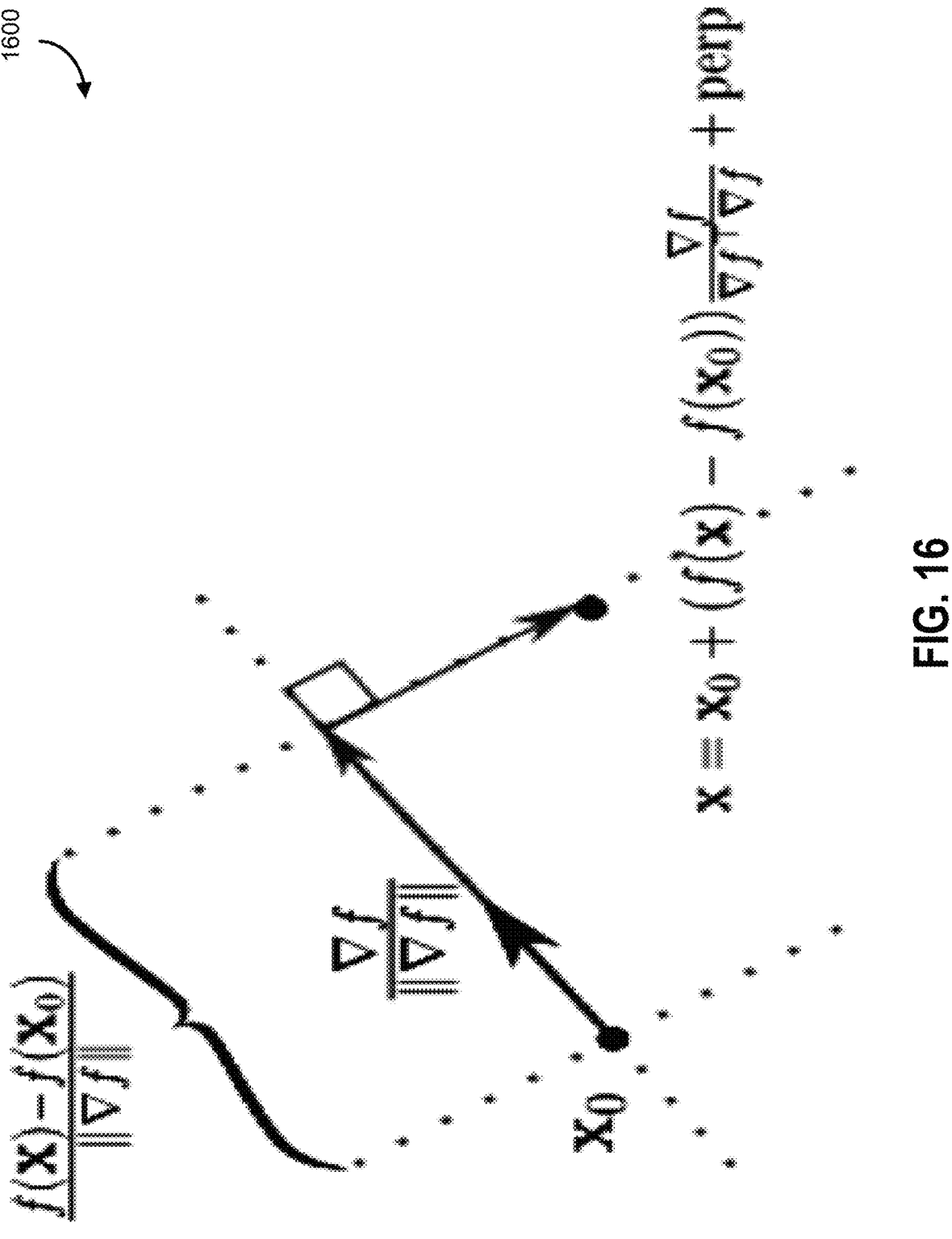
FIG. 16 is an illustration that is adapted to show an inverse of a linear function.

Applicants illustrate these different terms in FIG. 16. FIG. 16 is an illustration 1600 that is adapted to show an inverse of a linear function. In one dimension, the inverse of a linear function is uniquely determined by the slope. In higher dimensions, the slope becomes the magnitude of the gradient. However the inverse is no longer uniquely determined: the output is constant along directions perpendicular to the gradient.

The equation above describes two sources of variation: the first of which is parallel to $\nabla f_{aux}$, and the second of which is perpendicular to it. The partial derivative with respect to C is defined by the variance in a function as C is changed, and all other variables are fixed. As a relaxation, Applicants consider the direction that leads to maximal change in C, and minimal change in all other variables. This corresponds to the minimum norm solution that satisfies the equation for $f_{sur}(c)$s, above.

For a model trained to predict c, the gradient should point in the direction of greatest change in c. Therefore, intuitively, the c-dependence of the perpendicular part should be much smaller than the c-dependence of the parallel part. Applicants may thus disregard the perpendicular part, and are left with the following approximation:

$$\frac{\partial x}{\partial c} \approx \frac{\nabla f_{aux}}{\nabla f_{aux}^T \nabla f_{aux}}$$

Description of the Synthetic Dataset Pipeline

Applicants hypothesized that when datasets contain multiple sources of variation, models will preferentially exploit the simplest patterns to achieve their performance objective. In this section, Applicants describe a framework for constructing synthetic datasets that trigger this misbehavior. Specifically, Applicants present an approach for fusing real datasets together, so that the final dataset contains multiple patterns of variation. This has the advantage that the final dataset inherits the same types of noisy and nonlinear relationships that are present in real datasets. Applicants summarize this procedure in an algorithm for synthetic data generation.

The framework has three main degrees of freedom:

1. To simulate a historical bias, Applicants allow the target variable y and the protected variable c to be correlated while sampling from the dataset. This is controlled by a joint distribution P(C,Y).

2. The fusion function F, which combines the datasets together without distorting the underlying patterns. Applicants consider two extremes: one in which data is perfectly mixed (outer product), and one in which it is trivially separable (concatenation).

3. The choice of datasets, which controls the difficulty of the learning task. Applicants measure difficulty according to the best classification score that is obtained on each individual dataset using an architecture search. Applicants build Conditional Variational Autoencoders to model these datasets.

In the next few subsections, Applicants provide more details about each of these components.

Bias Parameter

Applicants can control the amount of bias by specifying a joint distribution P(C,Y). In the experiments Applicants consider binary C and Y, so that P(C,Y) may be constructed as a 2 by 2 matrix, which involves 4 degrees of freedom.

Applicants would instead like to reduce these to a single degree of freedom, which Applicants term the bias parameter.

Minimal bias occurs when the joint distribution factorizes, so that:

$$P_{min}(C,Y){=}{=}Pr(C)Pr(y)$$

The amount of bias may then be quantified by considering how much the specified P deviates from this $P_{min}$, which Applicants conduct using the entropy:

$$H(P) = \Sigma_C \ \Sigma_Y \ P(C, Y) \log\left(\frac{P(C, Y)}{P_{min}(C, Y)}\right). \tag{45}$$

Applicants may thus define a $P_{max}$ via:

$$P_{max}{=}\mathrm{argmax}_P H(P). \tag{46}$$

This optimization is done with the three constraints:

$$\Sigma_C \Sigma_Y P_{max}(C,Y){=}1 \tag{47}$$

$$\Sigma_Y P_{max}(C,Y){=}Pr(C) \tag{48}$$

$$\Sigma_C P_{max}(C,Y){=}Pr(Y) \tag{49}$$

Here, the marginals are estimated from the respective datasets by examining the relative frequencies of C=1 and Y=1. In addition Applicants have the positivity constraints:

$$P_{max}(C, \ Y){\geq}0; \ \forall C,Y. \tag{50}$$

Applicants thus have an optimization problem with 4 degrees of freedom and 3 constraints, and may find $P_{max}$ using a one-dimensional line search. Applicants then obtain the biased P by linearly interpolating between these two extremes:

$$P_{bias}{=}(1{-}\mathrm{bias})P_{min}{+}(\mathrm{bias})P_{max} \tag{51}$$

One can observe the effect of adjusting bias in FIG. 6A and FIG. 6B, demonstrating that the proposed mechanism does indeed provoke unfair treatment in models. FIG. 6A shows generative models for unbiased datasets. In both datasets the observable features X are distributed according to a target Y and latent variables Z. At present there are no distinct populations in either dataset, and so there is no bias; and FIG. 6B, where $X_1$ and $X_2$ are fused together to form a new dataset X, which contains two distinct patterns of variation. Applicants declare the target of the second dataset $Y_2$ to be a sensitive attribute, labeled with C. Applicants introduce a historical bias using a correlation between Y and C. Models trained on the new dataset may learn to exploit the C dependence of X to predict Y, which corresponds to discriminatory behaviours.

Fusion Functions

In this section Applicants consider how to fuse datasets together. Applicants consider two datasets $\hat{D}{=}\{ \ . \ . \ . \ (\hat{x}_i,\hat{y}_i) \ . \ . \ . \ \}$ and $\tilde{D}{=}\{ \ . \ . \ . \ (\tilde{x}_j,\tilde{y}_j) \ . \ . \ . \ \}$. The inputs have dimensions $\hat{N}$ and $\tilde{N}$ respectively.

In fusing the datasets, the approach is slightly constrained: while Applicants aim to mix the different patterns, they must also be distinct enough that the learning task can be performed. That is to say, all stochasticity and nonlinearity should come from the original datasets, whose patterns should be preserved (and thus, simultaneously learnable) under the fusion function. In the experiments, Applicants thus consider two extremes of mixing:

Applicants concatenate the vectors $\hat{x}_i$ and $\tilde{x}_j$:

$$x{=}\mathrm{concat}(\hat{x}_i,\tilde{x}_j) \tag{52}$$

This corresponds to the setup in Kusner et al. [2017], in which the observable features X may be partitioned into descendants and non-descendants of the protected variable C. That is to say, given a causal graph, certain features of X may be children of the protected variable C. A simple linear projection is sufficient to separate these sources of variation:

$$\hat{x}_i{=}\hat{W}x; \ \hat{W}{=}\mathrm{concat}(I_{\hat{N}},0)$$

$$\tilde{x}_j{=}\tilde{W}x; \ \tilde{W}{=}\mathrm{concat}(0, \ I_{\tilde{N}})$$

As another extreme, Applicants consider the case of perfect mixing by taking the outer product:

$$x{=}\mathrm{vec}(\hat{x}_i{\otimes}\tilde{x}_j).$$

If $\hat{x}_i$ and $\tilde{x}_j$ each sum to 1, then Applicants can completely isolate them from x using a different linear projection:

$$\hat{x}_i = \hat{W}x; \ \hat{W} = \frac{1}{\tilde{N}}(I_{\hat{N}} \otimes 1_{\tilde{N}}) \tag{53}$$

$$\tilde{x}_j = \tilde{W}x; \ \tilde{W} = \frac{1}{\hat{N}}(1_{\hat{N}} \otimes I_{\tilde{N}}) \tag{54}$$

Generative Models

For ease of generating counterfactuals, Applicants use Conditional Variational Autoencoders (CVAEs) to generate samples X from a specified target Y. Applicants discard all categorical features, and retain only those which are real values. Because the datasets used are tabular, Applicants use a pre-processing strategy similar to (Xu et al. 2019), modelling each feature with a Gaussian Mixture Model (GMM). This models the univariate feature distribution as a sum of distinct gaussian modes, with each mode assigning the feature a certain probability. Applicants may thus transform each feature into a vector of mode probabilities, and Applicants concatenate these probability vectors to form the inputs x. Since each probability vector sums to 1, this has the added advantage that the sum over x will be a fixed integer, namely, the number of features, making it compatible with the outer product transform described earlier.

In addition to the depth and width of the encoder/decoder, Applicants tune the number of components of the GMM when training the generative models. To evaluate the final model, Applicants sample a collection of (x,y) pairs, and use them to train a simple classifier to predict y from x. Applicants tune the parameters so as to maximize the accuracy of this classifier. This results in a generative model that best preserves the original discriminative relationship inside a given dataset. Model hyperparameters are shown in Table 2.

TABLE 2

Original datasets used in the synthetic pipeline: information on the datasets from PMLB, along with the hyperparameters of the CVAEs used to model them. A lower model score corresponds to a more "difficult" dataset to model.

| dataset | # features | # instances | # gmm components | hidden size | depth | model score |
|---|---|---|---|---|---|---|
| backache | 6 | 180 | 3 | 186 | 6 | 0.545 |
| credit | 7 | 1000 | 7 | 874 | 3 | 0.657 |
| australian | 6 | 690 | 5 | 977 | 5 | 0.721 |
| wdbc | 30 | 569 | 4 | 367 | 1 | 0.815 |
| magic | 10 | 19020 | 2 | 624 | 2 | 0.987 |

Datasets Used

In determining the datasets, Applicants aim to find a combination of stochastic and nonlinear patterns. To quantify the complexity of these patterns, Applicants measure the maximum accuracy reached by a simple classifier after tuning. Intuitively, if a model is unable to obtain a high score, that dataset constitutes a more difficult challenge. Applicants perform this analysis on all of the binary classification datasets in PMLB (Olson et al. 2017), and select those listed in Table 2, since they represent a spread of complexity.

Note that, in selecting and training models on these datasets, Applicants retain only those features which are continuously valued, in order to match the generative model setup.

Specific Settings

To generate the plots shown earlier, Applicants generate synthetic datasets according to the following parameter grid:

Applicants select the bias parameter rom the following choices: [0, 0.25, 0.5, 0.75, 1.0].

Applicants select the fusion function from the set [concat, outer].

Applicants select all pairs of datasets from Table 2.

Applicants train fully connected neural networks for the auxiliary and target models, using randomly sampled widths and depths.

Constructing Ground-Truth Labels and Models

The main utility of using generative models is that Applicants may simultaneously sample both an instance x and its counterfactual x'. Accordingly, by passing x and x' through the target model $f_{tar}$, Applicants may use the $l_1$-distance between the model outputs as a measure of discrimination, which Applicants refer to as the Individual Fairness Score (IFS):

$$\text{IFS} = |f_{tar}(x_i) - f_{tar}(x_j)|_1$$

Figure 17:
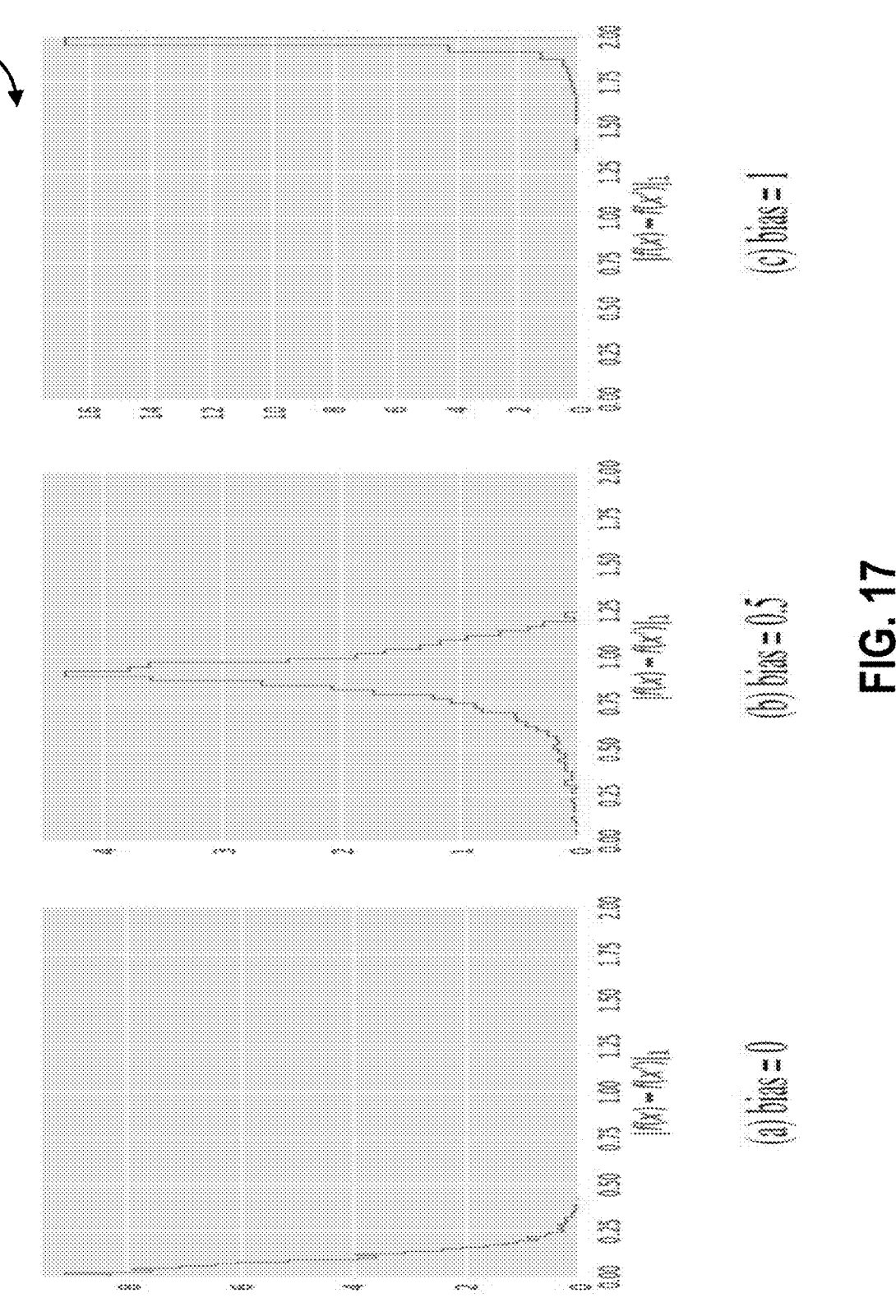
FIG. 17 is a set of histograms that illustrate approaches for controlling discrimination with a tunable bias parameter.

FIG. 17 is provided and includes three charts showing demonstrates how this CFF score varies as the parameters of the pipeline are adjusted. FIG. 17 is a set of histograms 1700 that illustrate approaches for controlling discrimination with a tunable bias parameter. Given access to a generative model, Applicants can measure discrimination by evaluating the disparity in a model f's outputs over a point x and its counterfactual x'. The histograms 1700 demonstrate that datasets with higher values of the bias parameter provoke higher rates of discrimination in models trained on them.

To obtain binary labels, Applicants define a threshold on the CFF score, which the system computes using the variance of the CFF score in the absence of any bias. Above this threshold, the system can be configured to denote that the model is discriminating against the individual x on the basis of c.

Furthermore, knowing the form of the fusion functions, Applicants propose, in a variant embodiment, constraining the input layers of an MLP to separate the different patterns contained inside the synthetic data. Models which project out the C dependence become perfectly fair target models. Models which project out the Y dependence become perfectly disentangled auxiliary models.

Sources for the Experiments on Real Datasets

The Adult and Bank datasets were obtained from IBM Fairness 360 (Bellamy et al. 2018), and the SSL dataset was obtained from the Chicago Data Portal.

Full Experiment Results for Real Datasets

Figure 18:
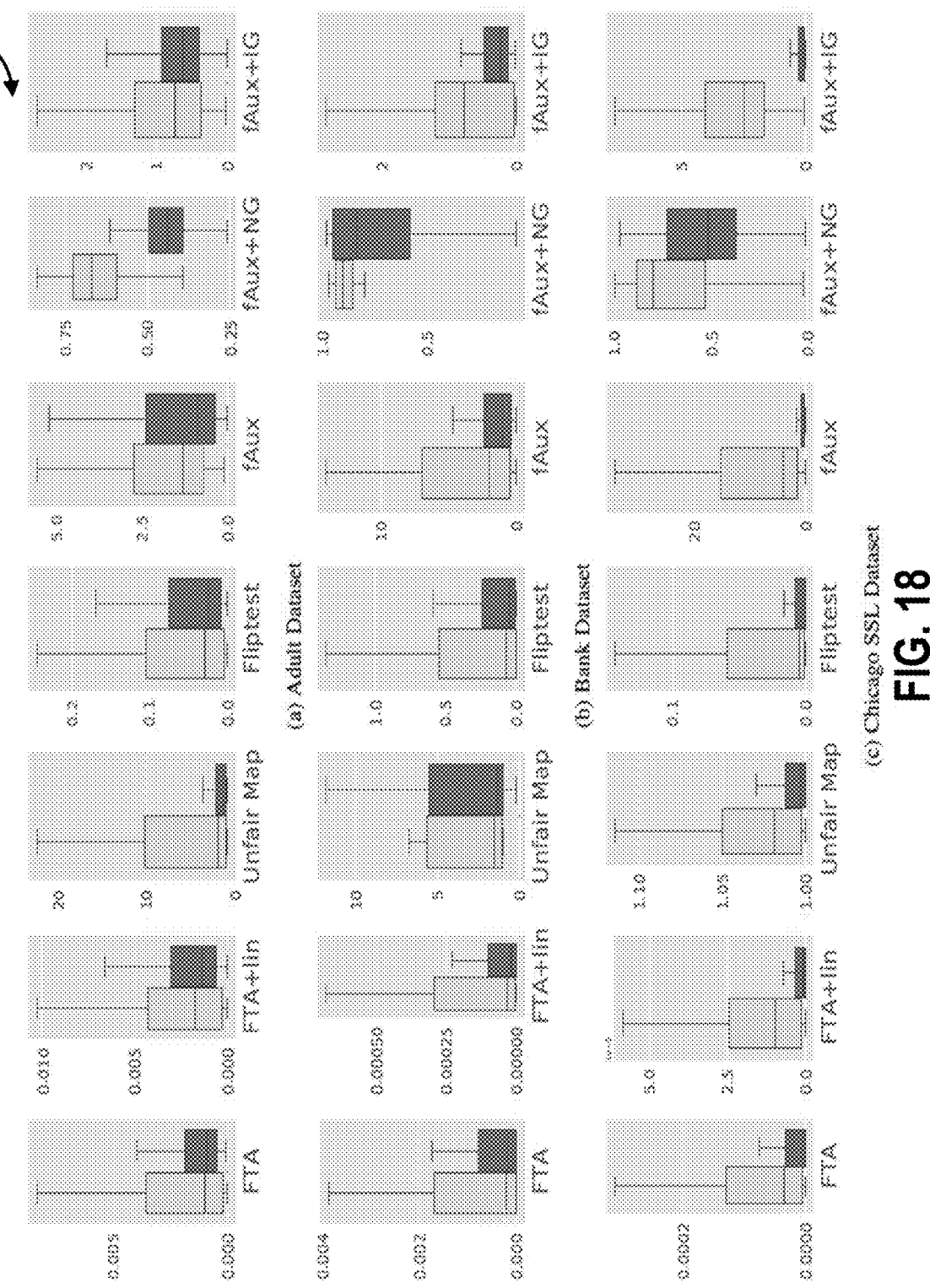
FIG. 18 shows the complete experimental result plots on the three datasets.

The full version of the performance comparison on real datasets. FIG. 18 shows the complete plots 1800 on the three datasets. In FIG. 18, for each testing algorithm, Applicants show the predicted unfairness score for both unfair model (grey box) and fair model (blue box). Greater difference (between the boxes) shows better performance.

Explaining Discrimination With Transparency Reports

As the real datasets do not have corresponding generative models that produce the data, Applicants cannot compute IFS as the ground-truth label and so direct performance comparison on individual fairness testing is infeasible. In the main body of the paper, Applicants opted to compare the scores output by the fairness test on fair and unfair models. However, another way to evaluate a fairness test is to examine the explanations it provides for flagging discrimination. In this section, Applicants examine how reliably fAux can generate such explanations.

In (Black, Yeom, and Fredrikson 2019) the authors construct transparency reports that rank features based on their contribution to an unfair decision. To generate scores for the different tests, Applicants collect all $N_0$ instances in the dataset for which c=0, to define a set $S_0$. For Fliptest, Applicants use the generator G to compute the following vector:

$$\frac{1}{N_0} \Sigma_{x \in S_0} \ (x - G(x))$$

The Fliptest feature scores are then given by the absolute value of this vector. While fAux does not use an explicit Generator, it does define a transformation of features through the auxiliary model $f_{aux}$. Applicants can thus compute transparency reports from the following vector:

$$\frac{1}{N_0} \Sigma_{x \in S_0} \ \nabla f_{aux}(x)$$

Once again, the feature score is given by the absolute values of this vector.

To quantitatively compare these scores, Applicants use a ranking metric, the Normalized Discounted Cumulative Gain (NDCG). The ground truth ranking is based on an estimate of the mutual information between each feature and the protected variable C. Applicants use a nonparametric entropy-estimator based on (Ross 2014), which is available through scikit-learn (Pedregosa et al. 2011).

Table 3 then compares the NDCG scores for the different test rankings. Note that, for categorical features that are one-hot encoded, Applicants compute an aggregate score for the feature by taking the mean of the scores of the one-hot components.

TABLE 3

| Reliability of Transparency Reports. Here, Applicants compare the candidate testing methods' ability for flagging surrogate features of protected attributes through ranking metric NDCG. | | | |
|---|---|---|---|
| Protected attribute | Adult Sex (Binary) | Chicago SSL Race (Binary) | Bank Age (Binarized) |
| FlipTest | 0.810 ± 0.150 | 0.840 ± 0.136 | 0.752 ± 0.108 |
| fAux | 0.802 ± 0.058 | 0.796 ± 0.098 | 0.798 ± 0.047 |
| fAux + NG | 0.807 ± 0.105 | 0.884 ± 0.119 | 0.789 ± 0.058 |
| fAux + IG | 0.896 ± 0.037 | 0.958 ± 0.006 | 0.814 ± 0.058 |

Applicants note $f_{Aux}$+IG shows remarkably better performance than FlipTest in terms of explaining the reason for unfair treatment. In addition, Applicants may compare the computational efficiency of both approaches.

Table 4 shows the computation resources used for the previous experiment on the real datasets. Table 4: Resource Consumption Comparison between FlipTest and fAux. The $f_{Aux}$ variants share a similar architecture and so Applicants use $f_{Aux}$ to represent all variants.

|  | Resource | FlipTest | fAux |
|---|---|---|---|
| Adult | # Parameters | 220 ± 187K | 13 ± 8K |
|  | Training time | 1012 ± 532 s | 12 ± 5 s |
| Chicago SSL | # Parameters | 154 ± 150K | 7 ± 6K |
|  | Training time | 1086 ± 580 s | 90 ± 23 s |
| Bank | # Parameters | 206 ± 159K | 13 ± 10K |
|  | Training time | 444 ± 204 s | 15 ± 4 s |

Applicants note that the proposed $f_{Aux}$ framework is remarkably efficient. It uses ~5% of the parameters and 10% of the training time of FlipTest on both datasets. In combination with the results from Table 1 and 3, this highlights the significant advantages of fAux in terms of both effectiveness and efficiency.

Hyperparameters for the Fairness Tests

In this section, Applicants review the hyperparameters used for the different fairness tests for both the synthetic and real datasets. All experiments were distributed on the internal cluster which contain NVIDIA DGX-1 with 8×NVIDIA Tesla® V100 32 GB/GPU. The cluster runs Red Hat Enterprise Linux Server release 7.9, and the experiments employ pytorch version 1.9.0. Unless otherwise stated, all stochastic algorithms (ex minibatch gradient descent, parameter initialization, etc) use a random seed of 0.

Hyperparameters for Constructing Fair Models

For the real datasets, without knowledge of the fusionfunction, Applicants employ (Adel et al. 2019) to train fair models using adversarial regularization. There were two parameters to tune:

The regularization strength $\alpha$. This is the initial relative weight given to the regularizer over the loss function, and this weight exponentially decays between epochs.

Adversarial training can sometimes be unstable, and so for every iteration that Applicants trained the target model, Applicants train the adversarial model for $n_{adv}$ epochs.

(Adel et al. 2019) was quick to use on the datasets, and so Applicants tuned these values manually. In particular, Applicants tuned the regularization strength on the synthetic datasets since they offered a more accurate assessment of the tradeoff between accuracy and fairness. Applicants found that an $\alpha$ of 100 yielded good results. Applicants tuned $n_{adv}$ in a similar fashion, and obtained a value of 3. Applicants used these values when training models on all of the real datasets.

Hyperparameters for fAux

Applicants use MLPs for all auxiliary models, varying the depth and width across different experimental runs. Applicants use a fixed batch size of 64 across all experiments, using the ADAM optimizer (Kingma and Ba2017) and a learning rate of 0.001 with early stopping.

For the real datasets, Applicants additionally employ (Adel et al. 2019), so that the resulting auxiliary model attends to those features that are most strongly correlated with the protected attribute. Applicants employ the same settings that Applicants use when constructing the fair models.

Hyperparameters for Unfair Map

The Unfair Map (Maity et al. 2021) uses a gradient-flow attack restricted to a sensitive subspace in order to test individual fairness. Tensorflow code for this paper was publically released through OpenReview, and Applicants' practical (pytorch) implementation is based off this.

There are three hyperparameters to consider:

The regularization strength, which is responsible for restricting the attacks to the sensitive subspace.

The learning rate, which is used to make the gradient updates in the attack.

The number of steps used in the attack.

In the experiments, Applicants use the same values for these parameters that are provided in the reference implementation. In addition to these parameters, this test requires a fair metric, which is constructed from a logistic regression model. To determine the sensitivity of this approach to the fair metric used, Applicants train the logistic regression model using scikit-learn (Pedregosa et al. 2011) using different random seeds. For the synthetic dataset experiments, Applicants use ten random seeds, taken from [10, 20, . . . 100].

Hyperparameters for GANs

Applicants use MLPs of varying depth and width for the Generators and Discriminators. Due to the sensitive nature of GAN training, Applicants tune the batch size, depth, and number of hidden dimensions, in addition to the following hyperparameters:

1. $n_{critic}$, which controls the relative number of training steps between the Discriminator and the Generator 2. $\lambda$, the weight of the transport cost in the Generator loss function.

Collectively, these parameters account for the architecture, loss function, and optimization of the GANs, to see which components of the training pipeline are most influential. As per the original Fliptest paper, Applicants tune the GAN models using the following metrics:

1. The Kolmogorov Smirnov (KS) two-sample test (Hodges 1958) on the marginal distributions for each feature between the real data x and the generated data G(x). Better GAN models will have a smaller KS-statistic (averaged across features), as the real and generated distributions will be similar.

2. The Mean-Squared Error (MSE) of a linear regression model trained to predict each observable feature from the remaining features. Better GAN models will have lower MSE values (averaged across features), as they will have captured correlation between the features well.

Figure 19A:
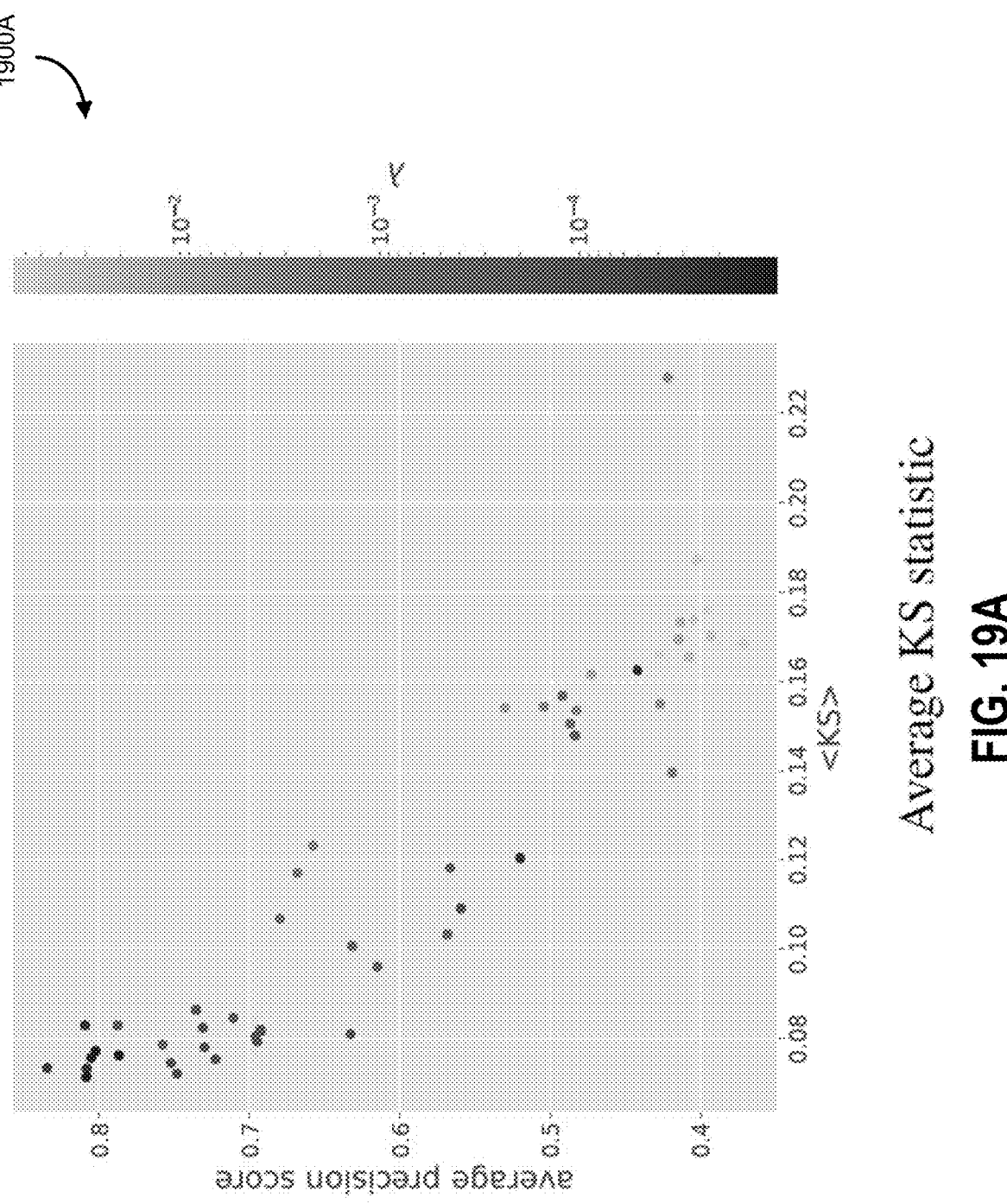
FIG. 19A and FIG. 19B are plots showing correlation between GAN evaluation metrics and fairness test performance, according to some embodiments.
Figure 19B:
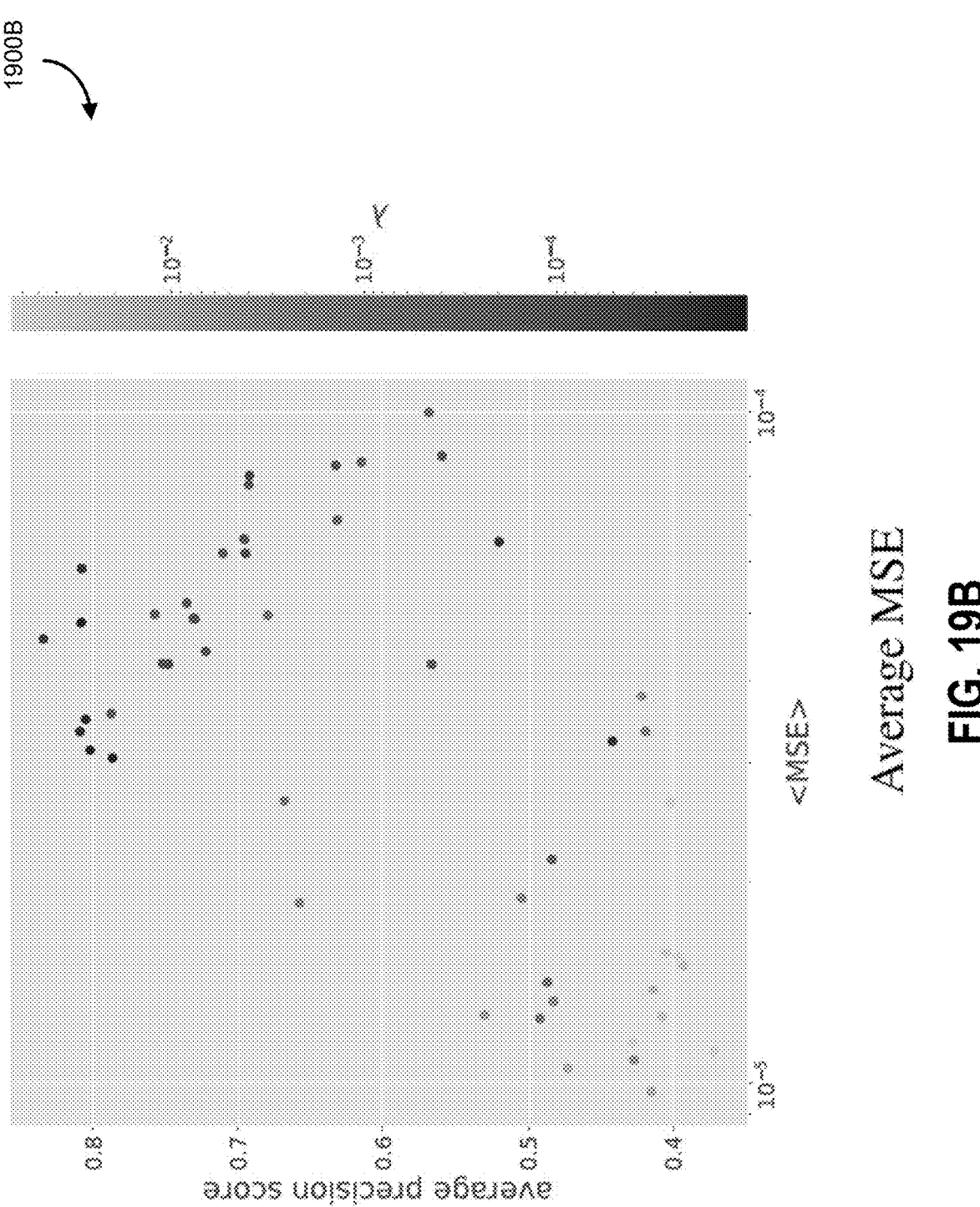

FIG. 19A and FIG. 19B are plots 1900A and 1900B showing correlation between GAN evaluation metrics and fairness test performance, according to some embodiments. In FIG. 19A and FIG. 19B, Applicants examine the correlation of these GAN metrics on the Synthetic-5 experiment, shown in Table 1. Given the high sensitivity of GANs to their hyperparameters, it is important to find evaluation criteria to tune them. The authors of Fliptest suggest two, average KS and average MSE, and Applicants compare how these metrics are related to the average precision of the fliptest. The plots show the effect of using different values of the transport weight $\lambda$. Applicants find that, while average KS does correlate well with average precision, average MSE does not.

Applicants observe that, while a smaller KS statistic does lead to a higher average precision, the MSE metric is at odds precision score. In this experiment, the most relevant hyperparameter was the weight of the transport cost λ: generally, Applicants find the best performance is given by very small values (less than $10^{-4}$). Applicants use this value when testing fair/unfair models on the real datasets.

Applicants collect the assumptions and limitations of some embodiments of the proposed approaches:

To assess the impact of modifying the protected variable C, Applicants train an auxiliary model to predict C. This requires the protected variable to be an explicit variable in the training data. However, because of regulations, it is not always possible to collect this. In this case, FTA may be a better choice.

Applicants base the test on definitions of independence. For certain applications, however, this may be the wrong criteria to use. For instance, in the presence of label bias, it might make sense to use the protected variable as an input for biased mitigation. In this case, the technique is not applicable.

The test leverages correlations between the input data X and the protected variable C in order to identify discrimination.

The features flagged by $f_{Aux}$ as surrogates may have a legitimate business reason for being used. For example, with the adult dataset, on average women work fewer hours per week, but it is fair to use this feature to predict income. $f_{Aux}$ will flag features for being correlated with a protected variable, so that, in some embodiments, a human validator is needed to interpret the final feature rankings. In a variant embodiment, the system automatically takes action instead without human intervention (e.g., picking a fairest model for use, deactivating unfair models, having models retrained or perturbed automatically).

The analysis employs a single first order Taylor expansion around an input x. Applicants thus only consider discrimination that may be revealed by perturbations in a small neighbourhood around the input. If the target model does not change appreciably over this neighbourhood (say, for points very far from the decision boundary), it may be necessary to consider successive first order expansions.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A system for estimating fairness of a target machine learning model by using an auxiliary machine learning model for identifying a protected group membership from an input variable of the target machine learning model, the auxiliary machine learning model configured to generate adversarial attacks from perturbed model inputs, the system comprising:

one or more processors operating in conjunction with computer memory, the one or more processors configured to:

instantiate the auxiliary machine learning model configured for inferring the protected group membership from the input variable of the target machine learning model;

receive data representative of the input variable of the target machine learning model, the target machine learning model configured to generate target predictions based on the input variable;

generate, at a given point $X_0$, a first vector indicative of a gradient of the target predictions of the target machine learning model with respect to the input variable;

generate, in parallel to generating the first vector, a second vector as a locally linearized surrogate of a gradient of the input variable with respect to the protected group membership, the second vector computed in a numeric local neighborhood around the given point $X_0$ via a Moore-Penrose pseudoinverse of a first-order Taylor expansion utilizing a gradient of the auxiliary target machine learning model evaluated at the given point $X_0$;

generate a fairness indicator value based on a projection value obtained by projecting the first vector onto the second vector and dividing by a L2 norm of the second vector;

generate downstream computing instructions representative of the fairness indicator value as compared to a predetermined fairness threshold to determine whether the target machine learning model exhibits individual-level unfairness with respect to the protected group membership, the downstream computing instructions indicating a modification instruction when the fairness indicator value is less than the predetermined fairness threshold; and transmit, to a downstream computing subsystem, the downstream computing instructions, the downstream computing subsystem configured to automatically select, from a plurality of candidate target machine learning models, an alternative machine learning model in accordance with the modification instruction.

2. The system of claim 1, wherein the downstream computing subsystem randomizes model weights of the target machine learning model and retrains the target machine learning model using an alternative data set.

3. The system of claim 1, wherein the gradient of the target machine learning model and the gradient of the auxiliary target machine learning model are evaluated using a Fast Gradient Method approximation.

4. The system of claim 1, wherein the target machine learning model is a first supervised learning model, and the auxiliary machine learning model is a second supervised learning model trained at least partially based on known values of the protected group membership.

5. The system of claim 1, wherein the second vector is representative of an output of a sign function of the gradient of the auxiliary machine learning model evaluated at the value of the input variable.

6. The system of claim 1, wherein the second vector is indicative of a modified gradient when the gradient of the auxiliary machine learning model is associated with out-of-distribution predictions of the target machine learning model.

7. The system of claim 1, wherein a plurality of fairness indicator values is generated, each corresponding to different protected attributes of the one or more attributes, and the downstream instructions are indicative of whether an aggregated measure of the plurality of fairness indicators exceeds a predefined aggregate fairness threshold.

8. The system of claim 7, wherein each of the plurality of fairness indicator values is indicative of a covariance between the gradient of the target machine learning model and the gradient of the auxiliary machine learning model.

9. The system of claim 7, wherein the aggregated measure is an L-p norm.

10. The system of claim 1, wherein the input variable includes an observable attribute correlated with at least one of the one or more protected attributes via an unobserved latent variable.

11. The method of claim 1, wherein the downstream computing subsystem randomizes model weights of the target machine learning model and retrains the target machine learning model using an alternative data set.

12. A method for estimating fairness of a target machine learning model by using an auxiliary machine learning model for identifying a protected group membership from an input variable of the target machine learning model, the auxiliary machine learning model configured to generate adversarial attacks from perturbed model inputs, the method comprising:

instantiating the auxiliary machine learning model configured for inferring the protected group membership from the input variable of the target machine learning model;

receiving data representative of the input variable of the target machine learning model, the target machine learning model configured to generate target predictions based on the input variable;

generating, at a given point $X_0$, a first vector indicative of a gradient of the target predictions of the target machine learning model with respect to the input variable;

generating, in parallel to generating the first vector, a second vector as a locally linearized surrogate of a gradient of the input variable with respect to the protected group membership, the second vector computed in a numeric local neighborhood around the given point $X_0$ via a Moore-Penrose pseudoinverse of a first-order Taylor expansion utilizing a gradient of the auxiliary machine learning model evaluated at the given point $X_0$;

generating a fairness indicator value based on a projection value obtained by projecting the first vector onto the second vector and dividing by a L2 norm of the second vector;

generating downstream computing instructions representative of the fairness indicator value as compared to a predetermined fairness threshold to determine whether the target machine learning model exhibits individual-level unfairness with respect to the protected group membership, the downstream computing instructions indicating a modification instruction when the fairness indicator value is less than the predetermined fairness threshold; and transmitting, to a downstream computing subsystem, the downstream computing instructions, the downstream computing subsystem configured to automatically select, from a plurality of candidate target machine learning models, an alternative machine learning model in accordance with the modification instruction.

13. The method of claim 12, wherein the gradient of the target machine learning model and the gradient of the auxiliary machine learning model are evaluated using a Fast Gradient Method approximation.

14. The method of claim 12, wherein the target machine learning model is a first supervised learning model, and the auxiliary machine learning model is a second supervised learning model trained at least partially based on known values of the protected group membership.

15. The method of claim 12, wherein the second vector is representative of an output of a sign function of the gradient of the auxiliary machine learning model evaluated at the value of the input variable.

16. The method of claim 12, wherein the second vector is indicative of a modified gradient when the gradient of the auxiliary machine learning model is associated with out-of-distribution predictions of the target machine learning model.

17. The method of claim 12, wherein a plurality of fairness indicator values is generated, each corresponding to different protected attributes of the one or more attributes, and the downstream instructions are indicative of whether an aggregated measure of the plurality of fairness indicators exceeds a predefined aggregate fairness threshold.

18. The method of claim 17, wherein each of the plurality of fairness indicator values is indicative of a covariance between the gradient of the target machine learning model and the gradient of the auxiliary machine learning model.

19. The method of claim 17, wherein the aggregated measure is an L-p norm.

20. A non-transitory computer readable medium storing machine interpretable instructions, which when executed by a processor, cause the processor to perform a method for estimating fairness of a target machine learning model by using an auxiliary machine learning model for identifying a protected group membership from an input variable of the target machine learning model, the auxiliary machine learning model configured to generate adversarial attacks from perturbed model inputs, the method comprising:

instantiating the auxiliary machine learning model configured for inferring the protected group membership from the input variable of the target machine learning model;

receiving data representative of the input variable of the target machine learning model, the target machine learning model configured to generate target predictions based on the input variable;

generating, at a given point $X_0$, a first vector indicative of a gradient of the target predictions of the target machine learning model with respect to the input variable;

generating, in parallel to generating the first vector, a second vector as a locally-linearized surrogate of a gradient of the input variable with respect to the protected group membership, the second vector computed in a numeric local neighborhood around the given point $X_0$ via a Moore-Penrose pseudoinverse of a first-order Taylor expansion utilizing of a gradient of the auxiliary machine learning model evaluated at the given point $X_0$;

generating a fairness indicator value based on a projection value obtained by projecting the first vector onto the second vector and dividing by a L2 norm of the second vector;

generating downstream computing instructions representative of the fairness indicator value as compared to a predetermined fairness threshold to determine whether the target machine learning model exhibits individual-level unfairness with respect to the protected group membership, the downstream computing instructions indicating a modification instruction when the fairness indicator value is less than the predetermined fairness threshold; and transmitting, to a downstream computing subsystem, the downstream computing instructions, the downstream computing subsystem configured to automatically select, from a plurality of candidate target machine learning models, an alternative machine learning model in accordance with the modification instruction.

* * * * *